US011932262B2

(12) United States Patent
Quirynen et al.

(10) Patent No.: US 11,932,262 B2
(45) Date of Patent: Mar. 19, 2024

(54) STOCHASTIC NONLINEAR PREDICTIVE CONTROLLER AND METHOD BASED ON UNCERTAINTY PROPAGATION BY GAUSSIAN-ASSUMED DENSITY FILTERS

(71) Applicant: Mitsubishi Electric Research Laboratories, Inc., Cambridge, MA (US)

(72) Inventors: Rien Quirynen, Somerville, MA (US); Karl Berntorp, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 232 days.

(21) Appl. No.: 17/365,338

(22) Filed: Jul. 1, 2021

(65) Prior Publication Data
US 2023/0022510 A1 Jan. 26, 2023

(51) Int. Cl.
*B60W 50/00* (2006.01)
*B60W 50/06* (2006.01)
(Continued)

(52) U.S. Cl.
CPC ........ *B60W 50/0097* (2013.01); *B60W 50/06* (2013.01); *B60W 60/001* (2020.02); *G05B 13/048* (2013.01); *B60W 2050/0052* (2013.01)

(58) Field of Classification Search
None
See application file for complete search history.

(56) References Cited

U.S. PATENT DOCUMENTS

| | | | | |
|---|---|---|---|---|
| 2005/0107895 A1* | 5/2005 | Pistikopoulos | ...... | G05B 13/048 700/74 |
| 2016/0202670 A1* | 7/2016 | Ansari | ........ | G05B 13/026 700/45 |
| 2019/0188592 A1* | 6/2019 | Berntorp | ........ | G05B 13/048 |

FOREIGN PATENT DOCUMENTS

CN  111291471 A  *  6/2020  ............. G06F 30/20

OTHER PUBLICATIONS

Andersson, "A General-Purpose Software Framework for Dynamic Optimization", KU Leuven—Faculty of Engineering Science Kasteelpark Arenberg 10, B-3001 Heverlee (Belgium), Oct. 2013. (Year: 2013).*

(Continued)

*Primary Examiner* — Amelia Vorce
(74) *Attorney, Agent, or Firm* — Gene Vinokur

(57) ABSTRACT

Stochastic nonlinear model predictive control (SNMPC) allows to directly take uncertainty of the dynamics and/or of the system's environment into account, e.g., by including probabilistic chance constraints. However, SNMPC requires the approximate computation of the probability distributions for the state variables that are propagated through the nonlinear system dynamics. This invention proposes the use of Gaussian-assumed density filters (ADF) to perform high-accuracy propagation of mean and covariance information of the state variables through the nonlinear system dynamics, resulting in a tractable SNMPC approach with improved control performance. In addition, the use of a matrix factorization for the covariance matrix variables in the constrained optimal control problem (OCP) formulation guarantees positive definiteness of the full trajectory of covariance matrices in each iteration of any optimization algorithm. Finally, a tailored adjoint-based sequential quadratic programming (SQP) algorithm is described that considerably reduces the computational cost and allows a real- (Continued)

time feasible implementation of the proposed ADF-based SNMPC method to control nonlinear dynamical systems under uncertainty.

19 Claims, 35 Drawing Sheets

(51) Int. Cl.
*B60W 60/00* (2020.01)
*G05B 13/04* (2006.01)

(56) References Cited

OTHER PUBLICATIONS

Bradford et al., "Stochastic Nonlinear Model Predictive Control with State Estimation by Incorporation of the Unscented Kalman Filter", Information Technology and Electrical Engineering, Engineering Cybernetics, NTNU, 7491 Trondheim, Norway, Sep. 5, 2017. (Year: 2017).*

Huber et al., "Semi-Analytic Gaussian Assumed Density Filter", Variable Image Acquisition and Processing Research Group, Fraunhofer Institute of Optronics, System Technologies and Image Exploitation IOSB, Karlsruhe, Germany, Aug. 2011. (Year: 2011).*

Streif et al., "Stochastic Nonlinear Model Predictive Control with Effcient Sample Approximation of Chance Constraints", Oct. 16, 2014. (Year: 2014).*

* cited by examiner

Solve the optimal control structured nonlinear program (NLP) — 381

$$\min_{s,u,L} \frac{1}{2} \sum_{k=0}^{N-1} \|r(s_k, u_k + Ks_k)\|_2^2 + \|r_N(s_N)\|_2^2$$

s.t. $s_0 = \hat{x}_t$, $L_0^x = \text{chol}(P_t)$, — 387, 386

$s_{k+1} = \sum_{i=1}^{|P|} \omega^{(i)} x_{k+1}^{(i)}$, $\forall k \in \mathbb{Z}_0^{N-1}$, — 382

$L_{k+1}^x = \text{chol}(\mathcal{Y}_{k+1} \mathcal{Y}_{k+1}^\top)$, $\forall k \in \mathbb{Z}_0^{N-1}$, — 383

$0 \geq g_j(s_k, u_k + Ks_k) + c_j \sqrt{D_{k,j} L_k^x L_k^{x\top} D_{k,j}^\top}$, $k \in \mathbb{Z}_0^N$, — 384

$\forall j \in \mathbb{Z}_1^{n_g}$, $k \in \mathbb{Z}_0^N$ — 385

— 380

|||| — 625

Compact formulation of the optimal control structured NLP for the stochastic predictive controller

$$\min_{y,z} \frac{1}{2} \|L(y)\|_2^2$$ — 631 s.t. $0 = F(y, z)$, — 632

$0 = E(y, z)$, — 633

$0 \geq I(y, z)$, — 634

$y = [u_0^\top, s_1^\top, u_1^\top, \ldots, s_{N-1}^\top, u_{N-1}^\top, s_N^\top]^\top$, — 635

$z = [\text{vec}(L_1^x)^\top, \ldots, \text{vec}(L_{N-1}^x)^\top, \text{vec}(L_N^x)^\top]^\top$, — 636

$$F(\cdot) = \begin{bmatrix} s_1 - \sum_{i=1}^{|P|} \omega^{(i)} x_1^{(i)} \\ \vdots \\ s_N - \sum_{i=1}^{|P|} \omega^{(i)} x_N^{(i)} \end{bmatrix}, \quad E(\cdot) = \begin{bmatrix} L_1^x - \text{chol}(\mathcal{Y}_1 \mathcal{Y}_1^\top) \\ \vdots \\ L_N^x - \text{chol}(\mathcal{Y}_N \mathcal{Y}_N^\top) \end{bmatrix}$$

Compact formulation of the optimal control structured NLP for the stochastic predictive controller

$$\min_{y,z} \quad \frac{1}{2}\|L(y)\|_2^2 \quad \sim 631$$

$$\text{s.t.} \quad 0 = F(y,z), \quad \sim 632$$
$$0 = E(y,z), \quad \sim 633$$
$$0 \geq I(y,z), \quad \sim 634$$

$$F(\cdot) = \begin{bmatrix} s_1 - \sum_{i=1}^{|\mathcal{P}|} \omega^{(i)} x_1^{(i)} \\ \vdots \\ s_N - \sum_{i=1}^{|\mathcal{P}|} \omega^{(i)} x_N^{(i)} \end{bmatrix} \quad E(\cdot) = \begin{bmatrix} L_1^X - \text{chol}(\mathcal{Y}_1 \mathcal{Y}_1^T) \\ \vdots \\ L_N^X - \text{chol}(\mathcal{Y}_N \mathcal{Y}_N^T) \end{bmatrix}$$

637  638

630

↓ 651

Construct differentiation-based local Quadratic Program (QP) approximation

$$\min_{\Delta y, \Delta z} \quad \frac{1}{2}\Delta y^{i\,T} H^i \Delta y^i + g^{i\,T} \Delta y^i \quad \sim 641$$

$$\text{s.t.} \quad \begin{matrix} \sigma_F^i \\ \sigma_E^i \end{matrix} : 0 = \begin{bmatrix} F(y^i, z^i) \\ E(y^i, z^i) \end{bmatrix} + \begin{bmatrix} \frac{\partial F}{\partial y}(\cdot) & \frac{\partial F}{\partial z}(\cdot) \\ \frac{\partial E}{\partial y}(\cdot) & \frac{\partial E}{\partial z}(\cdot) \end{bmatrix} \begin{bmatrix} \Delta y^i \\ \Delta z^i \end{bmatrix}, \quad \sim 642$$

$$\sigma_I^i : 0 \geq I(y^i, z^i) + \begin{bmatrix} \frac{\partial I}{\partial y}(\cdot) & \frac{\partial I}{\partial z}(\cdot) \end{bmatrix} \begin{bmatrix} \Delta y^i \\ \Delta z^i \end{bmatrix}, \quad \sim 643$$

Algorithm 1 Real-time Adjoint-based SQP for SNMPC ~ 840

1: Input: Guess $(y^i, z^i, \lambda^i, \mu^i, \kappa^i)$, and feedback gain $K$. ~ 841
2: Prepare QP subproblem (25): ~ 845
3: Compute block-diagonal Hessian $H^i$ and $g_a^i$ in (26). ~ 846
4: Evaluate block-sparse Jacobians $\frac{\partial F}{\partial y}(\cdot)$ and $\frac{\partial L}{\partial y}(\cdot)$, and ~ 847
    $\tilde{I}(\cdot)$ and $\tilde{F}(\cdot)$ in (29)-(30), using Remark 4. ~ 848
5: Solve block-sparse QP (25): ~ 850
6: Receive current state estimate $\hat{x}_t$ and $\hat{P}_t$. ~ 851
7: Solve QP in (25) to obtain $\Delta y^i$, $\sigma_F^i$ and $\sigma_I^i$. ~ 852
8: Expand solution $\Delta z^i$ in (28) and $\sigma_E^i$ in (31). ~ 853
9: Search for step size selection: ~ 870
10: Compute $\alpha^i \in (0, 1]$ such that Eq. (35) holds. ~ 871
11: $y^{i+1} \leftarrow y^i + \alpha^i \Delta y^i$, $z^{i+1} \leftarrow z^i + \alpha^i \Delta z^i$, $\lambda^{i+1} \leftarrow \lambda^i + \alpha^i \Delta \lambda^i$, $\mu^{i+1} \leftarrow \mu^i + \alpha^i \Delta \mu^i$ and $\kappa^{i+1} \leftarrow \kappa^i + \alpha^i \Delta \kappa^i$. ~ 860
12: Feedback: send control $u^* = u_0^{i+1} + K\hat{x}_t$ to process. ~ 855
13: Shift to next time step, see (Gros et al., 2020). ~ 857
14: Output: New values $(y^{i+1}, z^{i+1}, \lambda^{i+1}, \mu^{i+1}, \kappa^{i+1})$. ~ 856

Fig. 8C

STOCHASTIC NONLINEAR PREDICTIVE CONTROLLER AND METHOD BASED ON UNCERTAINTY PROPAGATION BY GAUSSIAN-ASSUMED DENSITY FILTERS

TECHNICAL FIELD

The invention relates generally to predictive control, and more particularly to a method and apparatus of high-accuracy propagation of mean and covariance information of predicted state variables for stochastic predictive control of nonlinear dynamical systems in the presence of uncertainty.

BACKGROUND

Nonlinear model predictive control (NMPC) has grown mature and shown its capability of handling relatively complex constrained processes. A predictive controller, such as NMPC, can be used in many applications to control complex dynamical systems that are described by a set of nonlinear differential equations, i.e., a system of ordinary differential equations (ODE) or differential-algebraic equations (DAE). Examples of such systems include production lines, vehicles, satellites, engines, robots, power generators and other (semi-)automatically controlled machines.

Although NMPC exhibits an inherent robustness due to feedback, such controllers do not take uncertainties directly into account and, consequently, the satisfaction of safety-critical constraints cannot be guaranteed in the presence of model uncertainties and/or external disturbances. One alternative approach is robust NMPC that relies on the optimization of control policies under worst-case scenarios in the presence of bounded uncertainties and/or bounded disturbances. However, robust NMPC can lead to a conservative control performance, due to the worst-case scenarios occurring with an extremely small probability.

Stochastic NMPC (SNMPC) aims at reducing the conservativeness of robust NMPC by directly incorporating the probabilistic description of uncertainties into the optimal control problem (OCP) formulation. It requires constraints to be satisfied with a certain probability, i.e., by formulating so-called chance constraints that allow for a specified, yet non-zero, probability of constraint violations. In addition, stochastic NMPC is advantageous in settings where high performance in closed-loop operation is achieved near the boundaries of the plant's feasible region. In the general case, chance constraints are computationally intractable and typically require an approximate formulation, e.g., based on an approximate computation of the probability distributions for the state variables that are propagated through the nonlinear system dynamics.

Sampling techniques characterize the stochastic system dynamics using a finite set of random realizations of uncertainties, which may lead to a considerable computational cost, due to a large number of samples that is often required for uncertainty propagation. Scenario-based methods exploit an adequate representation of the probability distributions, but the task of determining the number of scenarios leads to a tradeoff between robustness and computational efficiency. Gaussian-mixture approximations can be used to describe the transition probability distributions of states, but the adaptation of the weights is often computationally expensive. Another approach relies on the use of polynomial chaos (PC), which replaces the implicit mappings with expansions of orthogonal polynomial basis functions but, for time-varying uncertainties, PC-based stochastic NMPC requires many expansion terms.

Alternatively, a propagation of covariance matrix variables can be used to approximate the probabilistic chance constraints, e.g., using an explicit linearization of the nonlinear system dynamics based on a Taylor series approximation. However, the resulting linearization-based covariance propagation may not be sufficiently accurate for nonlinear system dynamics. In addition, the latter approach does not allow an accurate propagation of the mean values of the state variables, which may be different from the nominal values (i.e., the values corresponding to zero uncertainty and/or zero disturbances) for nonlinear system dynamics. Therefore, a direct tractable but accurate propagation of mean and covariance information is needed to formulate probabilistic chance constraints in stochastic predictive control of nonlinear dynamical systems under uncertainty.

Direct optimal control methods rely on the discretization of the continuous-time differential equations, based on a discretization of the control horizon and a corresponding parameterization of the control action over the prediction horizon. In addition, for stochastic predictive control applications, a discrete-time or discretized set of equations to propagate the uncertainty for the nonlinear system dynamics, based on a parameterization of the control feedback over the prediction horizon, can be included in the direct OCP formulation. The resulting large-scale nonlinear optimization problem or nonlinear program (NLP) can be solved by any nonlinear optimization solver. However, in the case of real-time applications of predictive control for nonlinear systems, this nonlinear optimization problem needs to be solved under strict timing constraints and on embedded hardware with limited computational power and with limited available memory.

Stochastic predictive control for a system described by nonlinear differential equations, requires the solution of a nonlinear stochastic optimal control problem at each control time step. Instead of solving each problem exactly, one real-time iteration of a sequential quadratic programming (SQP) method can be performed in order to update a solution guess from one time point to the next. Such a Newton-type SQP algorithm requires a linearization of the nonlinear constraint and objective functions at each iteration of the algorithm. This linearization can be costly, especially for the set of equations that describe the uncertainty propagation for the nonlinear system dynamics, and it requires a Jacobian evaluation when using an explicit integration method and can additionally require matrix factorizations, matrix-matrix multiplications and/or an iterative procedure to solve a nonlinear system of equations in case of an implicit integration method to discretize the nonlinear differential equations.

Accordingly, there is a need to increase the accuracy of propagating the mean and covariance information for the state variables through nonlinear system dynamics in order to improve the closed-loop performance of the resulting SNMPC controller, and a need to reduce the computational cost of numerical optimization algorithms in real-time applications of stochastic predictive control for nonlinear dynamical systems under uncertainty.

SUMMARY

It is an object of some embodiments to provide a system and a method for controlling a system under uncertainty by solving an inequality constrained nonlinear dynamic optimization problem including probabilistic chance constraints, based on a discretization of the nonlinear differential equations that describe the dynamical model of the system and a discrete-time propagation of the uncertainty for the nonlinear system dynamics. Each of the probabilistic chance constraints aims to ensure that the probability of violating the corresponding inequality constraint is below a certain probability threshold value.

Some embodiments of the invention use a formulation of the probabilistic chance constraints that is based on a tightening for each of the inequality constraints with a term that depends on a back-off coefficient value, a constraint Jacobian matrix and first and/or higher order, moment integrals for the predicted state value at that particular time step. In some embodiments of the invention, the first and/or higher order moment integrals include the first moment integral, which is the mean, and the second moment integral, which is the covariance. The covariance matrices can be computed efficiently for the state values at each time step in the control horizon, using an approximate linearization-based covariance propagation. The linearization-based covariance equations may lead to an inaccurate propagation of mean and covariance information of the state variables through the nonlinear system dynamics. Therefore, in some embodiments of the invention, a Gaussian-assumed density filter (ADF) is used to perform a high-accuracy propagation of mean and covariance information of the state variables through the nonlinear system dynamics. The more accurate propagation of mean and covariance information of the state variables can lead to an improved performance for stochastic predictive control of nonlinear dynamical systems under uncertainty.

According to some embodiments of the present invention, a predictive controller can be provided for controlling a system under uncertainty subject to constraints on states and control variables of the system. The predictive controller may include at least one processor; and memory having instructions stored thereon that, when executed by the at least one processor, cause the predictive controller to: solve, at each control step of the predictive controller, an inequality constrained nonlinear dynamic optimization problem including probabilistic chance constraints representing the uncertainty to produce a control signal, wherein the predictive controller solves a direct optimal control structured nonlinear program (NLP), based on probabilistic chance constraints and using discrete-time approximated propagation equations based on Gaussian-assumed density filtering (ADF) to perform an approximate prediction of first and/or higher order moment integrals of the state probability distribution from one time step to a next time step within the prediction horizon, depending on the first and/or higher order moment integrals of the probability distribution for one or multiple of the time-varying modeling uncertainties and/or external disturbances, until a termination condition is met; and control an operation of the system using the control signal.

Some embodiments of the invention are based on the realization that, if constraint functions in the probabilistic chance constraints are linear or mildly nonlinear, then a linearization-based tightening for each of the inequality constraints can be exact or sufficiently accurate, given the covariance matrices for the predicted state values at each time step in the control horizon. Some embodiments of the invention are based on the realization that, if constraint functions in the probabilistic chance constraints are highly nonlinear, then a linearization-based tightening may be inaccurate but, alternatively, ADFs can be used to directly compute high-accuracy mean and covariance information for each of the constraint functions that depend nonlinearly on the state and/or control input variables.

For example, it is known that unscented Kalman filtering (UKF) is more accurate than a linearization-based propagation of mean and covariance information, e.g., using extended Kalman filtering (EKF), for nonlinear system dynamics. Some embodiments of the invention are based on the realization that UKF is a special case of a more general family of linear-regression Kalman filtering (LRKF), which is part of an even more general family of Gaussian-assumed density filters (ADF). Some embodiments of the invention are based on the realization that ADFs use a statistical linearization, based on approximated matching of one and/or multiple higher order moment integrals, instead of an explicit linearization based on a Taylor series approximation (e.g., in the EKF). Therefore, the EKF is a first-order method based on explicit linearization to handle nonlinearities, while the family of ADFs based on statistical linearization can achieve second or higher order of accuracy in the propagation of mean and covariance information of the state variables through the nonlinear system dynamics.

Some embodiments of the invention are based on the realization that the accuracy of state mean and covariance predictions are important, when approximating the stochastic optimal control problem (SOCP) by a tractable nonlinear program (NLP), for performance and safety constraints satisfaction in stochastic predictive control of nonlinear dynamical systems under uncertainty. For example, notions as consistency, i.e., $\mathrm{Cov}[x] \leq P$ for a predicted matrix $P$ to over-approximate the real state covariance, can be important for conservativeness of the stochastic predictive controller, especially when taking into account safety-critical constraints. Some embodiments of the invention are based on the realization that a biased or inconsistent prediction, i.e., an under-approximation of the state covariance, may lead to violations of safety-critical constraints by the predictive controller in the presence of model uncertainties and/or external disturbances.

In some embodiments of the invention, an ADF is applied to the continuous time system dynamics in order to obtain continuous time equations for the propagation of mean and covariance information of the state variables. The resulting continuous time OCP can be solved based on a time discretization and optimal control parametrization, e.g., using direct single shooting, multiple shooting, direct collocation or pseudospectral methods, in order to arrive at a tractable nonlinear optimization problem that can be solved with a numerical optimization algorithm.

In some embodiments of the invention, an ADF is applied to the discrete time or discretized system dynamics in order to obtain discrete time equations for the propagation of mean and covariance information of the state variables. Some embodiments are based on the realization that the discrete-time covariance propagation equations can reduce the computational cost and preserve positive definiteness of the covariance matrices at each control time step. Some embodiments can include nonlinearity bounders in the covariance propagation to ensure that the covariance matrices are an overestimate of the exact covariance for the predicted state value at each time step, i.e., to result in consistent predictions, such that each of the probabilistic chance constraints ensures that the probability of violations is below a certain threshold value.

Some embodiments of the invention are based on the realization that the feedback control action should be taken into account in the forward propagation of the mean and covariance uncertainty information for the predicted state values. Some embodiments use a time-invariant or a time-varying sequence of affine feedback gains to pre-stabilize the nonlinear system dynamics, resulting in state mean and covariance propagation equations that directly consider the effects of feedback control actions on the uncertainties and/or disturbances in the future. For example, the infinite-horizon linear-quadratic regulator for the linearized system dynamics at reference steady state and input values could be used to pre-stabilize the system dynamics in the stochastic nonlinear OCP formulation.

Using an approximate formulation of the probabilistic chance constraints, based on an individual tightening for each of the inequality constraints, the resulting inequality constrained nonlinear dynamic optimization problem can be solved using a Newton-type optimization algorithm that is based on successive linearization of the optimality and feasibility conditions. Examples of such Newton-type optimization algorithms include interior point methods (IPM) and sequential quadratic programming (SQP). Some embodiments of the invention are based on the realization that an SQP algorithm solves a quadratic program (QP) approximation for the stochastic nonlinear OCP at each iteration of the SQP optimization algorithm, based on a linear-quadratic approximation of the objective function and a linearization-based approximation for the discretized system dynamics and the discrete-time covariance propagation equations and a linearization-based approximation for each of the inequality constraints and for each of the tightened probabilistic chance constraints.

When the original dynamical model of the system is described by a set of continuous-time differential equations, some embodiments of the invention discretize the system dynamics using an explicit or implicit numerical integration method, e.g., an explicit or implicit Runge-Kutta method, to construct the discrete-time or discretized ADF-based state mean and covariance propagation equations. Some embodiments are based on the realization that a linearization for the state mean and covariance propagation equations, in each iteration of a Newton-type optimization algorithm, requires the evaluation of first and/or higher order derivatives for the nonlinear system dynamics, which can form a computationally expensive step in case the dynamics are highly dimensional and/or computationally complex, e.g., in case they involve lengthy nonlinear expressions and/or if they are described by a set of stiff or implicitly defined differential equations.

In some embodiments of the invention, the optimization variables in the stochastic OCP formulation include factors of a matrix factorization for the covariance matrices of the state variables in each time step of the control horizon, e.g., using a forward or reverse Cholesky factorization of the state covariance matrices. Some embodiments of the invention are based on the realization that the ADF-based state mean and covariance propagation equations can be reformulated in terms of the Cholesky factors, e.g., directly using a Cholesky factorization operator, such that only the Cholesky factors and not the state covariance matrices need to be included in the optimization variables. In addition, some embodiments of the invention are based on the realization that the trajectory of state covariance matrices can be computed from the corresponding trajectory of Cholesky factors, and therefore the state covariance matrices are guaranteed to be always positive definite at each control time step and at each iteration of any optimization algorithm.

Some embodiments of the invention are based on the realization that the (forward or reverse) Cholesky factorization is defined only for positive definite matrices, such that a small regularization term may need to be added in the ADF-based covariance propagation equations in order to ensure that the Cholesky factorization operator is defined everywhere. First and higher-order derivatives of the Cholesky factorization operator can be computed by a forward or backward mode of algorithmic differentiation techniques.

In addition, some embodiments of the invention are based on the realization that the computational complexity and the memory requirements for the solution by an exact derivative-based optimization algorithm for stochastic nonlinear predictive control is much larger than for a nominal implementation of NMPC that does not directly take the uncertainty into account. More specifically, for solving the block-structured QP approximation in nominal NMPC, the memory requirements scale asymptotically as $O(Nm^2)$, in which N denotes the length of the control horizon and m denotes the number of state and control variables at each time step in the control horizon. In addition, the computational complexity scales asymptotically as $O(Nm^3)$ when solving the block-structured QP in nominal NMPC. Some embodiments of the invention are based on the realization that the memory requirements and the computational complexity of an exact derivative-based optimization algorithm for SNMPC scales asymptotically as $O(Nm^4)$ and $O(Nm^6)$, respectively, due to the m×m covariance matrices or factors in a Cholesky matrix factorization for the predicted state values at each time step and the corresponding state mean and covariance propagation equations.

Some embodiments of the invention propose instead an inexact derivative-based optimization algorithm for ADF-based SNMPC for which the memory requirements and the computational complexity scale asymptotically as $O(Nm^2)$ and $O(Nm^3)$, respectively. Some embodiments of the invention are based on an inexact SQP optimization algorithm that allows the numerical elimination of the Cholesky factors for the state covariance matrices from each QP subproblem while preserving the block-structured problem sparsity, resulting in a considerable reduction of the memory requirements and computational complexity. In addition, each QP subproblem in the inexact SQP algorithm includes only mean state and control variables over the control horizon, while the Cholesky factors and covariance matrices can be updated explicitly in a separate propagation procedure.

Some embodiments of the invention are based on the realization that an inexact derivative-based optimization algorithm converges to a solution of the stochastic nonlinear OCP that is feasible with respect to the system dynamics, covariance propagation equations, inequality constraints and probabilistic chance constraints, but the solution can be suboptimal due to the inexact derivative computations. Instead, some embodiments of the invention are based on an inexact derivative-based optimization algorithm, with adjoint-based gradient computations to correct for the use of inexact derivatives, that converges to a solution of the stochastic nonlinear OCP that is both feasible and locally optimal. Note that adjoint computations for the covariance propagation equations require the evaluation of first and/or higher order derivatives of the system dynamics but corresponding to a single gradient rather than a complete Jacobian matrix. In some embodiments, the latter adjoint gradient computations can be carried out efficiently using one sweep of an adjoint mode of algorithmic or automatic differentiation.

In some embodiments of the invention, the proposed inexact optimization algorithm for SNMPC, possibly with adjoint-based gradient computations, consists of three main computational steps. The first step prepares the linear-quadratic objective function, computes vectors and Jacobian matrices to prepare the linearized equality and inequality constraints, it evaluates the adjoint-based gradient computations and numerically eliminates the covariance matrices and/or Cholesky factors from each of the objective and constraint functions, given the current trajectory of predicted mean state and control values and current values of covariance matrices and/or Cholesky factors. The second step consists of the solution of the resulting block-structured QP subproblem, with one or multiple tightened inequality constraints to approximate each of the probabilistic chance constraints. The third and final step includes the Newton-type update for the trajectories of predicted state and control values, as well as an expansion of the corresponding update of Lagrange multipliers and an update for the trajectory of covariance matrices and/or Cholesky factors over the control horizon.

Some embodiments of the invention are based on the realization that globalization techniques may be needed to improve convergence behavior of a derivative-based optimization algorithm to solve the stochastic OCP problem, e.g., due to the highly nonlinear ADF-based state mean and covariance propagation equations. One example of such a globalization technique includes a line-search method to compute a step size in the Newton-type update of the primal and/or dual optimization variables, in order to ensure a sufficient decrease condition can be satisfied, of a merit function that depends both on optimality and feasibility conditions, for each iteration of the derivative-based optimization algorithm, e.g., using an SQP optimization method. In some embodiments of the invention, the latter line-search based step size selection for the Newton-type update of the primal and/or dual optimization variables can be part of the third step in the optimization algorithm for the SNMPC controller.

Some embodiments of the invention are based on the realization that, in addition to the covariance matrices and/or Cholesky factors, also the mean state variables in the stochastic optimal control problem can be eliminated numerically in each iteration based on a condensing procedure that uses the discrete-time system dynamics to define the state variables at each stage in the prediction horizon as a function of the initial state values and the control variables at all the previous stages in the prediction horizon. This complete or partial condensing procedure results in a smaller but generally denser optimization problem with less or no equality constraints and the same amount of inequality constraints and probabilistic chance constraints, which are described in terms of the remaining optimization variables in the OCP. Some embodiments of the invention are based on the realization that the same inexact derivative-based optimization algorithm can be used in combination with such a condensing procedure. More specifically, the numerical elimination of the mean state variables would additionally be performed in the first step, the dense QP solution would be performed in the second step, while the expansion of the condensed state variables would additionally be performed in the third step of the inexact optimization algorithm for SNMPC.

Some embodiments of the invention use a real-time iteration method for solving the nonlinear stochastic OCP by performing, at each control time step in a stochastic predictive controller, one iteration of the proposed exact or inexact derivative-based optimization algorithm. This means that, at each control time step, one needs to perform only one preparation, solution and expansion step for a block-structured local (convex) QP approximation of the nonlinear stochastic optimization problem. The QP preparation includes the linearization of the nonlinear equations that impose the discretized nonlinear system dynamics, the linearization of nonlinear inequality constraints, the condensing or elimination of the covariance matrices and/or Cholesky factors and the optional evaluation of the adjoint gradient computations. Based on this preparation, the resulting block-structured QP is solved, followed by an expansion step to update all primal optimization variables and Lagrange multiplier values, in order to produce the control solution that is used to control the system at each step of the stochastic nonlinear predictive controller.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6B shows a compact formulation of the optimal control structured NLP that needs to be solved by the stochastic predictive controller;

FIG. 6C is a block diagram of an exact Jacobian-based local quadratic program (QP) approximation of the optimal control structured NLP in the stochastic predictive controller, according to some embodiments of the invention.

FIG. 8C is an algorithmic description of a real-time variant for the adjoint-based inexact SQP optimization algorithm to implement stochastic nonlinear model predictive control, according to some embodiments of the invention;

DETAILED DESCRIPTION

Figure 1A:
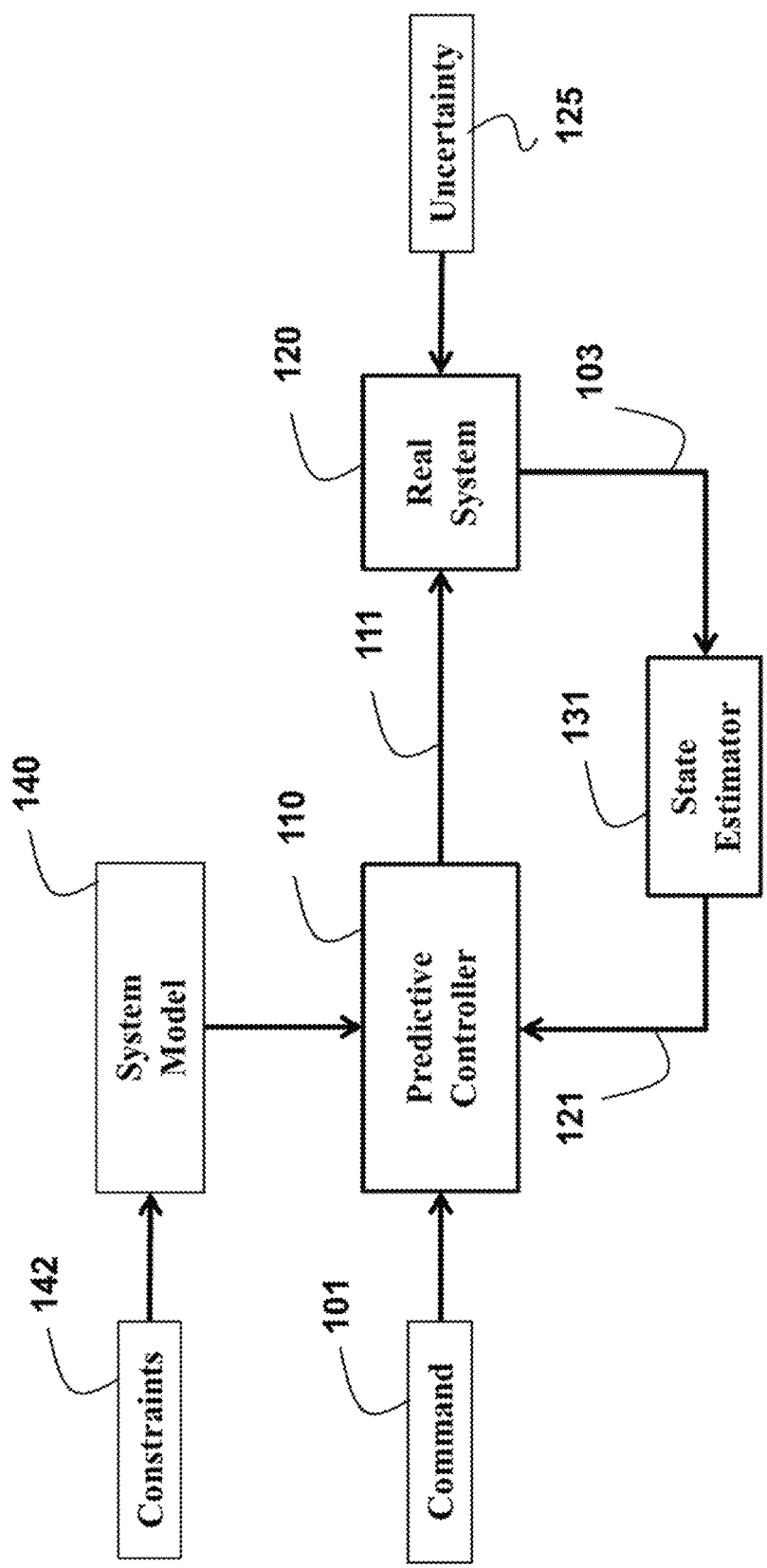
FIG. 1A is a block diagram of a predictive controller and feedback loop for a system with uncertainty according to some embodiments.

Various embodiments of the present invention are described hereafter with reference to the figures. It would be noted that the figures are not drawn to scale and elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Some embodiments of the invention provide a system and a method for controlling an operation of a system with uncertainty or a system using a stochastic predictive controller. An example of the stochastic predictive controller is a stochastic model predictive control (SMPC) determining control inputs based on a model of the controlled system and a model of the uncertainty.

FIG. 1A shows an example system 120 with uncertainty 125, connected to a predictive controller 110 via a state estimator 131 according to some embodiments. In some implementations, the predictive controller is a model predictive controller (MPC) programmed according to a dynamical model 140 of the system. The model can be a set of equations representing changes of the state and output 103 of the system 120 over time as functions of current and previous inputs 111 and previous outputs 103. The model can include constraints 142 that represent physical and operational limitations of the system. During the operation, the controller receives a command 101 indicating the desired behavior of the system. The command can be, for example, a motion command. In response to receiving the command 101, the controller generates a control signal 111 that serves as an input for the real system 120 with uncertainty 125. In response to the input, the system 120 updates the output 103 of the system 120. Based on measurements of the output 103 of the system, the state estimator 131 updates the estimated state 121 of the system 120. This estimated state 121 of the system provides the state feedback to the controller 110. In some cases, the measurements of the output 103 can be provided by sensors (not shown) arranged in the real system 120 or actuator(s)/circuit(s) of the real system 120. Further the uncertainty 125 may be observable/measurable physical quantities (signals) including external disturbances indicated by temperatures, pressures, or air flows or one or more combinations of them at one or more locations arranged on or around the real system 120, currents, forces or torques acting on the system 120, any unmodeled dynamics or any uncertainties in physical quantities such as uncertain friction coefficients, mass of a body or uncertain coefficients and parameters measured by the sensors or other sensors arranged on/in the real system 120.

The system 120, as referred herein, can be any machine or device controlled by certain manipulation input signals 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

The uncertainty 125 can be any time-varying uncertainties, including any external disturbances, forces or torques acting on the system 120, any unmodeled dynamics or any uncertainties in physical quantities such as uncertain friction coefficients, mass of a body or uncertain coefficients and parameters in the dynamical model equations that describe the physical behavior of the real system 120. Most implementations of MPC controllers use a simplified dynamical model 140, resulting in a large amount of the physical behavior in the real system to remain unmodeled, in order to reduce the computational complexity of the controller or because some of the physical behavior is too complex and therefore difficult or impossible to model. Note that time-invariant uncertainties can be estimated or learned, either online or offline, as part of the state and parameter estimator 131.

A dynamical model of the system 140 can include a set of mathematical equations, which may be time-invariant or time-varying and the equations that may be linear or non-linear, to describe how the system outputs change over time as functions of current and previous inputs, and the previous outputs. The state of the system is any set of information, in general time varying, for instance an appropriate subset of current and previous inputs and outputs, that, together with the dynamical model of the system and future inputs, can uniquely (but approximately) define the future motion of the system. The real system 120 can be subject to physical limitations and specification constraints 142 limiting the range where the outputs, the inputs, and also possibly the states of the system are allowed to operate.

The controller 110 can be implemented in hardware or as a software program executed in a processor, e.g., a microprocessor, which at fixed or variable control period sampling intervals receives the estimated state of the system 121 and the desired motion command 101 and determines, using this information, the inputs, e.g., the control signal 111, for operating the system.

The state estimator 131 and an uncertainty estimator 132 (in FIG. 1B) can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Figure 1B:
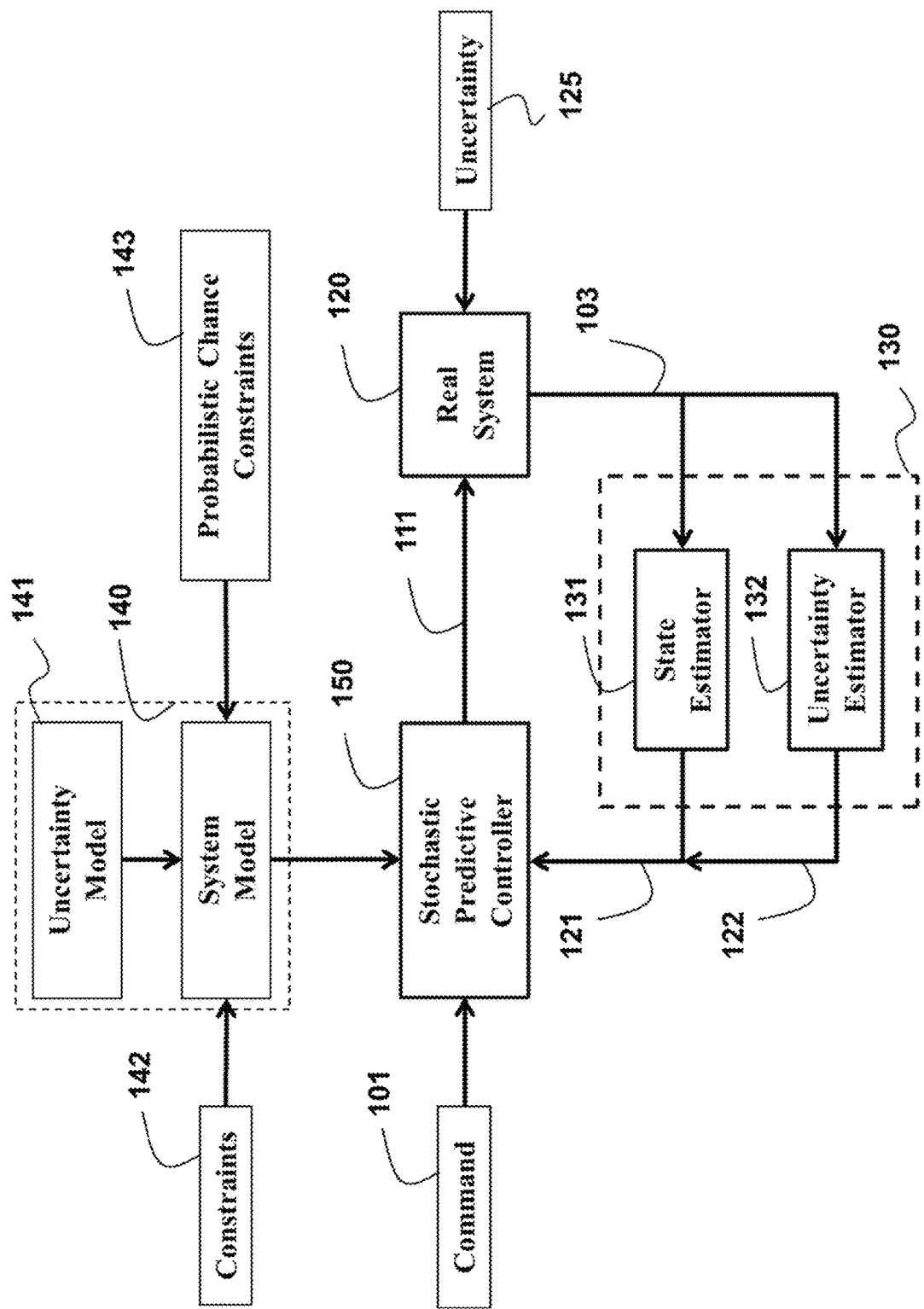
FIG. 1B is a block diagram of a stochastic predictive controller and feedback loop for a system with uncertainty according to some embodiments.

FIG. 1B shows an example system 120 with uncertainty 125, connected to a stochastic predictive controller 150 via a state estimator 131 and uncertainty estimator 132 according to some embodiments. In some implementations, the stochastic predictive controller 150 is a stochastic model predictive controller (SMPC) programmed according to a dynamical model 140 of the real system 120 and uncertainty. The dynamical model 141 includes an uncertainty model 141 to model the uncertainty 125 and its relation to the behavior of the system 120. The uncertainty model includes a model of the linear and/or nonlinear relations between the uncertainty and the dynamical model equations that describe the dynamic behavior of the system. In addition, the uncertainty model includes a model of the probability distributions for each of the time-varying uncertainties in the dynamical model.

In some embodiments of the invention, the dynamical model 140 for the stochastic predictive controller 150 can include one or multiple probabilistic chance constraints 143. Any of the physical limitations and specification constraints for the system can be formulated as one or multiple probabilistic chance constraints 143, which aim to enforce that the probability of violating the corresponding constraint is below a certain probability threshold value.

In some embodiments of the invention, the uncertainty estimator 132 provides estimates of the uncertainty 122, e.g., of the first and/or higher order moments of the probability distribution for one or multiple of the time-varying uncertainties in the dynamical model 140 that is used by the stochastic predictive controller 150. In some embodiments of the invention, the state estimator 131 and uncertainty estimator 132 are implemented together in a single state and uncertainty parameter estimator component 130, which at fixed or variable control period sampling intervals receives the outputs of the system 103 and determines, using the new and the previous output measurements, the estimated state 121 and estimated uncertainty 122, and possibly one or multiple additional estimated parameter values, of the system 120 and uncertainty 125.

Figure 1C:
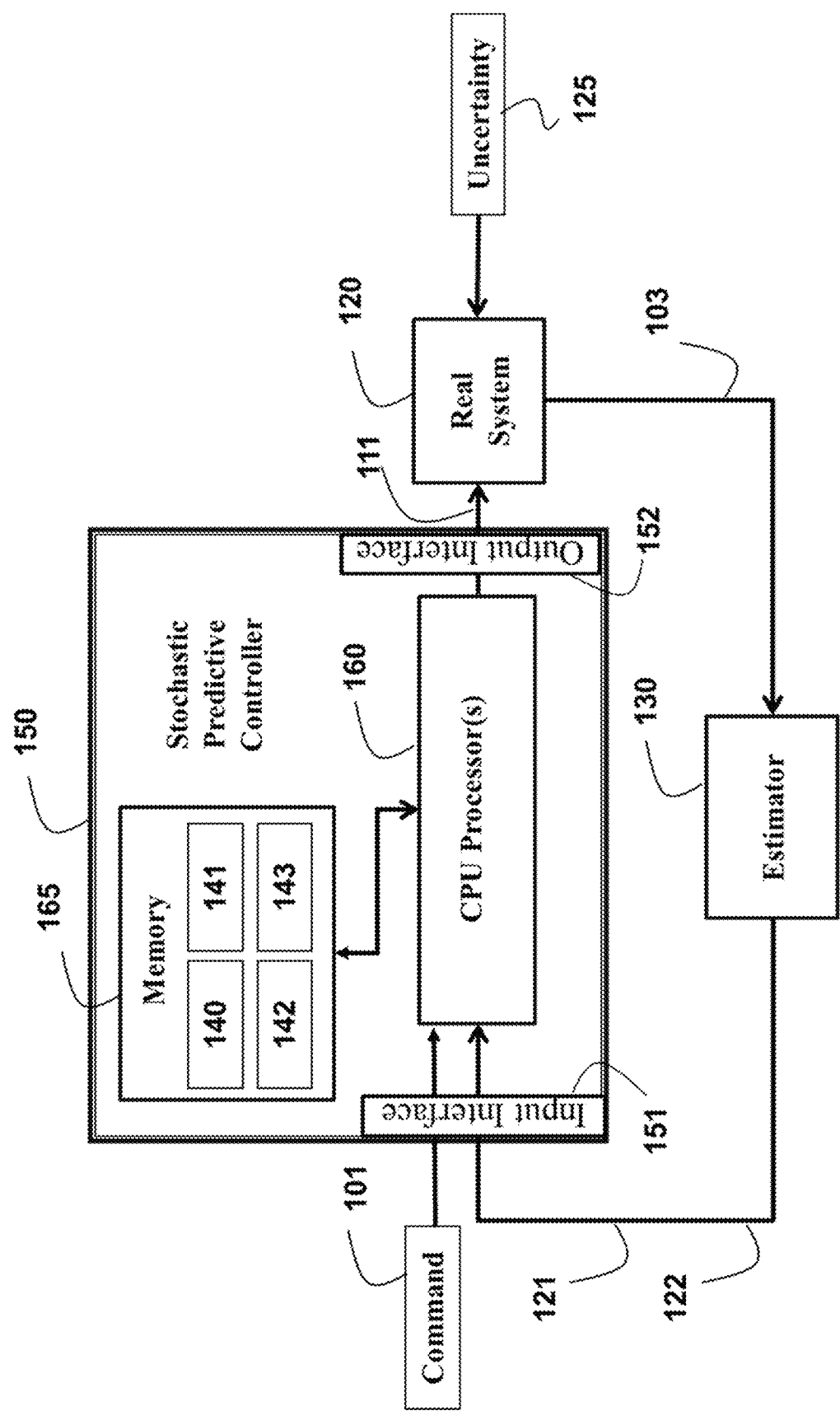
FIG. 1C is a block diagram of a controller, implemented using CPU processors and memory, and feedback system according to some embodiments of the invention.

FIG. 1C shows a block diagram of a stochastic predictive controller 150 according to some embodiments, which actuates the system such that the estimated state 121 of the system and output 103 follow a command 101, given the estimated uncertainty 122. The stochastic predictive controller 150 may include an input interface 151, an output interface 152, a computer, e.g., in the form of a single central processing unit (CPU) or multiple CPU processors 160 connected to memory 165 for storing the dynamical model 140, the uncertainty model 141, the constraints 142 and probabilistic chance constraints 143 on the operation of the real system 120 with uncertainty 125. The processor(s) 160 is configured to acquire/accept the estimated state 121 and the command 101 via the input interface 151 and to transmit the control signal 111 to the real system 120 via the output interface 152. The processor(s) 160 can be a single core microprocessor, a multi-core processor, a computing cluster, a network of multiple connected processors, or any number of other configurations. The memory 165 can include random access memory (RAM), read only memory (ROM), flash memory, or any other suitable memory systems.

Figure 2A:
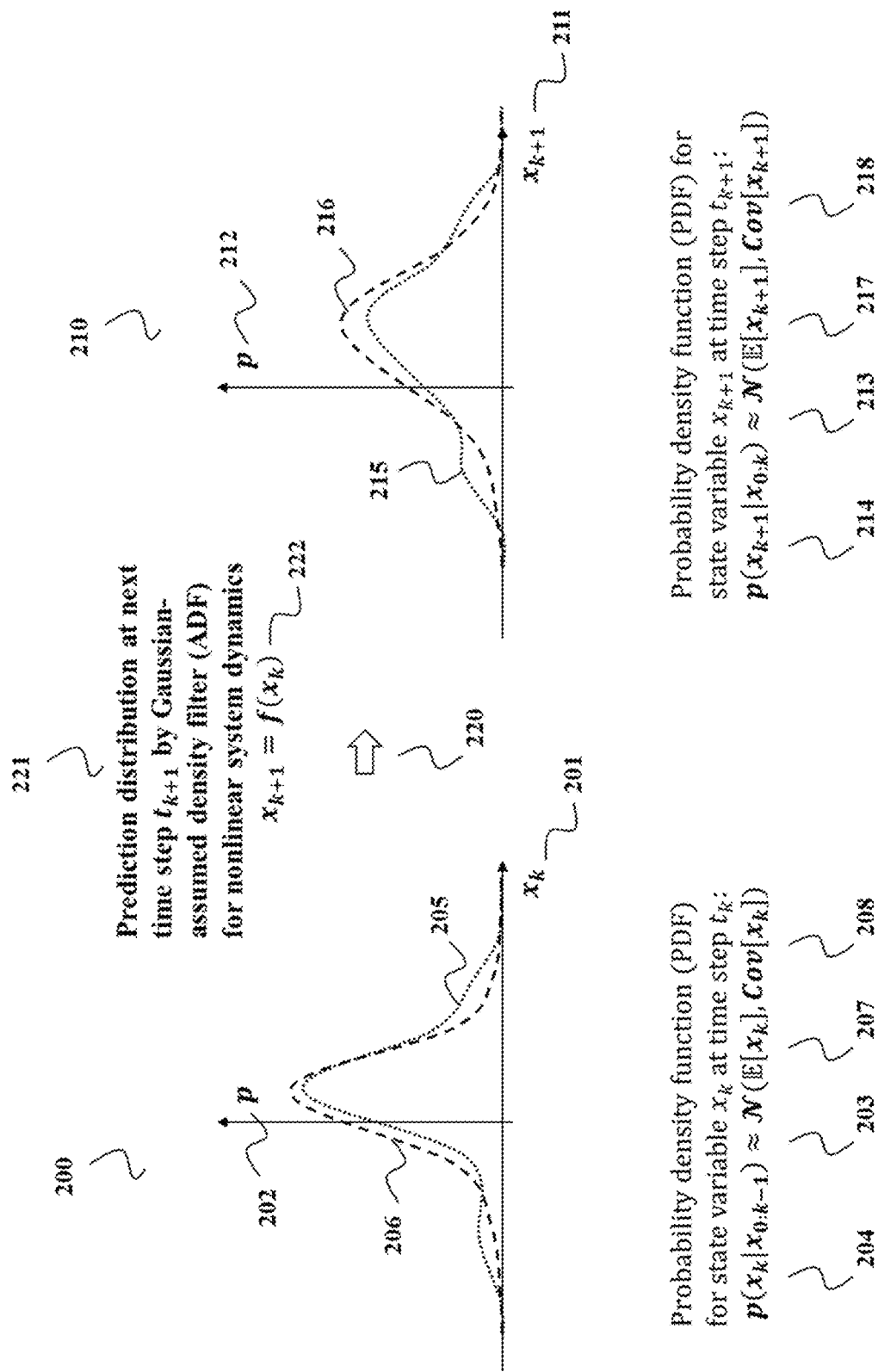
FIG. 2A shows a schematic of a prediction of the state probability distribution from one time step to the next, using a Gaussian-assumed density filter (ADF) for the nonlinear system dynamics, according to embodiments of the invention.

FIG. 2A shows a schematic of a prediction of the state probability distribution from one time step to the next 221, using a Gaussian-assumed density filter for the nonlinear system dynamics $x_{k+1}=f(x_k)$ 222. The schematic illustrates a probability density function (PDF) for the state variable at time step $t_k$ 200, which represents the probability p 202 with respect to the state variable $x_k$ 201. Some embodiments of the invention are based on an approximation of a true PDF 205 for the state variable $x_k$ at time step $t_k$ by an approximate Gaussian probability distribution 206, e.g., using a Gaussian-assumed density filter (ADF) approach. More specifically, in some embodiments of the invention, the conditional PDF $p(x_k|x_{0:k-1})$ 204, for the state variable $x_k$ given a trajectory of previous state values $x_{0:k-1}=[x_0, x_1, \ldots, x_{k-1}]$, can be approximated 203 by a Gaussian PDF distribution with a mean value $\mathbb{E}[x_k]$ 207 and a state covariance $\text{Cov}[x_k]$ 208. In some embodiments of the invention, the conditional stochastic predictive control for nonlinear dynamical systems under uncertainty can be approximated by a Gaussian PDF distribution with an approximate mean value $s_k$ and an approximate state covariance matrix $P_k$, i.e., $p(x_k|x_{0:k-1}) \approx \mathcal{N}(\mathbb{E}[x_k], \text{Cov}[x_k]) \approx \mathcal{N}(s_k, P_k)$.

In some embodiments of the invention, the Gaussian approximation $p(x_k|x_{0:k-1}) \approx \mathcal{N}(\mathbb{E}[x_k], \text{Cov}[x_k])$ for the PDF of the state variable $x_k$ at time step $t_k$ 200 is used, from one time step to the next 220, to compute an approximate prediction of the state probability distribution at the next time step $t_{k+1}$ 210, e.g., using an ADF for the nonlinear system dynamics 222, resulting in a Gaussian approximation $p(x_{k+1}|x_{0:k}) \approx \mathcal{N}(\mathbb{E}[x_{k+1}], \text{Cov}[x_{k+1}])$ 213 for the conditional PDF of the state variable $x_{k+1}$ at time step $t_{k+1}$ 210. In some embodiments of the invention, given the Gaussian PDF approximation 206, a predicted Gaussian distribution 216 can be computed to approximate the true conditional PDF 215 for the probability 212 with respect to the state variable $x_{k+1}$ 211 at the next time step $t_{k+1}$, given a trajectory of previous state values $x_{0:k}=[x_0, x_1, \ldots, x_k]$. More specifically, in some embodiments of the invention, the conditional PDF $p(x_{k+1}|x_{0:k})$ 214, for the predicted state variable $x_{k+1}$ given a trajectory of previous state values $x_{0:k}$, can be approximated 213 by a Gaussian PDF distribution with a mean value $\mathbb{E}[x_{k+1}]$ 217 and a state covariance $\text{Cov}[x_{k+1}]$ 218. In some embodiments of the invention, the conditional PDF for the predicted state variable $x_{k+1}$ can be approximated by a Gaussian PDF distribution with an approximate mean value $s_{k+1}$ and an approximate state covariance matrix $P_{k+1}$, i.e., $p(x_{k+1}|x_{0:k}) \approx \mathcal{N}(\mathbb{E}[x_{k+1}], \text{Cov}[x_{k+1}]) \approx \mathcal{N}(s_{k+1}, P_{k+1})$.

In some embodiments of the invention, a Gaussian-assumed density filter can use the approximate state mean and covariance $s_k$ and $P_k$ for the Gaussian PDF approximation $p(x_k|x_{0:k-1}) \approx \mathcal{N}(s_k, P_k)$ at the time step $t_k$ 200, and using the nonlinear system dynamics 222, to predict 220 the approximate state mean and covariance $s_{k+1}$ and $P_{k+1}$ for the Gaussian PDF approximation $p(x_{k+1}|x_{0:k}) \approx \mathcal{N}(s_{k+1}, P_{k+1})$ at the next time step $t_{k+1}$ 210. Some embodiments of the invention are based on the realization that notions as consistency, i.e., $\text{Cov}[x] \leq P$ for a predicted state covariance matrix P to over-approximate the true state covariance $\text{Cov}[x]$, can be important and/or desirable for conservativeness of the stochastic predictive controller for the controlled system under uncertainty, especially when taking into account safety-critical constraints. Some embodiments of the invention are based on the realization that a biased or inconsistent prediction, i.e., an under-approximation of the state covariance, may lead to violations of safety-critical constraints by the predictive controller in the presence of model uncertainties and/or in the presence of external disturbances.

Figure 2B:
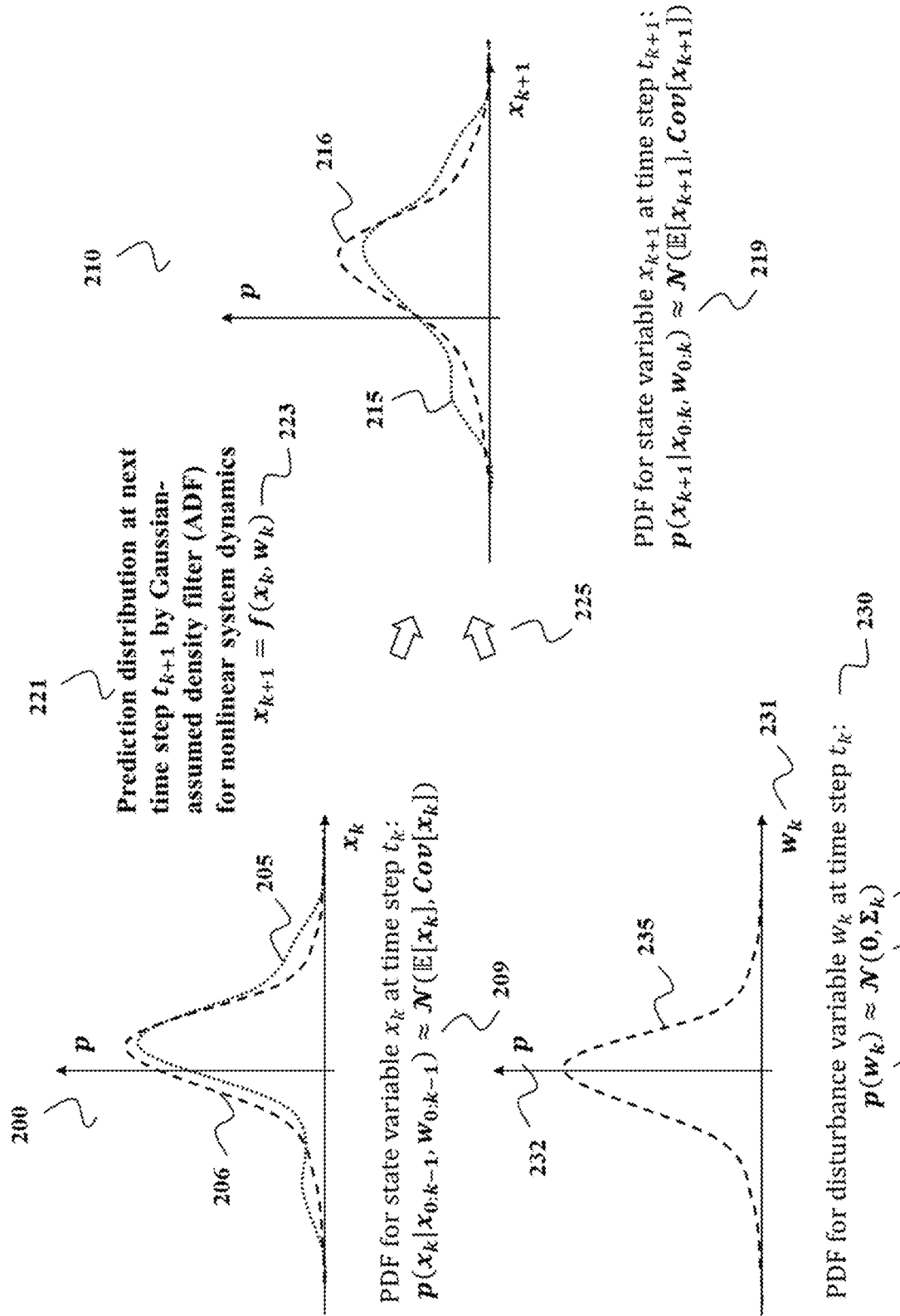
FIG. 2B shows a schematic of a prediction of the state probability distribution, including time-varying uncertainties and/or disturbances affecting the nonlinear system dynamics, according to some embodiments of the invention.

FIG. 2B shows a schematic of a prediction of the state probability distribution from one time step to the next 221, using a Gaussian-assumed density filter for the nonlinear system dynamics $x_{k+1}=f(x_k, w_k)$ 223, including one or multiple (time-varying) modeling uncertainties and/or external disturbances $w_k$. In some embodiments of the invention, the true PDF for the uncertainties or disturbance variables $w_k$ 231 can be approximated by a Gaussian distribution 235, i.e., $p(w_k) \approx \mathcal{N}(0, \Sigma_k)$ at time step $t_k$ 230. In some embodiments of the invention, the mean value for the Gaussian PDF 235 of the disturbance variable $w_k$ 231 can be either zero $\mathbb{E}[w_k] \approx 0$ or non-zero 237, depending on the nature of the modeling uncertainties and/or external disturbances in the controlled system. Some embodiments of the invention are based on the realization that an over-approximation of the covariance 238 for the Gaussian distribution 235, to approximate the PDF 234 for the disturbance variable $w_k$ 231, i.e., $\Sigma_k \geq \text{Cov}[w_k]$ may lead to an increased conservativeness and potentially an overall improved performance of the stochastic predictive controller for the controlled system under uncertainty, especially when taking into account safety-critical constraints.

The schematic in FIG. 2B illustrates that, in some embodiments of the invention, the Gaussian approximation $p(x_k|x_{0:k-1}, w_{0:k-1}) \approx \mathcal{N}(\mathbb{E}[x_k], \text{Cov}[x_k])$ for the PDF of the state variable $x_k$ at time step $t_k$ 200 and the (approximate) Gaussian PDF $p(w_k) \approx \mathcal{N}(0, \Sigma_k)$ for the disturbance variable $w_k$ at time step $t_k$ 230 can be used, from one time step to the next 225, to compute an approximate prediction of the state probability distribution at the next time step $t_{k+1}$ 210, e.g., using an ADF for the nonlinear system dynamics with modeling uncertainties and/or external disturbances 223, resulting in a Gaussian approximation $p(x_{k+1}|x_{0:k}, w_{0:k}) \approx \mathcal{N}(\mathbb{E}[x_{k+1}], \text{Cov}[x_{k+1}])$ 219 for the conditional PDF of the state variable $x_{k+1}$ at time step $t_{k+1}$ 210. In some embodiments of the invention, given the Gaussian PDF approximation 206 for the state variable $x_k$ and given the Gaussian PDF approximation 235 for the disturbance variable $w_k$, a predicted Gaussian PDF distribution 216 can be computed to approximate the true conditional PDF 215 of the state variable $x_{k+1}$ at the next time step $t_{k+1}$, given a trajectory of previous state values $x_{0:k}=[x_0, x_1, \ldots, x_k]$ and given a trajectory of disturbance values $w_{0:k}=[w_0, w_1, \ldots, w_k]$. More specifically, in some embodiments of the invention, the conditional PDF for the predicted state variable $x_{k+1}$ can be approximated by a Gaussian PDF distribution with an approximate mean value $s_{k+1}$ and an approximate state covariance matrix $P_{k+1}$, i.e., $p(x_{k+1}|x_{0:k}) \approx \mathcal{N}(\mathbb{E}[x_{k+1}], \text{Cov}[x_{k+1}]) \approx \mathcal{N}(s_{k+1}, P_{k+1})$.

Some embodiments of the invention are based on the realization that an over-approximation of the state covariance $P_k \succeq \text{Cov}[x_k]$ and an over-approximation of the disturbance covariance $\Sigma_k \succeq \text{Cov}[w_k]$ at the time step $t_k$ may lead to an over-approximation of the predicted state covariance at the next time step $t_{k+1}$, i.e., $P_{k+1} \succeq \text{Cov}[x_{k+1}]$ and this may lead to an increased conservativeness and potentially an overall improved performance of the stochastic predictive controller for the controlled system under uncertainty, especially when taking into account safety-critical constraints.

Figure 2C:
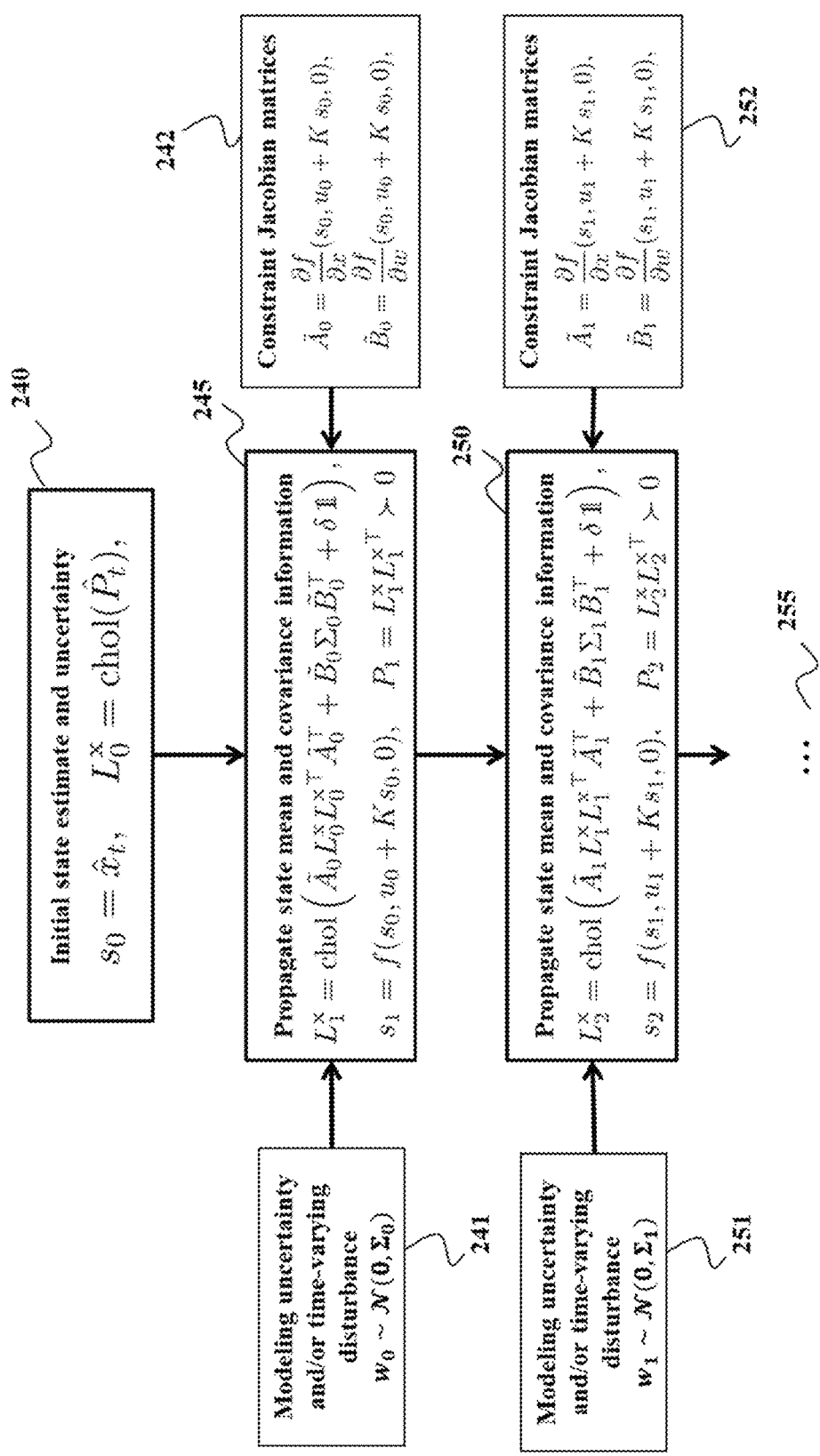
FIG. 2C is a block diagram of discrete-time or discretized propagation of state mean and covariance information, based on explicit linearization for the nonlinear system dynamics, according to some embodiments of the invention.

FIG. 2C shows a block diagram of a discrete-time or discretized propagation of state mean and covariance information, given an initial state estimate and corresponding uncertainty 240 and given a Gaussian approximation of the PDF distribution for the (time-varying) uncertainties and/or disturbances in the controlled system, using explicit linearization-based propagation equations for the discrete-time or discretized nonlinear system dynamics. In some embodiments of the invention, the discrete-time or discretized nonlinear system dynamics can be represented as $x_{k+1}=f(x_k, u_k, w_k)$, where $x_k$, $u_k$ and $w_k$ denote the state variables, the control inputs and the disturbance variables at time step $t_k$, respectively, and $x_{k+1}$ denotes the state variables at the next time step $t_{k+1}$. In some embodiments of the invention, the dynamical model of the controlled system can consist of a set of continuous-time differential equations, e.g., explicit and/or implicit ordinary differential equations (ODEs) or explicit and/or implicit differential-algebraic equations (DAEs). In some embodiments of the invention, the dynamical model of the controlled system can consist of a discretization of the set of continuous-time differential equations using a numerical integration method, e.g., using linear multistep methods, explicit or implicit Runge-Kutta methods, backward differentiation formulas or finite element methods.

The block diagram in FIG. 2C illustrates one or multiple steps of a linearization-based propagation of state mean and covariance information, e.g., including a first propagation step 245, followed by a propagation step 250 and potentially one or multiple additional propagation steps 255. The propagation procedure is based on an initial state estimate $s_0=\hat{x}_t$ and an initial state uncertainty, which can be represented by the state covariance $\hat{P}_t$ and/or by its Cholesky factor $L_0^x = \text{chol}(\hat{P}_t)$ such that $\hat{P}_t = L_0^x L_0^{x^T}$ or $\hat{P}_t = L_0^{x^T} L_0^x$, using either a forward or reverse Cholesky factorization, according to some embodiments of the invention. Given the initial state estimate and uncertainty 240, and given the modeling uncertainty and/or (time-varying) disturbance $w_0 \sim \mathcal{N}(0, \Sigma_0)$ 241 and given the differentiation-based constraint Jacobian matrices 242, the explicit linearization-based propagation equations can compute an approximation to the state mean and covariance information, $s_1$ and $P_1 = L_1^x L_1^{x^T}$ at the next time step 245 as follows $$L_1^x = \text{chol}(\tilde{A}_0 L_0^x L_0^{x^T} \tilde{A}_0^T + \tilde{B}_0 \Sigma_0 \tilde{B}_0^T + \delta \mathbb{1}),$$

$$s_1 = f(s_0, u_0 + K s_0, 0), \quad P_1 = L_1^x L_1^{x^T} \succ 0$$

and the constraint Jacobian matrices 242 are defined as follows $$\tilde{A}_0 = \frac{\partial f}{\partial x}(s_0, u_0 + K s_0, 0),$$

$$\tilde{B}_0 = \frac{\partial f}{\partial w}(s_0, u_0 + K s_0, 0),$$

where the matrix K denotes a feedback gain matrix to pre-stabilize the nonlinear system dynamics and chol(•) represents a forward or reverse Cholesky factorization. Some embodiments of the invention are based on the realization that a small regularization parameter value $\delta > 0$ can be used to ensure that the Cholesky factorization operator can be defined everywhere, i.e., to ensure that a positive semi-definite matrix becomes positive definite, and to ensure that the Cholesky factorization operator can be differentiated to evaluate first and/or higher order derivatives for the implementation of the stochastic predictive controller in some embodiments of the invention.

Similarly, given the state mean and covariance information, $s_1$ and $P_1 = L_1^x L_1^{x^T}$ at one time step 245, and given the modeling uncertainty and/or (time-varying) disturbance $w_1 \sim \mathcal{N}(0, \Sigma_1)$ 251 and given the differentiation-based constraint Jacobian matrices 252, the explicit linearization-based propagation equations can compute an approximation to the state mean and covariance information, $s_2$ and $P_2 = L_2^x L_2^{x^T}$ at the next time step 250 as follows $$L_2^x = \text{chol}(\tilde{A}_1 L_1^x L_1^{x^T} \tilde{A}_1^T + \tilde{B}_1 \Sigma_1 \tilde{B}_1^T + \delta \mathbb{1}),$$

$$s_2 = f(s_1, u_1 + K s_1, 0), \quad P_2 = L_2^x L_2^{x^T} \succ 0$$

where the constraint Jacobian matrices 252 are defined as follows $$\tilde{A}_1 = \frac{\partial f}{\partial x}(s_1, u_1 + K s_1, 0),$$

$$\tilde{B}_1 = \frac{\partial f}{\partial w}(s_1, u_1 + K s_1, 0),$$

Finally, one or multiple additional steps 255 can be performed in the discrete-time or discretized propagation of state mean and covariance information, using explicit linearization-based propagation equations for the discrete-time or discretized nonlinear system dynamics, according to some embodiments of the invention.

Figure 2D:
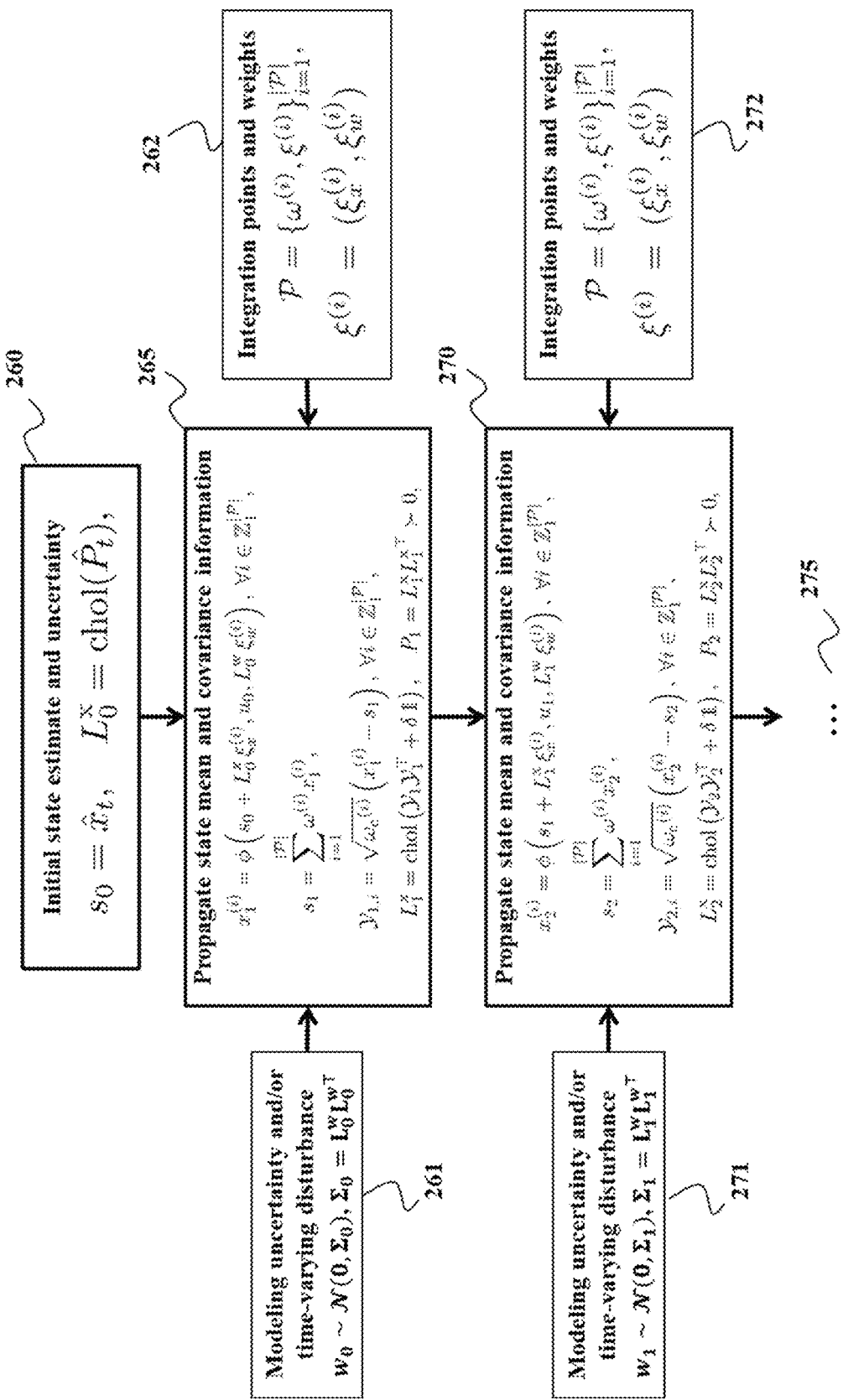
FIG. 2D is a block diagram of discrete-time or discretized propagation of state mean and covariance information, based on statistical linearization for the nonlinear system dynamics, according to some embodiments of the invention.

FIG. 2D shows a block diagram of a discrete-time or discretized propagation of state mean and covariance information, given an initial state estimate and corresponding uncertainty 260 and given a Gaussian approximation of the PDF distribution for the (time-varying) uncertainties and/or disturbances in the controlled system, using statistical linearization-based propagation equations for the discrete-time or discretized nonlinear system dynamics. Some embodiments of the invention are based on the realization that ADFs use a statistical linearization, based on approximated matching of one and/or multiple higher order moment integrals, instead of an explicit linearization based on a Taylor series approximation (e.g., in the EKF) as illustrated in FIG. 2C. For example, in some embodiments of the invention, numerical integration or cubature rules can be used in ADFs to approximate the first and/or second order moment integrals $$\mathbb{E}[x_k+1] = \int_{\mathbb{R}^n} F(v) p(v) dv,$$

$$\text{Cov}[x_k+1] = \int_{\mathbb{R}^n} (F(v) - \mathbb{E}[\cdot])(F(v) - \mathbb{E}[\cdot])^T p(v) dv,$$

given a Gaussian approximation $$p(v) \approx \mathcal{N}\left(\begin{bmatrix} \mathbb{E}[x_k] \\ 0 \end{bmatrix}, \begin{bmatrix} Cov[x_k] & 0 \\ 0 & \Sigma_k \end{bmatrix}\right)$$

of the PDF for the variables v=(x, w), which denotes the concatenation of the state x and disturbance variables w, and the function F(v)=f(x, u, w) represents the discrete-time or discretized nonlinear system dynamics. In some embodiments of the invention, ADF-type moment matching is used to compute approximations of the mean $s_{k+1} \approx \mathbb{E}[x_{k+1}]$ and of the covariance $P_{k+1} \approx Cov[x_{k+1}]$, resulting in a Gaussian approximation of the conditional PDF $$p(x_{k+1}|x_k) \approx \mathcal{N}(s_{k+1}, P_{k+1})$$

where $\mathcal{N}(\cdot)$ denotes a standard normal or Gaussian distribution for the predicted state variable $x_{k+1}$ at the next time step k+1.

Some embodiments of the invention are based on the realization that unscented Kalman filtering (UKF) can be used to compute a more accurate propagation of mean and covariance information than an explicit linearization-based propagation of mean and covariance information, e.g., using extended Kalman filtering (EKF), for nonlinear system dynamics. Some embodiments of the invention are based on the realization that UKF is a special case of a more general family of linear-regression Kalman filtering (LRKF), which is part of an even more general family of Gaussian-assumed density filters (ADF) that can be used in an implementation of the stochastic predictive controller for the controlled system under uncertainty. Some embodiments of the invention are based on the realization that ADFs use a statistical linearization, based on approximated matching of one and/or multiple higher order moment integrals, instead of an explicit linearization based on a Taylor series approximation (e.g., in the EKF). Therefore, the EKF is a first-order method based on explicit linearization to handle nonlinearities, while the family of ADFs based on statistical linearization can achieve second or higher order of accuracy in the discrete-time or discretized propagation of mean and covariance information of the state variables through the nonlinear system dynamics.

Some embodiments of the invention are based on the realization that, for certain classes of problems, statistical linearization based on matching of one and/or multiple higher order moment integrals can be performed analytically, which further improves the accuracy of the propagation of mean and covariance information and therefore further improves the performance of the stochastic predictive controller for the controlled system under uncertainty.

The block diagram in FIG. 2D illustrates an example of one or multiple steps of a statistical linearization-based propagation of state mean and covariance information using ADFs, e.g., including a first propagation step 265, followed by a propagation step 270 and potentially one or multiple additional propagation steps 275. The propagation procedure is based on an initial state estimate $s_0 = \hat{x}_t$ and an initial state uncertainty 260, which can be represented by the state covariance $\hat{P}_t$ and/or by its Cholesky factor $L_0^x = chol(\hat{P}_t)$ such that $\hat{P}_t = L_0^x L_0^{x^T}$ or $\hat{P}_t = L_0^{x^T} L_0^x$, using either a forward or reverse Cholesky factorization, according to some embodiments of the invention. Given the initial state estimate and uncertainty 260, and given the modeling uncertainty and/or (time-varying) disturbance $w_0 \sim \mathcal{N}(0, \Sigma_0)$ 261, for which $\Sigma_0 = L_0^w L_0^{w^T}$ or $\Sigma_0 = L_0^{w^T} L_0^w$ based on a Cholesky factorization, and given a set of one or multiple integration points and corresponding weights $\mathcal{P} = \{\omega^{(i)}, \xi^{(i)}\}_{i=1}^{|\mathcal{P}|}$ 262, the statistical linearization-based propagation equations can compute an approximation of the state mean and covariance information, $s_1$ and $P_1 = L_1^x L_1^{x^T}$ at the next time step 265 as $$x_1^{(i)} = \phi(s_0 + L_0^x \xi_x^{(i)}, u_0, L_0^w \xi_w^{(i)}), \forall i \in \mathbb{Z}_1^{|\mathcal{P}|},$$

$$s_1 = \sum_{i=1}^{|\mathcal{P}|} \omega^{(i)} x_1^{(i)},$$

$$y_{1,i} = \sqrt{\omega_c^{(i)}}(x_1^{(i)} - s_1), \forall i \in \mathbb{Z}_1^{|\mathcal{P}|},$$

$$L_1^x = chol(y_1 y_1^\top + \delta 1), \quad P_1 = L_1^x L_1^{x^\top} > 0,$$

where the function $\phi(s_k, u_k, w_k) = f(s_k, u_k + K s_k, w_k)$ denotes the pre-stabilized nonlinear system dynamics that are evaluated at each of the integration points $\xi^{(i)} = (\xi_x^{(i)}, \xi_w^{(i)})$ to compute the state values $x_1^{(i)}$ for i=1,2, ..., $|\mathcal{P}|$, the matrix K denotes a feedback gain matrix and chol(•) represents a forward or reverse Cholesky factorization. Some embodiments of the invention are based on the realization that the computed state values $x_1^{(i)}$ for each of the integration points, together with the corresponding weight values $\omega^{(i)}$ for i=1,2, ..., $|\mathcal{P}|$, can be used to compute an approximation of the state mean and covariance information, i.e., $s_1 \approx \mathbb{E}[x_1]$ and $P_1 \approx Cov[x_1]$. In some embodiments of the invention, the additional weight values $\omega_c^{(i)}$ are computed as $\omega_c^{(1)} = \omega^{(1)} + (1-\gamma^2+\beta)$ for a central integration point i=1 and given parameter values $\gamma$ and $\beta$, and $\omega_c^{(i)} = \omega^{(i)}$ corresponding to the remaining integration points i=2,3, ..., $|\mathcal{P}|$.

Similarly, given the state mean and covariance information, $s_1$ and $P_1 = L_1^x L_1^{x^T}$ at one time step 265, and given the modeling uncertainty and/or (time-varying) disturbance $w_1 \approx \mathcal{N}(0, \Sigma_1)$ 271, for which $\Sigma_1 = L_1^w L_1^{w^T}$ or $\Sigma_1 = L_1^{w^T} L_1^w$ based on a Cholesky factorization, and given a set of one or multiple integration points and corresponding weights $\mathcal{P} = \{\omega^{(i)}, \xi^{(i)}\}_{i=1}^{|\mathcal{P}|}$ $\mathcal{P} = \{\omega^{(i)}, \xi^{(i)}\}_{i=1}^{|\mathcal{P}|}$ 272, the statistical linearization-based propagation equations can compute an approximation of the state mean and covariance information, $s_2$ and $P_2 = L_2^x L_2^{x^T}$ at the next time step 270 as $$x_2^{(i)} = \phi(s_1 + L_1^x \xi_x^{(i)}, u_1, L_1^w \xi_w^{(i)}), \forall i \in \mathbb{Z}_1^{|\mathcal{P}|},$$

$$s_2 = \sum_{i=1}^{|\mathcal{P}|} \omega^{(i)} x_2^{(i)},$$

$$y_{2,i} = \sqrt{\omega_c^{(i)}}(x_2^{(i)} - s_2), \forall i \in \mathbb{Z}_1^{|\mathcal{P}|},$$

$$L_2^x = chol(y_2 y_2^\top + \delta 1), \quad P_2 = L_2^x L_2^{x^\top} > 0,$$

Finally, one or multiple additional steps 275 can be performed in the discrete-time or discretized propagation of state mean and covariance information, using statistical linearization-based propagation equations for the discrete-time or discretized nonlinear system dynamics of the controlled system under uncertainty, according to some embodiments of the invention. In some embodiments of the invention, a different set of integration points and weights can be used in one or multiple steps of the statistical linearization-based propagation equations.

In some embodiments of the invention, the integration points, weights and parameter values can be chosen according to a spherical cubature (SC) rule to approximate the first and/or second order moment integrals, based on a set of $|\mathcal{P}|=2n=2(n_x+n_w)$ integration points $\Xi=[\xi^{(1)}, \xi^{(2)}, \ldots, \xi^{(2n)}]$ and weights $\Omega=[\omega^{(1)}, \omega^{(2)}, \ldots, \omega^{(2n)}]$ as follows $$\Xi = \sqrt{n}\,[\mathbb{I}_n \;\; -\mathbb{I}_n], \quad \Omega = \frac{1}{2n}1_{2n}^\top,$$

where $n_x$ and $n_w$ denotes the number of state variables and disturbance variables in the controlled system, respectively, and $\mathbb{I}_n$ denotes the n×n identity matrix, and $1_{2n}$ denotes a column vector of 2n elements that are equal to one. The SC rule does not include a central integration point, i.e., $\gamma=1$ and $\beta=0$, such that $\omega_c^{(i)}=\omega^{(i)}$ for each of the integration points $i=1,2,\ldots,|\mathcal{P}|$.

In some embodiments of the invention, the integration points, weights and parameter values can be chosen according to an unscented transform (UT) as used in the UKF to approximate the first and/or second order moment integrals, based on a set of $|\mathcal{P}|=2n+1=2(n_x+n_w)+1$ integration points $\Xi=[\xi^{(1)}, \xi^{(2)}, \ldots, \xi^{(2n+1)}]$ and weights $\Omega=[\omega^{(1)}, \omega^{(2)}, \ldots, \omega^{(2n+1)}]$ as follows $$\Xi = \sqrt{(n+\lambda)}\,[0_n\,\mathbb{I}_n \;\; -\mathbb{I}_n], \quad \Omega = \frac{1}{\lambda+n}\left[\lambda \; \frac{1}{2}1_{2n}^\top\right],$$

where a parameter $\lambda=\gamma^2(n+\kappa)-n$ is defined based on a parameter value $\kappa$, and $\mathbb{I}_n$ denotes the n×n identity matrix, $0_n$ denotes a column vector of n elements that are equal to zero and $1_{2n}$ denotes a column vector of 2n elements that are equal to one. The UT rule does include a central integration point for which $\xi^{(1)}=0_n$ and $\omega_c^{(1)}=\omega^{(1)}+(1-\gamma^2+\beta)$. In some embodiments of the invention, the parameter values can be chosen, for example, as $$\gamma = \sqrt{\frac{3}{n}}, \; \beta = \frac{3}{n} - 1,$$

$\kappa=0$ such that $\lambda=\gamma^2(n+\kappa)-n=3-n$.

Figure 3A:
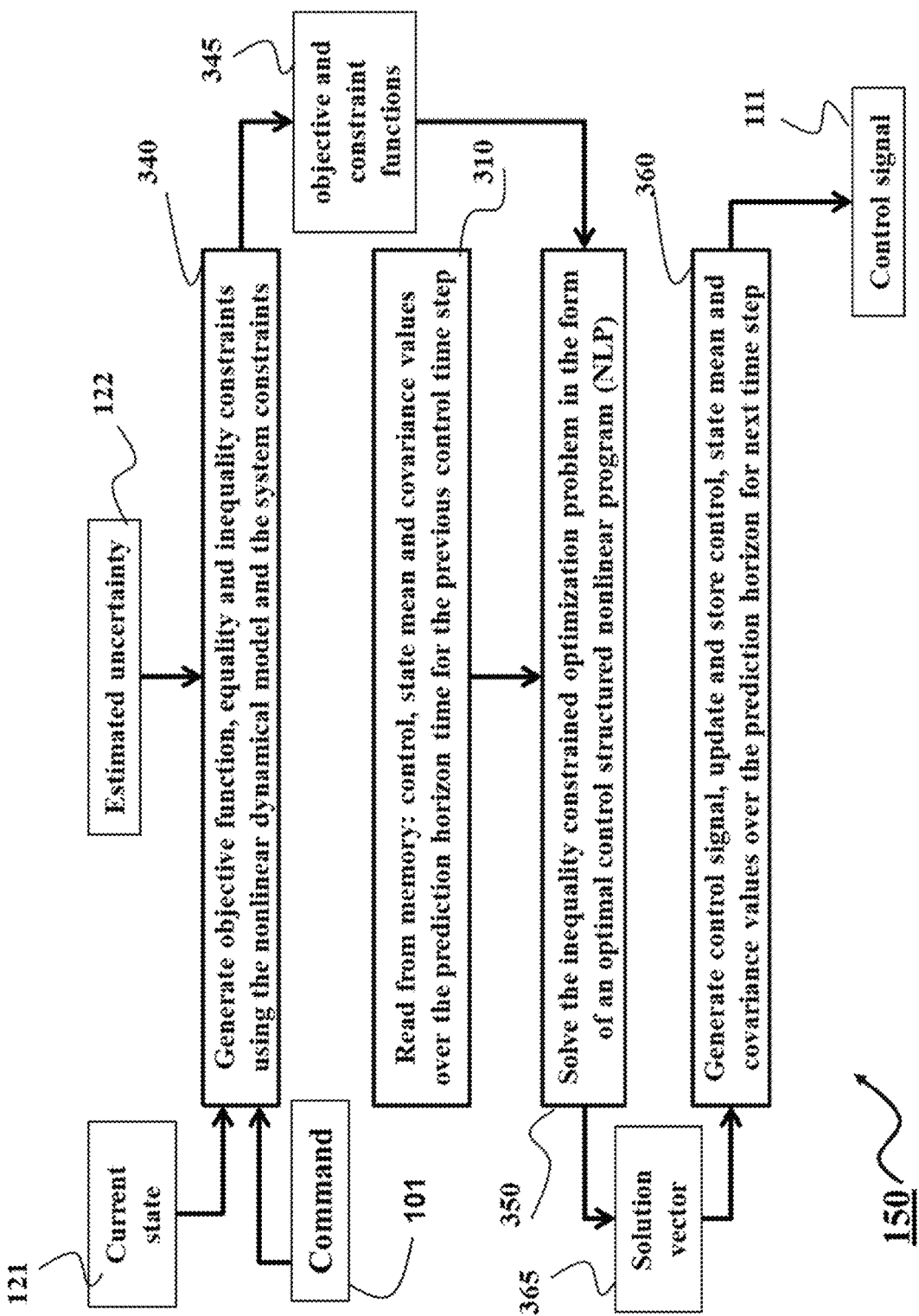
FIG. 3A is a block diagram of a stochastic nonlinear model predictive control (SNMPC) method to implement the stochastic predictive controller for the controlled system under uncertainty, according to some embodiments.

FIG. 3A shows a block diagram of a system and a method for stochastic nonlinear model predictive control (SNMPC) to implement the stochastic predictive controller 150 that computes the control signal 111, given the current state estimate of the system 121, given the estimated uncertainty 122 and a control command 101, according to some embodiments of the invention. Specifically, SNMPC computes a control solution, e.g., a solution vector 365 that includes a sequence of future optimal or approximately optimal control inputs over a prediction time horizon of the system 360, by solving a constrained optimization problem 350 at each control time step. The data 345 of the objective function, equality and inequality constraints in this optimization problem 350 depends on the dynamical model and system constraints 340, the current state estimate of the system 121, the estimated uncertainty 122 and the control command 101.

Embodiments of the invention use a direct optimal control method to formulate the continuous-time SNMPC problem as an inequality constrained nonlinear dynamic optimization problem. Some embodiments of the invention use a derivative-based optimization algorithm to solve the inequality constrained optimization problem 350 either exactly or approximately, using an iterative procedure that is based on a Newton-type method and the successive linearization of feasibility and optimality conditions for the optimization problem. Examples of such Newton-type optimization algorithms include interior point methods (IPM) and sequential quadratic programming (SQP). Some embodiments of the invention are based on the realization that the inequality constrained optimization problem 350 has the form of an optimal control structured nonlinear program (NLP), such that a structure exploiting implementation of a derivative-based optimization algorithm can be used to compute the solution vector 365 at each control time step.

In some embodiments of the invention, the solution of the inequality constrained optimization problem 350 uses the exact or approximate control inputs, state mean and/or covariance values over the prediction time horizon from the previous control time step 310, which can be read from the memory, as a solution guess in order to reduce the computational effort of solving the inequality constrained optimization problem 350 at the current control time step. This concept of computing a solution guess from the solution information at the previous control time step 310 is called warm-starting or hot-starting of the optimization algorithm and it can reduce the required computational effort of the SNMPC controller in some embodiments of the invention. In a similar fashion, the corresponding solution vector 365 can be used to update and store a sequence of exact or approximate control inputs, state mean and/or covariance values for the next control time step 360. In some embodiments of the invention, a time shifting procedure can be used, given the control inputs, state mean and/or covariance values over the prediction time horizon from the previous control time step 310, in order to compute a more accurate solution guess for the inequality constrained optimization problem 350 at the current control time step.

Figure 3B:
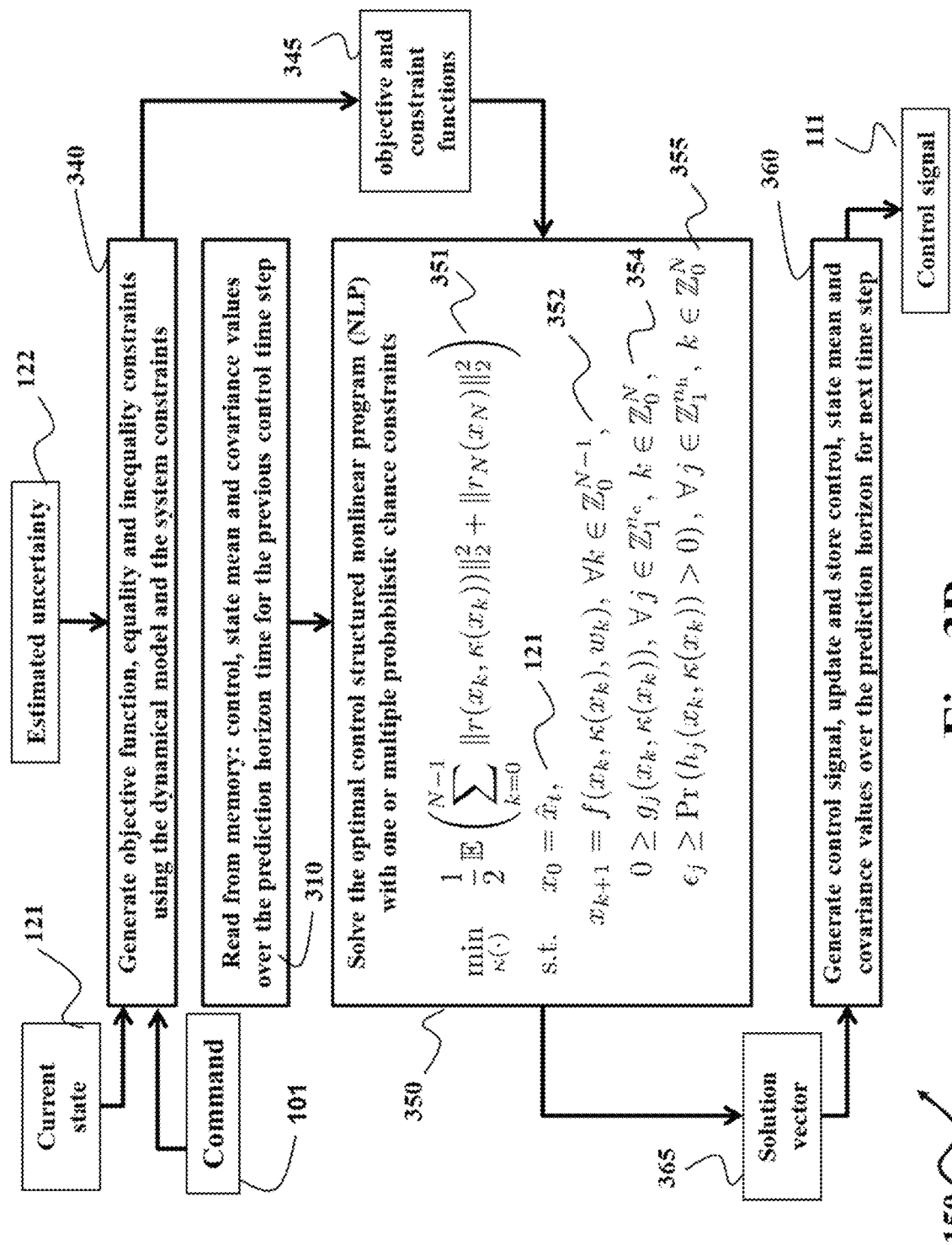
FIG. 3B is a block diagram of an SNMPC method that solves a direct optimal control structured nonlinear program (NLP), based on discrete-time system dynamics and probabilistic chance constraints, according to some embodiments.

FIG. 3B shows a block diagram of an SNMPC controller that solves a constrained optimal control structured nonlinear program (OCP-NLP) 350 in order to compute the control signal 111 at each control time step, given the current state estimate of the system 121, the estimated uncertainty 122 and the control command 101. In some embodiments of the invention, the constrained optimization problem 350 directly optimizes a time-invariant or time-varying control policy function $\kappa(\cdot)$, which can be implemented as a state-feedback or as an output-feedback predictive controller for the controlled system under uncertainty. In some embodiments of the invention, the constrained OCP-NLP 350 includes the state variables $x=[x_0, x_1, \ldots, x_N]$, where the initial state value can be defined based on the current state estimate $x_0=\hat{x}_t$ 121 and the future state values can be predicted based on nonlinear system dynamics $f(\cdot)$ in the nonlinear equality constraints 352, depending on the control policy function $\kappa(\cdot)$ and the time-varying uncertainties and/or disturbances $w_k$ over the prediction time horizon $k=0,1,\ldots,N-1$.

In some embodiments of the invention, the objective function for the constrained OCP-NLP 350 can correspond to a minimization of the expected value of a sum of linear and/or nonlinear least squares stage and/or terminal cost terms $\|r_k(\cdot)\|_2^2$ for $k=0,1,\ldots,N$ 351. In some embodiments of the invention, the objective function 351 can correspond to a minimization or maximization of the expected value or of a worst-case value for a smooth linear or nonlinear function of the control inputs, state mean and/or covariance values over the prediction time horizon.

In some embodiments of the invention, the constrained OCP-NLP 350 can include one or multiple deterministic inequality constraints $0 \geq g_j(\cdot)$, $j=1,2,\ldots,n_c$ 354 that are defined by smooth linear and/or nonlinear functions $g_j(\;)$ of the control inputs, state mean and/or covariance values over the prediction time horizon k=0,1, ..., N. Some embodiments of the invention are based on the realization that one or multiple of the deterministic inequality constraints 354 can be either convex or non-convex, which may affect the computational effort that is needed to solve the constrained optimization problem 350 at each control time step. In some embodiments of the invention, the constrained OCP-NLP 350 can include one or multiple probabilistic chance constraints $\epsilon_j \geq \Pr(h_j(\cdot)>0)$, j=1,2, ..., $n_h$ 355 that are defined by smooth linear and/or nonlinear functions $h_j(\ )$ of the control inputs, state mean and/or covariance values over the prediction time horizon k=0,1, ..., N. Some embodiments of the invention are based on the realization that each of the probabilistic chance constraints aims to ensure that the probability of violating the corresponding inequality constraint is below a certain probability threshold value, i.e., $\epsilon_j \leq \Pr(h_j(\cdot)>0)$ 355.

Figure 3C:
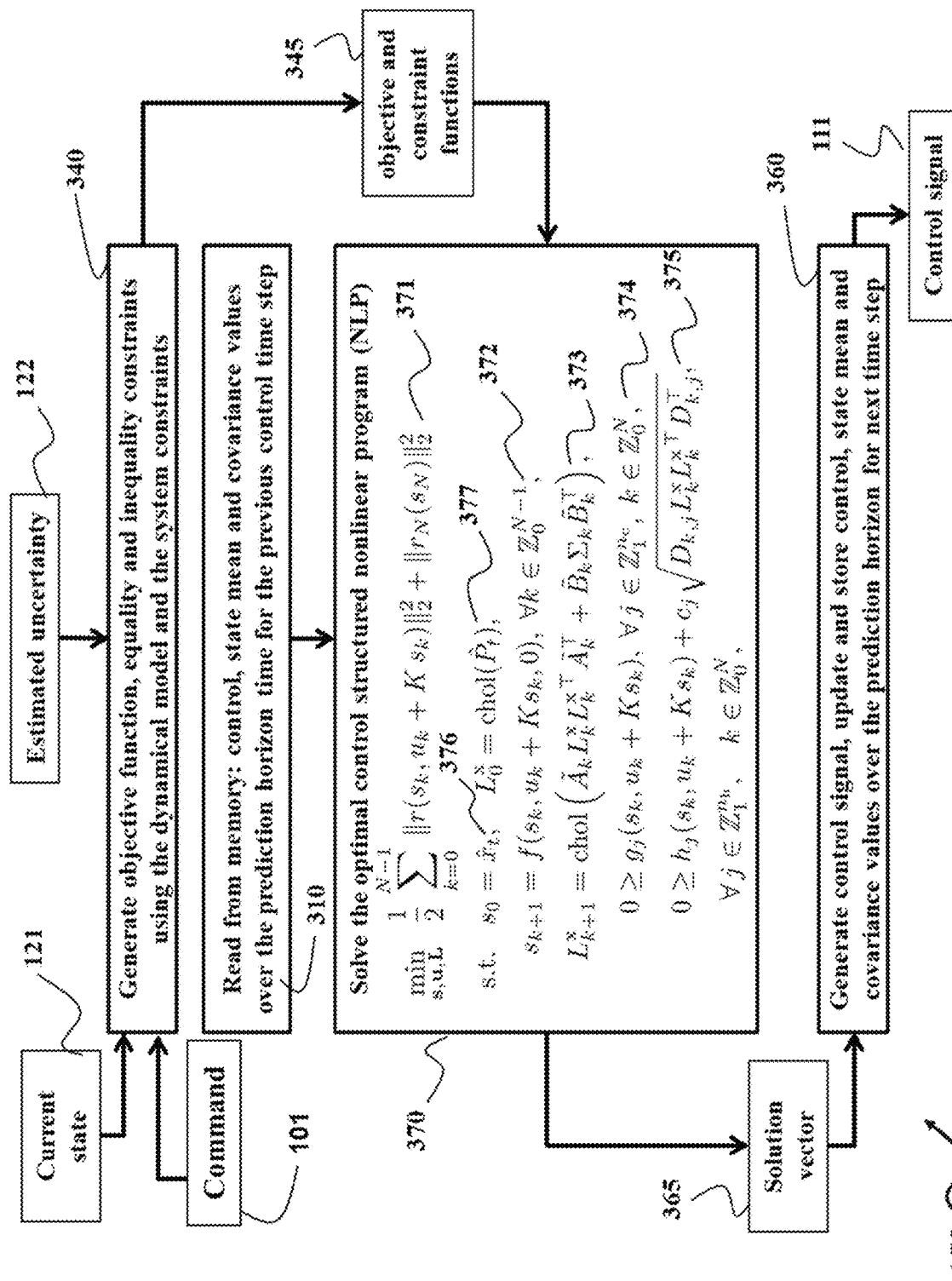
FIG. 3C is a block diagram of an SNMPC method that solves a direct optimal control structured NLP, based on explicit linearization-based propagation equations for the state mean and covariances, according to some embodiments.

FIG. 3C shows a block diagram of an SNMPC controller that solves a constrained optimal control structured nonlinear programming problem (OCP-NLP) 370, using explicit linearization-based state mean and covariance propagation equations as illustrated in FIG. 2C, in order to compute the control signal 111 at each control time step, given the current state estimate of the system 121, the estimated uncertainty 122 and the control command 101. The OCP-NLP 370 includes the mean state variables $s=[s_0, s_1, \ldots, s_N]$, the Cholesky factors of the state covariance matrix variables $L=[L_0^x, L_1^x, \ldots, L_N^x]$ and the control input variables $u=[u_0, u_1, \ldots, u_{N-1}]$ over the prediction time horizon as variables in the constrained optimization problem 350 that needs to be solved at each control time step:

$$\min_{s,u,L} \frac{1}{2} \sum_{k=0}^{N-1} \|r(s_k, u_k + K\,s_k)\|_2^2 + \|r_N(s_N)\|_2^2$$

$$\text{s.t. } s_0 = \hat{x}_t, \ L_0^x = \text{chol}(\hat{P}_t),$$

$$s_{k+1} = f(s_k, u_k + K\,s_k, 0), \ \forall\, k \in \mathbb{Z}_0^{N-1},$$

$$L_{k+1}^x = \text{chol}\!\left(\tilde{A}_k L_k^x L_k^{x\top} \tilde{A}_k^\top + \tilde{B}_k \sum_k \tilde{B}_k^\top\right),$$

$$0 \geq g_j(s_k, u_k + K s_k), \ \forall\, j \in \mathbb{Z}_1^{n_c}, k \in \mathbb{Z}_0^N,$$

$$0 \geq h_j(s_k, u_k + K s_k) + c_j \sqrt{D_{k,j} L_k^x L_k^{x\top} D_{k,j}^\top},$$

$$\forall\, j \in \mathbb{Z}_1^{n_h}, k \in \mathbb{Z}_0^N,$$

including a linear-quadratic or nonlinear objective function 371, e.g., based on a minimization of the expected value of a sum of linear and/or nonlinear least squares stage and/or terminal cost terms $\|r_k(\cdot)\|_2^2$ for k=0,1, ..., N 371. Some embodiments of the invention are based on the current state estimate 121 in an initial mean state value constraint $s_0=\hat{x}_t$ 376, the current estimated state uncertainty in an initial state covariance constraint $L_0^x=\text{chol}(\hat{P}_t)$ 377, such that the initial state covariance reads as $P_0=\hat{P}_t=L_0^x L_0^{x\top}$. Some embodiments of the invention are based on a dynamical model of the system that results in linear and/or nonlinear equality constraints 372 to compute the future mean state values over the prediction time horizon $s_1, \ldots, s_N$, and on an explicit linearization-based approximation of the uncertainty propagation through the system dynamics resulting in linear and/or nonlinear covariance propagation equations 373. In some embodiments of the invention, the covariance propagation equations 373 include a Cholesky factorization operator in order to compute the Cholesky factors for the future state covariance matrices $L_1^x, \ldots, L_N^x$, such that $P_1=L_1^x L_1^{x\top}, \ldots, P_N=L_N^x L_N^{x\top}$.

In some embodiments of the invention, the constrained optimization problem 370 can include constraints on a combination of control inputs, state mean and covariance variables, resulting in one or multiple linear and/or nonlinear deterministic inequality constraints 374 that are defined by smooth linear and/or nonlinear functions $g_j(\ )$ over the prediction time horizon k=0,1, ..., N. In addition, the constrained OCP-NLP 350 can include one or multiple probabilistic chance constraints $\epsilon_j \geq \Pr(h_j(\cdot)>0)$, j=1,2, ..., $n_h$ 355 that are defined by smooth linear and/or nonlinear functions $h_j(\ )$ of the control inputs, state mean and/or covariance values over the prediction time horizon k=0,1, ..., N. In some embodiments of the invention, the latter probabilistic chance constraints can be approximated by a constraint tightening reformulation as follows $$0 \geq h_j(s_k, u_k + K\,s_k) + c_j \sqrt{D_{k,j} L_k^x L_k^{x\top} D_{k,j}^\top}$$

where a back-off coefficient value $c_j > 0$ is computed based on the probability threshold value $\epsilon_j > 0$, the matrix $$D_{k,j} = \frac{\partial h_j}{\partial x_k}(\cdot)$$

is the constraint Jacobian, based on Cholesky factors of the state covariance matrix variables $L=[L_0^x, L_1^x, \ldots, L_N^x]$ and resulting in the additional linear and/or nonlinear tightened inequality constraints 375 over the prediction time horizon k=0,1, ..., N.

In some embodiments of the invention, the nonlinear equality constraints 372

$$s_{k+1} = f(s_k, u_k + K\,s_k, 0)$$

impose a discrete-time, approximate representation of the system dynamics that can be defined by a set of continuous time differential or a set of continuous time differential-algebraic equations. Examples of such a discrete-time, approximate representation of the system dynamics includes numerical simulation techniques, e.g., linear multistep methods, explicit or implicit Runge-Kutta methods, backward differentiation formulas or finite element methods. When the original dynamical model of the system is described by a set of continuous time differential equations, some embodiments of the invention discretize the system dynamics using an explicit or implicit numerical integration method 372 and the explicit linearization requires a corresponding Jacobian evaluation to construct the discrete-time or discretized covariance propagation equations 373.

Figure 3D:
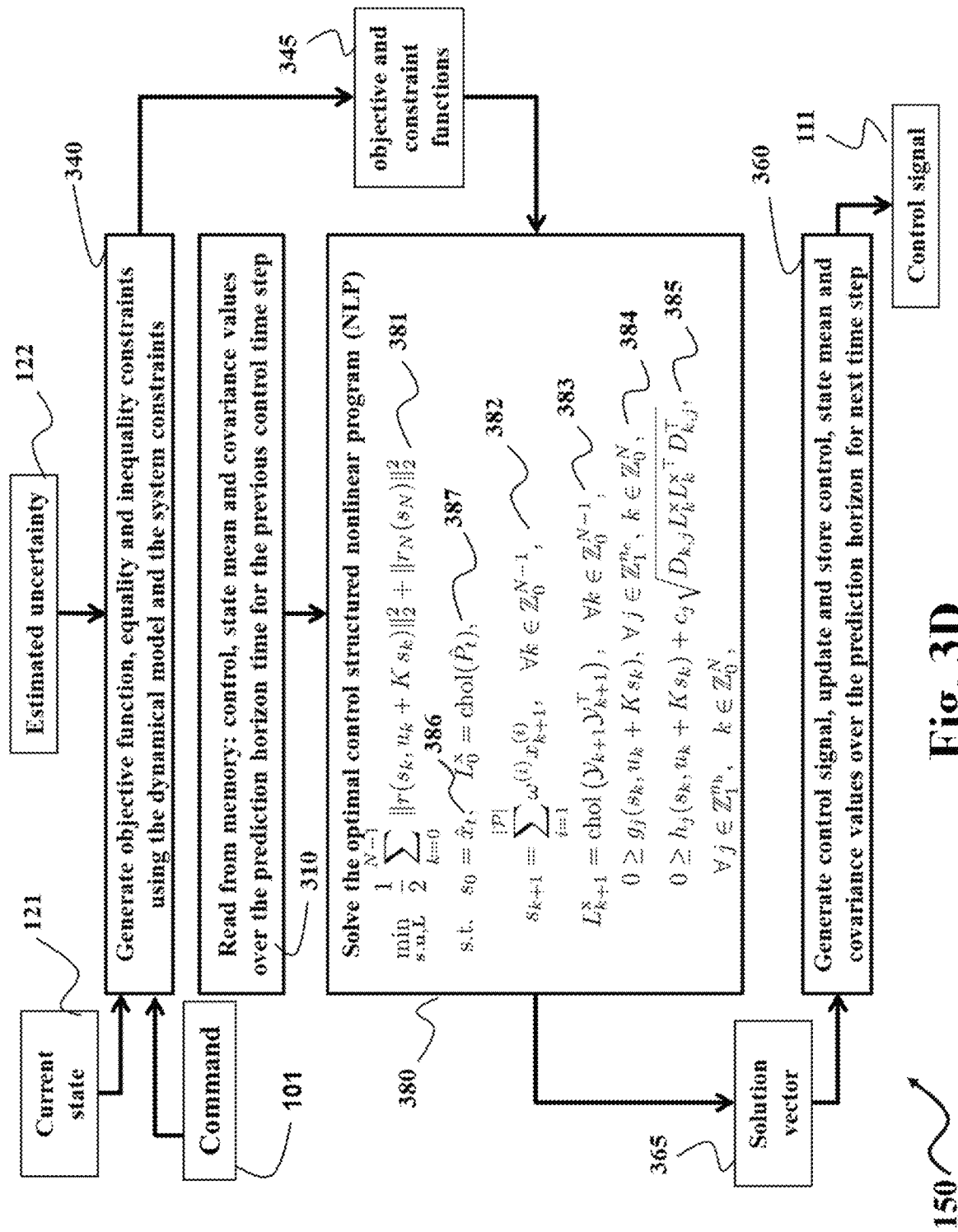
FIG. 3D is a block diagram of an SNMPC method that solves a direct optimal control structured NLP, based on statistical linearization-based propagation equations for the state mean and covariances, according to some embodiments.

FIG. 3D shows a block diagram of an SNMPC controller that solves a constrained optimal control structured nonlinear programming problem (OCP-NLP) 380, using statistical linearization-based state mean and covariance propagation equations as illustrated in FIG. 2D (e.g., using UKF-, LRKF- or ADF-based filtering), in order to compute the control signal 111 at each control time step, given the current state estimate of the system 121, the estimated uncertainty 122 and the control command 101. The OCP-NLP 380 includes the mean state variables $s=[s_0, s_1, \ldots, s_N]$, the Cholesky factors of the state covariance matrix variables $L=[L_0^x, L_1^x, \ldots, L_N^x]$ and the control input variables $u=[u_0, u_1, \ldots, u_{N-1}]$ over the prediction time horizon as variables in the constrained optimization problem 350 that needs to be solved at each control time step:

$$\min_{s,u,L} \frac{1}{2} \sum_{k=0}^{N-1} \|r(s_k, u_k + K s_k)\|_2^2 + \|r_N(s_N)\|_2^2$$

s.t. $s_0 = \hat{x}_t$, $L_0^x = \text{chol}(\hat{P}_t)$, $$s_{k+1} = \sum_{i=1}^{|\mathcal{P}|} \omega^{(i)} x_{k+1}^{(i)}, \quad \forall k \in \mathbb{Z}_0^{N-1},$$

$L_{k+1}^x = \text{chol}(y_{k+1} y_{k+1}^\top), \quad \forall k \in \mathbb{Z}_0^{N-1},$ $0 \geq g_j(s_k, u_k + K s_k), \forall j \in \mathbb{Z}_1^{n_c}, k \in \mathbb{Z}_0^N,$ $0 \geq h_j(s_k, u_k + K s_k) + c_j \sqrt{D_{k,j} L_k^x L_k^{x^\top} D_{k,j}^\top},$ $\forall j \in \mathbb{Z}_1^{n_h}, k \in \mathbb{Z}_0^N,$ including a linear-quadratic or nonlinear objective function 381, e.g., based on a minimization of the expected value of a sum of linear and/or nonlinear least squares stage and/or terminal cost terms $\|r_k(\bullet)\|_2^2$ for k 32 0,1, . . . , N 381. Some embodiments of the invention are based on the current state estimate 121 in an initial mean state value constraint $s_0 = \hat{x}_t$ 386, the current estimated state uncertainty in an initial state covariance constraint $L_0^x = \text{chol}(\hat{P}_t)$ 387, such that the initial state covariance reads as $P_0 = \hat{P}_t = L_0^x L_0^{x^\top}$.

In some embodiments of the invention, an ADF-based filtering technique is used, e.g., based on the spherical cubature (SC) rule or the unscented transform (UT) in the family of LRKFs, to compute the state values $x_{k+1}^{(i)}$ at each of the integration points $\Xi = [\xi^{(1)}, \xi^{(2)}, \ldots, \xi^{(|\mathcal{P}|)}]$, where $\xi^{(i)} = (\xi_x^{(i)}, \xi_w^{(i)})$, and using the corresponding weights $\Omega = [\omega^{(1)}, \omega^{(2)}, \ldots, \omega^{(|\mathcal{P}|)}]$, as follows $x_{k+1}^{(i)} = \phi(s_k + L_k^x \xi_x^{(i)}, u_k, L_k^w \xi_w^{(i)})$ for $i = 1,2, \ldots, |\mathcal{P}|$ $Y_{k+1,i} = \sqrt{\omega_c^{(i)}} (x_{k+1}^{(i)} - s_{k+1})$ for $i=1,2, \ldots, |\mathcal{P}|$ where $Y_{k+1,i}$ denotes the $i^{th}$ column of the matrix $Y_{k+1}$ for each of the integration points i=1,2, . . . , $|\mathcal{P}|$ over the prediction time horizon k=0,1, . . . , N−1, and the function $\phi(\bullet)$ denotes the pre-stabilized dynamical model of the controlled system under uncertainty. The statistical linearization-based state mean and covariance propagation equations result in linear and/or nonlinear equality constraints 382 to compute the future mean state values over the prediction time horizon $s_1, \ldots, s_N$, and they result in linear and/or nonlinear covariance propagation equations 383, including a Cholesky factorization operator in order to compute the Cholesky factors for the future state covariance matrices $L_1^x, \ldots, L_N^x$.

In some embodiments of the invention, the constrained optimization problem 380 can include constraints on a combination of control inputs, state mean and covariance variables, resulting in one or multiple linear and/or nonlinear deterministic inequality constraints 384 that are defined by smooth linear and/or nonlinear functions $g_j(\ )$ over the prediction time horizon k=0,1, . . . , N. In addition, the constrained OCP-NLP 350 can include one or multiple probabilistic chance constraints $\epsilon_j \geq \text{Pr}(h_j(\bullet) > 0), j=1,2,\ldots, n_h$ 355 that are defined by smooth linear and/or nonlinear functions $h_j(\ )$ of the control inputs, state mean and/or covariance values over the prediction time horizon k=0,1, . . . ,N. In some embodiments of the invention, the latter probabilistic chance constraints can be approximated by a constraint tightening reformulation as follows $0 \geq h_j(s_k, u_k + K s_k) + c_j \sqrt{D_{k,j} L_k^x L_k^{x^\top} D_{k,j}^\top}$ where a back-off coefficient value $c_j > 0$ is computed based on the probability threshold value $\epsilon_j > 0$, the matrix $$D_{k,j} = \frac{\partial h_j}{\partial x_k}(\cdot)$$

is the constraint Jacobian, based on Cholesky factors of the state covariance matrix variables $L = [L_0^x, L_1^x, \ldots, L_N^x]$ and resulting in the additional linear and/or nonlinear tightened inequality constraints 385 over the prediction time horizon k=0,1, . . . , N.

Using an approximate formulation 375 or 385 of the probabilistic chance constraints 355, based on an individual tightening for each of the inequality constraints, the resulting inequality constrained nonlinear dynamic optimization problem can be solved using a Newton-type optimization algorithm that is based on successive linearization of the optimality and feasibility conditions. Examples of such Newton-type optimization algorithms include interior point methods (IPM) and sequential quadratic programming (SQP). Some embodiments of the invention are based on the realization that an SQP algorithm solves a quadratic program (QP) approximation for the stochastic nonlinear OCP at each iteration of the SQP optimization algorithm, based on a linear-quadratic approximation of the objective function and a linearization-based approximation for the discretized system dynamics and the discrete-time covariance propagation equations and a linearization-based approximation for each of the inequality constraints and for each of the tightened probabilistic chance constraints.

In some embodiments of the invention, a stage and/or terminal cost in the objective function 351, 371 or 381 can be defined by any linear, linear-quadratic and/or nonlinear smooth function, including either convex and/or non-convex functions. The objective function 351, 371 or 381 of the stochastic optimal control problem can include a cost term corresponding to each of the time points of the prediction time horizon. In some embodiments, the objective function includes a (nonlinear) least squares type penalization of the deviation of a certain output function of the system from a sequence of reference output values at each of the time points of the prediction time horizon, resulting in a reference tracking type formulation of the cost function in the stochastic predictive controller 150.

Figure 4A:
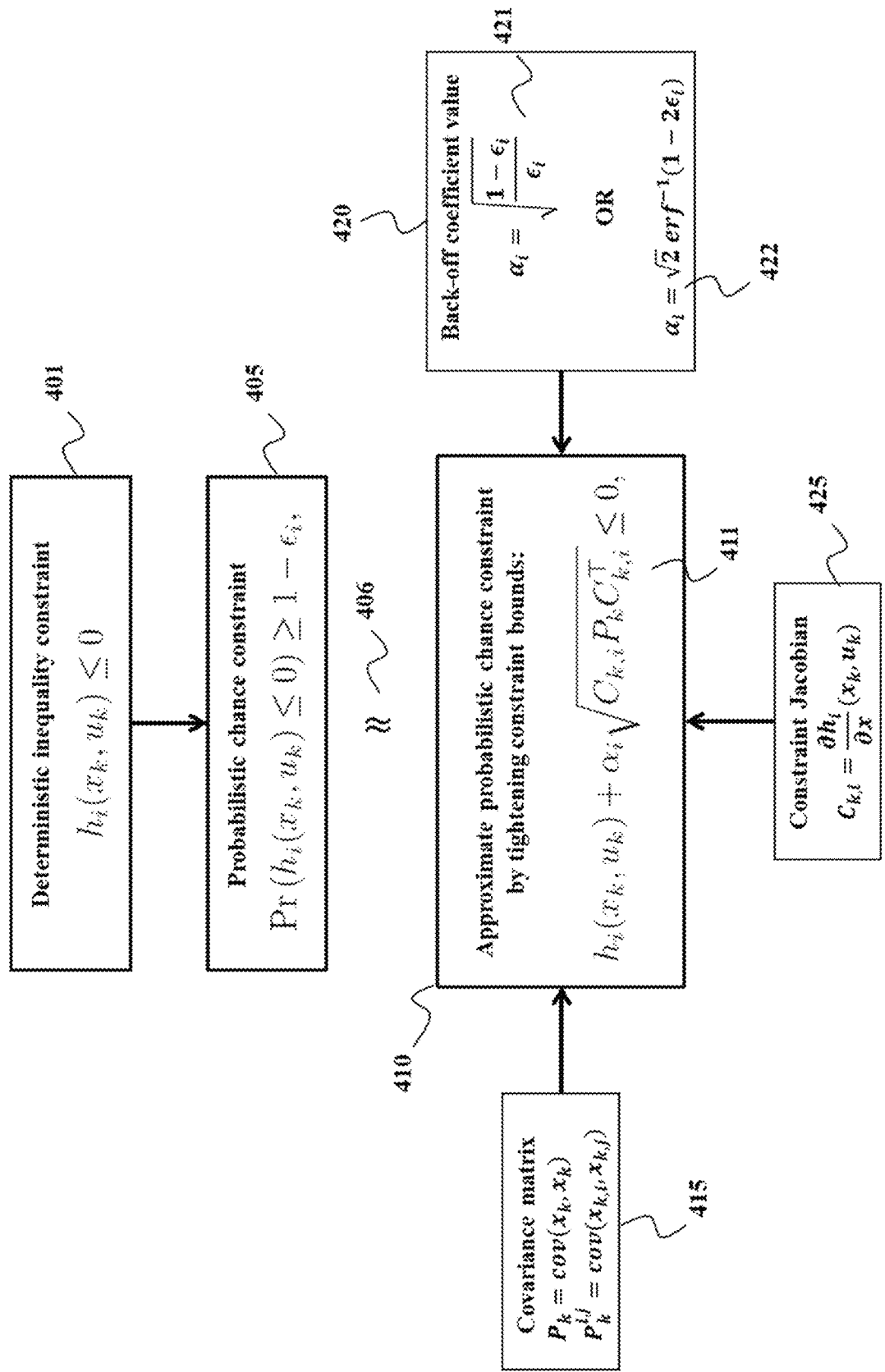
FIG. 4A is a block diagram of the approximation of probabilistic chance constraints in the stochastic predictive controller, according to some embodiments.

FIG. 4A shows a block diagram of formulating one or multiple deterministic inequality constraints 401, on one or multiple state and/or control input variables, as probabilistic chance constraints 405 and their approximation 406 by tightening the corresponding constraint bounds 410 in the constrained OCP formulation of the stochastic predictive controller. Probabilistic chance constraints aim to ensure that the probability of violating an inequality constraint $h_i(x_k, u_k) \leq 0$ is below a certain probability threshold value $\epsilon_i$, i.e., $\text{Pr}(h_i(x_k, u_k) > 0) \leq \epsilon_i$. Equivalently, probabilistic chance constraints aim to ensure that the probability of satisfying an inequality constraint $h_i(x_k, u_k) \leq 0$ is above a certain probability threshold value $1-\epsilon_i$, i.e., $\text{Pr}(h_i(x_k, u_k) \leq 0) \geq 1-\epsilon_i$.

In some embodiments of the invention, the formulation of one or multiple probabilistic chance constraints is implemented approximately 406, using a constraint tightening procedure 410

$h_i(x_k, u_k) + \alpha_i \sqrt{C_{k,i} P_k C_{k,i}^T} \leq 0,$ based on a constraint Jacobian matrix $$C_{k,i} = \frac{\partial h_i}{\partial x}(x_k, u_k)$$

425 and a back-off coefficient value $\alpha_i$ 420 that depends on the probability threshold value $\epsilon_i$, the first and/or higher order moment integrals of the probability distribution for one or multiple of the time-varying modeling uncertainties and/or external disturbances and the first and/or higher order moment integrals of the state probability distribution. In some embodiments of the invention, the first and/or higher order moment integrals include the first moment integral, which is the mean state value, and the second moment integral, which is the state covariance matrix $P_k \approx \text{Cov}[x_k] = \text{cov}(x_k, x_k)$ 415. The state covariance matrix $P_k = L_k^x L_k^{x^T}$ can be computed using explicit or statistical linearization-based covariance propagation equations as illustrated in FIG. 2C or in FIG. 2D, respectively. The constraint Jacobian matrix $C_{k,i}$ can be evaluated efficiently using symbolic differentiation or using algorithmic differentiation (AD) tools.

In some embodiments of the invention, the back-off coefficient value $\alpha_i$ 420 in each of the tightened inequality constraints 411 can be computed using the Cantelli-Chebyshev inequality, i.e., $$\alpha_i = \sqrt{\frac{1-\epsilon_i}{\epsilon_i}} \; 421,$$

which holds regardless of the underlying probability distributions but it may lead to a relatively conservative constraint bound tightening. Some embodiments of the invention are based on a less conservative approximation, assuming normally distributed state trajectories, such that the back-off coefficient value can be chosen as $\alpha_i = \sqrt{2} \, \text{erf}^{-1}(1-2\epsilon_i)$ 422, where $\text{erf}^{-1}(\bullet)$ denotes the inverse Gaussian error function.

In some embodiments of the invention, the back-off coefficient value $\alpha_i$ 420 in each of the tightened inequality constraints 411 can be computed using a cumulative density function of the multivariate Pearson VII probability distribution, based on the first, second and fourth moment integrals of the state probability distribution. Some embodiments of the invention are based on the realization that the third moment integral, and all odd moment integrals, are zero for a symmetric state probability distribution.

Figure 4B:
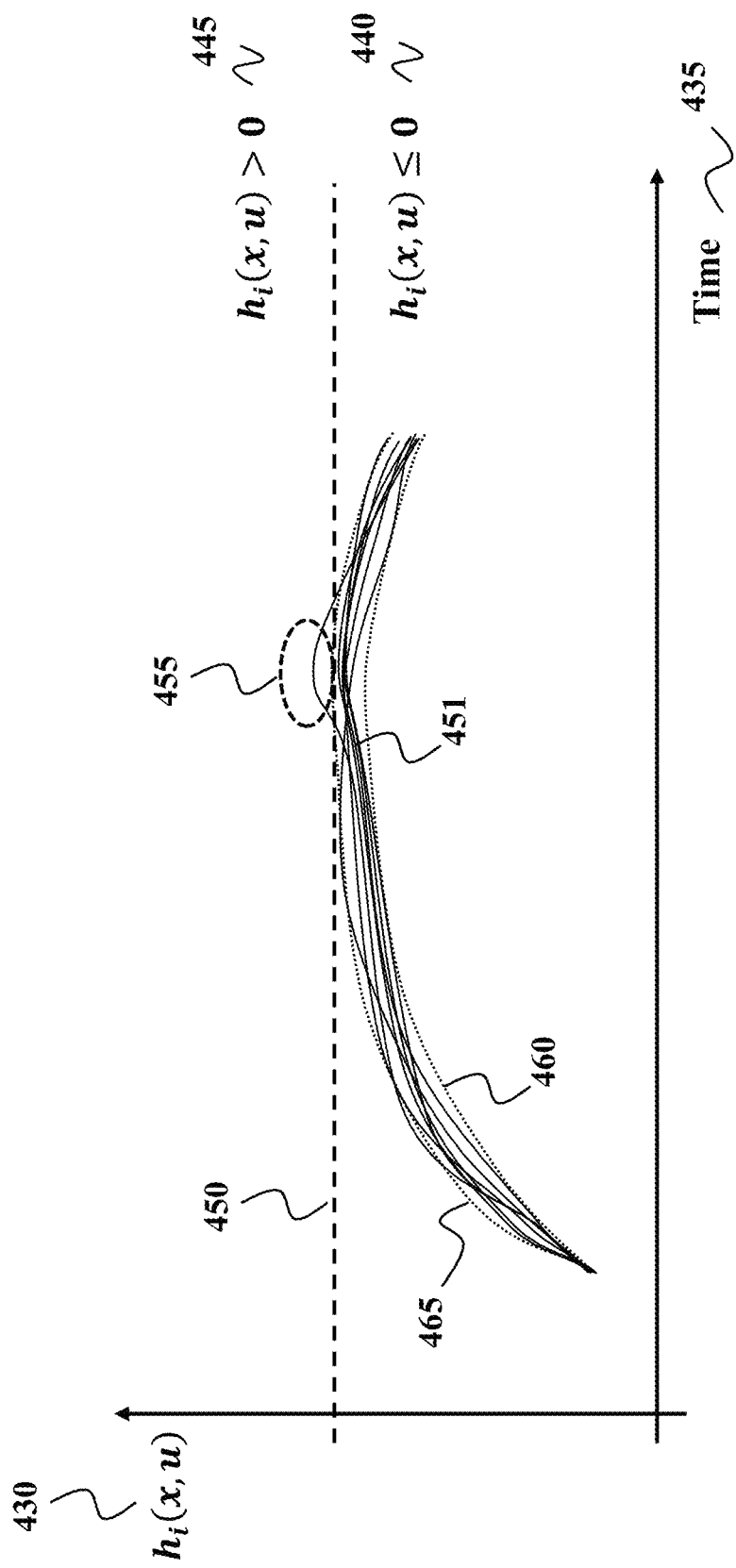
FIG. 4B shows an illustration of the idea behind the formulation and approximation of probabilistic chance constraints in the stochastic predictive controller.

FIG. 4B shows a sampled set of trajectories 451 of the constraint function value 430 over time 435, each of which correspond to a different uncertainty realization, and it shows a constraint bound 450 in order to illustrate a probabilistic chance constraint 405. Probabilistic chance constraints aim to ensure that the probability of violating an inequality constraint 445 is below a certain probability threshold value $\epsilon_i$, i.e., $\Pr(h_i(x_k, u_k) > 0) < \epsilon_i$. Equivalently, probabilistic chance constraints aim to ensure that the probability of satisfying an inequality constraint 440 is above $1-\epsilon_i$, i.e., $\Pr(h_i(x_k, u_k) \leq 0) \geq 1-\epsilon_i$.

Sampling techniques characterize the stochastic system dynamics using a finite set of random realizations of uncertainties, which may lead to a considerable computational cost, due to a large number of samples that is often required for uncertainty propagation. Scenario-based methods exploit an adequate representation of the probability distributions, but the task of determining the number of scenarios leads to a tradeoff between robustness and computational efficiency. Therefore, some embodiments of the invention are based on the realization that a direct but approximate propagation of uncertainty is needed to compute lower 460 and/or upper 465 bounds that represent a particular percentage of trajectories that are required to satisfy the inequality constraint $h_i(x_k, u_k) \leq 0$ in order to (approximately) formulate probabilistic chance constraints in the stochastic predictive controller. In FIG. 4B, 455 denotes a trajectory that violates the inequality constraint and the probability of such a case should remain below a certain probability threshold value $\epsilon_i$ due to the use of probabilistic chance constraints in the stochastic predictive controller 150 for the controlled system under uncertainty, according to embodiments of the invention.

Figure 5A:
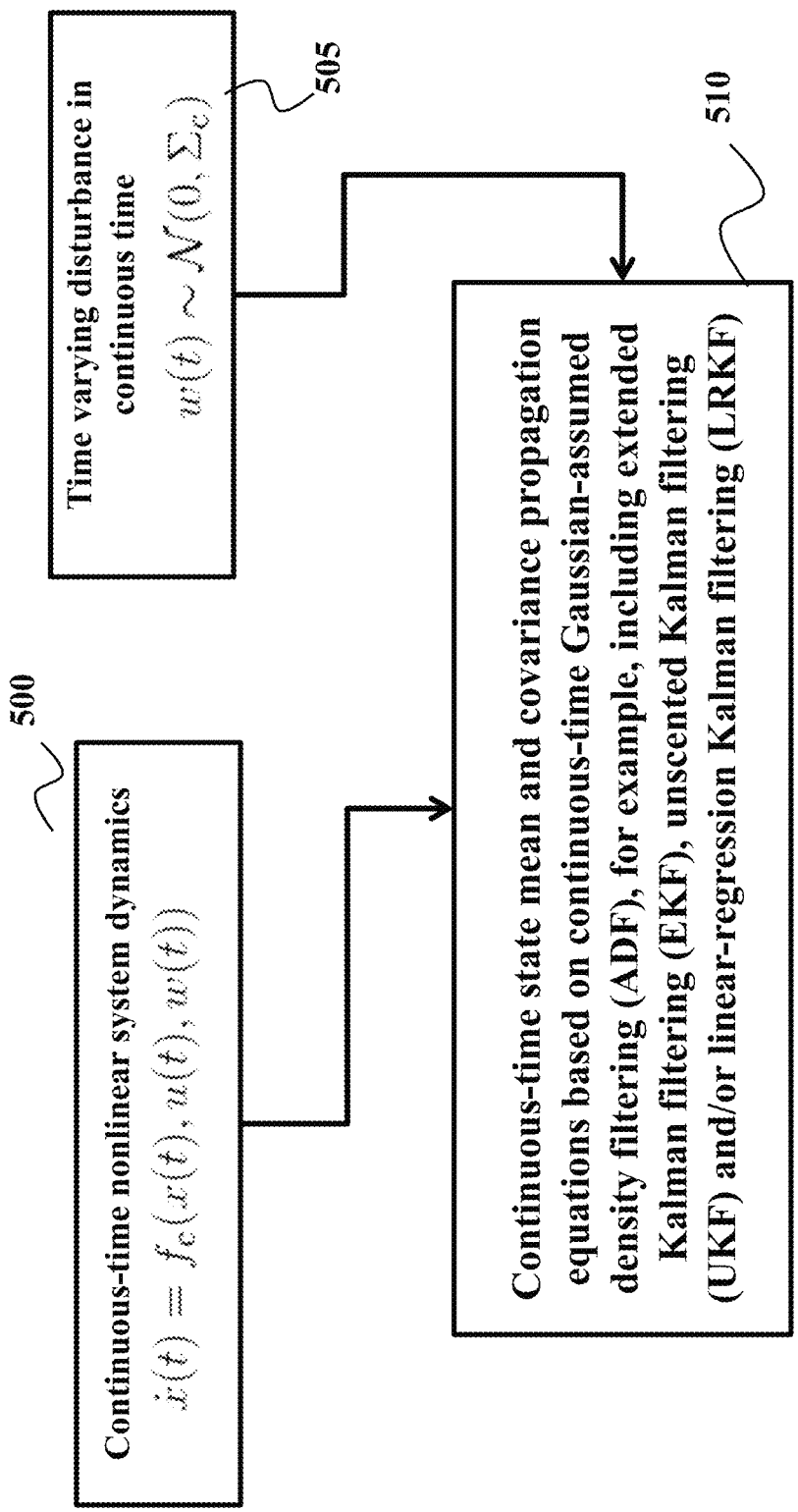
FIG. 5A is a block diagram illustrating a state mean and covariance propagation for nonlinear system dynamics in continuous time, according to some embodiments.

FIG. 5A shows a block diagram to illustrate the state mean and covariance propagation for a set of continuous-time nonlinear system dynamics 500

$$\dot{x}(t) = f_c(x(t), u(t), w(t))$$

given time-varying modeling uncertainties and/or external disturbances w(t) 505. In some embodiments of the invention, the time-varying modeling uncertainties and/or external disturbances are modeled as a normally distributed set of stochastic variables $w(t) \sim N(0, \Sigma_c)$ in continuous time. The continuous-time state mean and covariance propagation equations are based on continuous-time Gaussian-assumed density filtering (ADF) 510. For example, the continuous-time state mean and covariance propagation equations using explicit linearization-based extended Kalman filtering (EKF) can read as $$\dot{s}(t) = f_c(s(t), u(t), 0)$$

$$\dot{P}(t) = A(t)P(t) + P(t)A(t)^T + B(t)\Sigma_c B(t)^T, \; P(0) = \hat{P}_t$$

given the continuous-time constraint Jacobian matrices $$A(t) = \frac{\partial f_c}{\partial x}(s(t), u(t), 0) \text{ and } B(t) = \frac{\partial f_c}{\partial w}(s(t), u(t), 0).$$

Alternatively, in some embodiments of the invention, the continuous-time state mean and covariance propagation equations are based on continuous-time unscented Kalman filtering (UKF) and/or continuous-time linear-regression Kalman filtering (LRKF).

Direct optimal control methods use a numerical integration method to discretize the continuous-time state mean and covariance propagation equations 510, which results in a numerical approximation of the continuous-time predicted trajectory of state mean values and state covariance matrices. However, a sequence of numerically simulated state covariance matrices does not necessarily preserve positive definiteness of the state covariance matrix $P_k > 0 \forall k$, even if the initial state covariance matrix is positive definite, i.e., $P_0 = \hat{P}_t > 0$. The latter can potentially lead to numerical issues in the derivative-based optimization algorithm for the stochastic predictive controller. Some embodiments of the invention are based on the realization that the lack of positive definiteness for one or multiple of the predicted state covariance matrices can be avoided by using propagation equations for a Cholesky factor of the state covariance matrices instead, e.g., using a forward or reverse Cholesky factorization operator.

Figure 5B:
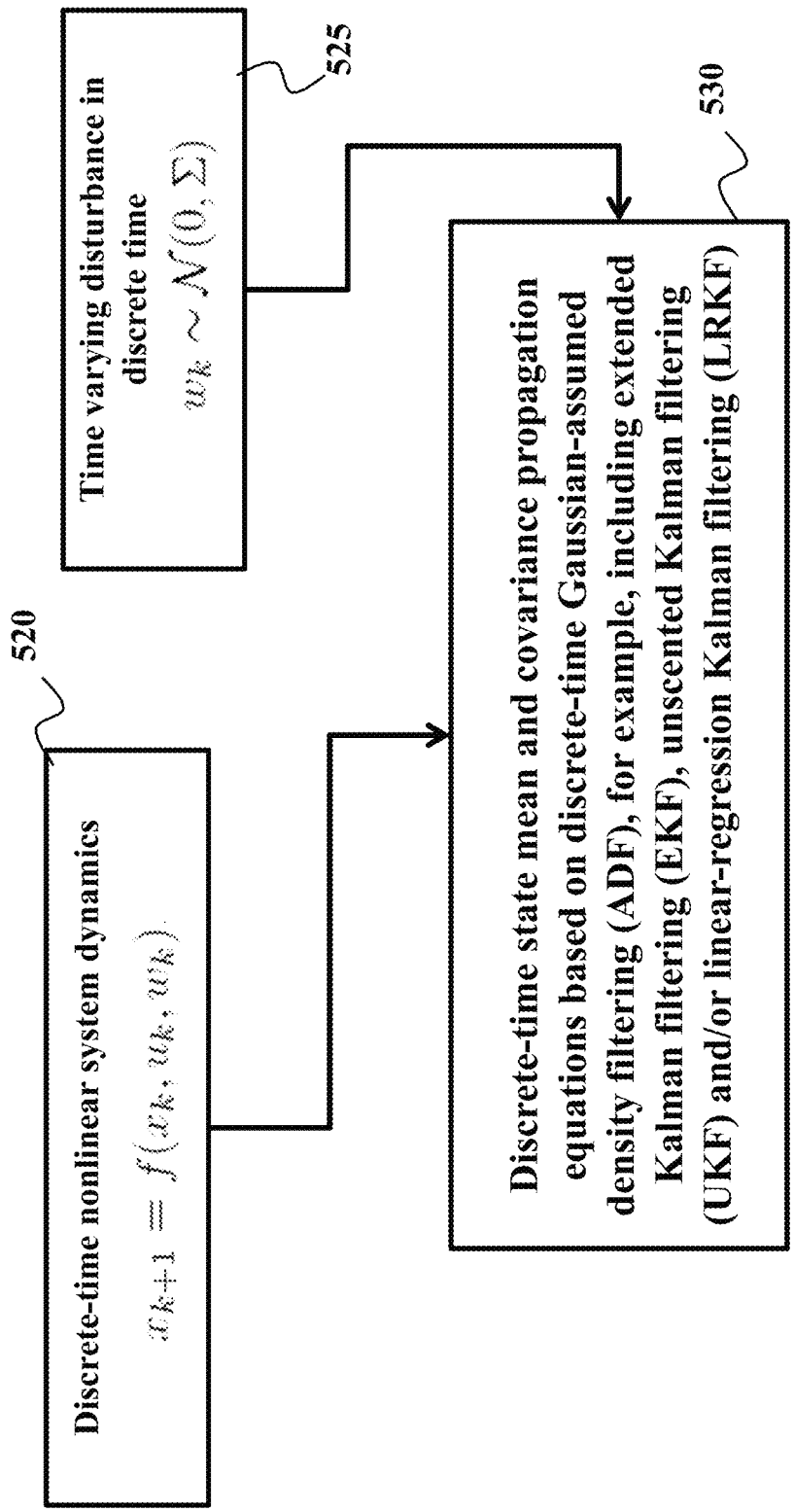
FIG. 5B is a block diagram illustrating a state mean and covariance propagation for nonlinear system dynamics in discrete time, according to some embodiments.

FIG. 5B shows a block diagram to illustrate the state mean and covariance propagation for a set of discrete-time nonlinear system dynamics 520

$$x_{k+1} = f(x_k, u_k, w_k)$$

given time-varying modeling uncertainties and/or external disturbances $w_k$ 525. In some embodiments of the invention, the time-varying modeling uncertainties and/or external disturbances are modeled as a normally distributed set of stochastic variables $w_k \sim N(0, \Sigma)$ in discrete time. The discrete-time state mean and covariance propagation equations are based on discrete-time Gaussian-assumed density filtering (ADF) 530. For example, in some embodiments of the invention, the discrete-time state mean and covariance propagation equations are using explicit linearization-based extended Kalman filtering (EKF) as illustrated in FIG. 2C. In some embodiments of the invention, the discrete-time state mean and covariance propagation equations are using statistical linearization-based unscented Kalman filtering (UKF) and/or linear-regression Kalman filtering (LRKF) as illustrated in FIG. 2D. Unlike the continuous-time state mean and covariance propagation equations 510, some embodiments of the invention are based on the realization that the discrete-time state mean and covariance propagation equations 530 do not require the use of a numerical integration method and are based on the realization that these equations automatically preserve the positive definiteness of the state covariance matrix $P_k > 0$, $\forall k$, as long as the initial state covariance matrix is positive definite, i.e., $P_0 = \hat{P}_t > 0$.

Figure 5C:
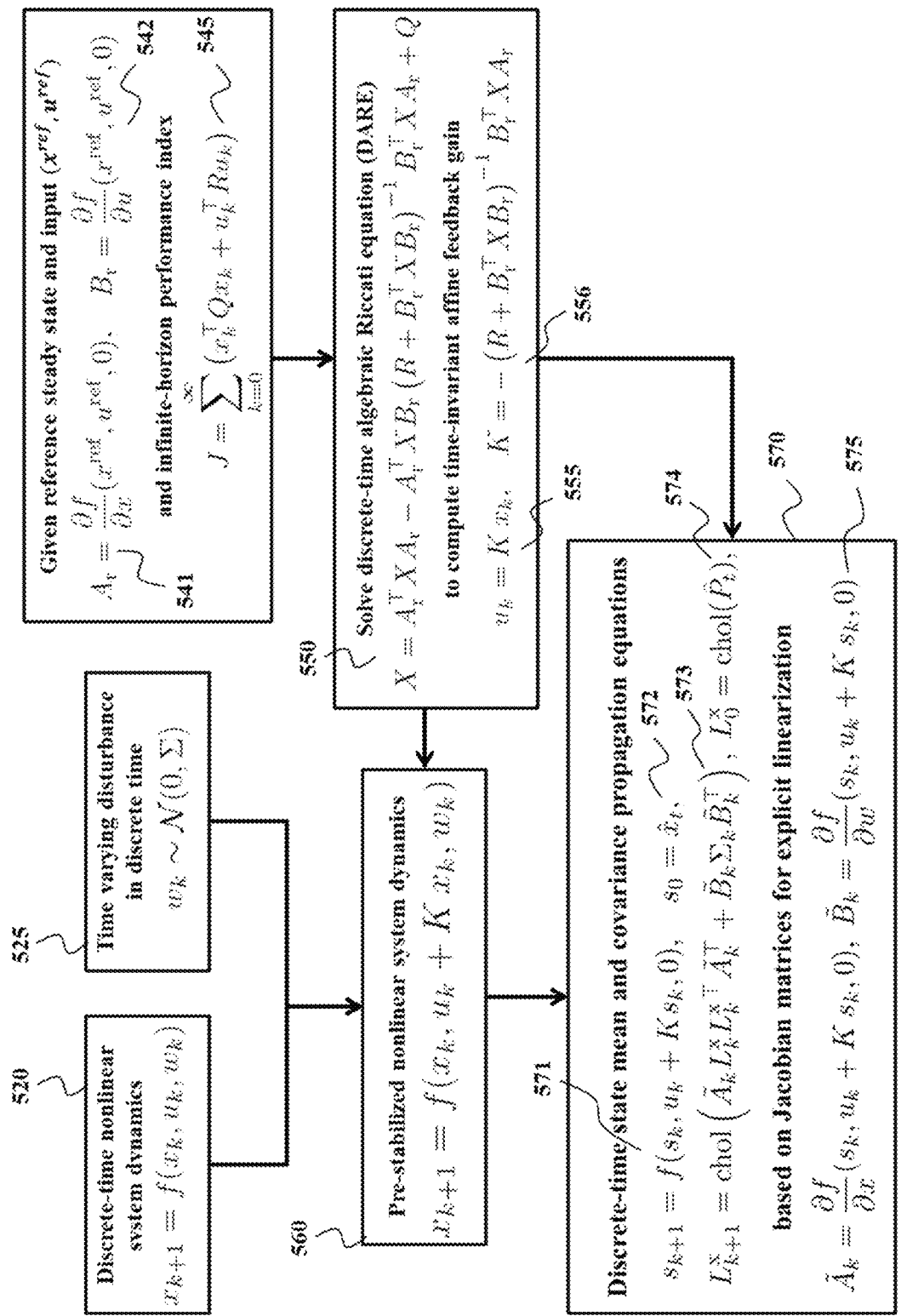
FIG. 5C is a block diagram illustrating an explicit linearization-based state mean and covariance propagation for pre-stabilized nonlinear system dynamics in discrete time, according to some embodiments.

FIG. 5C shows a block diagram to illustrate the pre-stabilization of the nonlinear system dynamics in order to take the feedback control action into account as part of the explicit linearization-based state mean and covariance propagation for the stochastic predictive controller. Some embodiments are based on a parameterization of the feedback control action in order to formulate the pre-stabilized nonlinear system dynamics 560, given the discrete-time dynamics 520 and the time-varying disturbance 525.

In some embodiments of the invention, a linear-quadratic regulator is used to define a time-invariant affine feedback gain $u_k = K x_k$ 555 in order to formulate the pre-stabilized nonlinear system dynamics 560

$$x_{k+1} = f(x_k, u_k + K x_k, w_k)$$

where the overall control action is in the feedforward-feedback form $u_k + K x_k$ due to the pre-stabilizing controller gain K. For example, reference steady state and input values $(x^{ref}, u^{ref})$ can be used to define the reference constraint Jacobian matrices $A_r$ 541 and $B_r$ 542

$$A_r = \frac{\partial f}{\partial x}(x^{ref}, u^{ref}, 0), B_r = \frac{\partial f}{\partial u}(x^{ref}, u^{ref}, 0)$$

in combination with the infinite-horizon performance index 545

$$J = \sum_{k=0}^{\infty}(x_k^T Q x_k + u_k^T R u_k)$$

to define a time-invariant affine feedback gain $u_k = K x_k$ 555. Some embodiments of the invention solve the discrete-time algebraic Riccati equation (DARE) 550

$$X = A_r^T X A_r - A_r^T X B_r (R + B_r^T X B_r)^{-1} B_r^T X A_r + Q$$

to compute the time-invariant affine feedback gain as follows 556

$$u_k = K x_k, K = -(R + B_r^T X B_r)^{-1} B_r^T X A_r$$

where $Q > 0$ and $R > 0$ denote the weighting matrices in the infinite-horizon performance index 545. Based on the pre-stabilized nonlinear system dynamics 560, similar to FIG. 2C and according to some embodiments of the invention, the discrete-time state mean and covariance propagation equations 570 can read as $$s_{k+1} = f(s_k, u_k + K s_k, 0), s_0 = \hat{x}_t,$$

$$L_{k+1}^x = \mathrm{chol}(\tilde{A}_k L_k^x L_k^{x^T} \tilde{A}_k^T + \tilde{B}_k \Sigma_k \tilde{B}_k^T), L_0^x = \mathrm{chol}(\hat{P}_t)$$

where $\mathrm{chol}(\cdot)$ denotes a forward or reverse Cholesky factorization operator, and given the discrete-time constraint Jacobian matrices 575 for the pre-stabilized nonlinear system dynamics that can read as $$\tilde{A}_k = \frac{\partial f}{\partial x}(s_k, u_k + K s_k, 0), \tilde{B}_k = \frac{\partial f}{\partial w}(s_k, u_k + K s_k, 0).$$

The discrete-time state mean propagation equations 571 define the state mean value $s_{k+1}$ at time step k+1, given the state mean value $s_k$ and control input value $u_k$ at a previous time step k and given the initial state estimate $s_0 = \hat{x}_t$ 572 at the current time step. Similarly, the discrete-time state covariance propagation equations 573 define the Cholesky factor of the state covariance matrix $P_{k+1} = L_{k+1}^x L_{k+1}^{x^T}$ at time step k+1, given the Cholesky factor of the state covariance matrix $P_k = L_k^x L_k^{x^T}$, the state mean value $s_k$ and control input value $u_k$ at a previous time step k and given the initial state uncertainty $L_0^x = \mathrm{chol}(\hat{P}_t)$ 574 at the current time step. In some embodiments of the invention, a time-varying trajectory of reference values $(x_k^{ref}, u_k^{ref})$ is used instead to define a time-varying trajectory of feedback control laws, e.g., a trajectory of affine feedback gains can be used, based on the same linear-quadratic regulator design formulas.

Figure 5D:
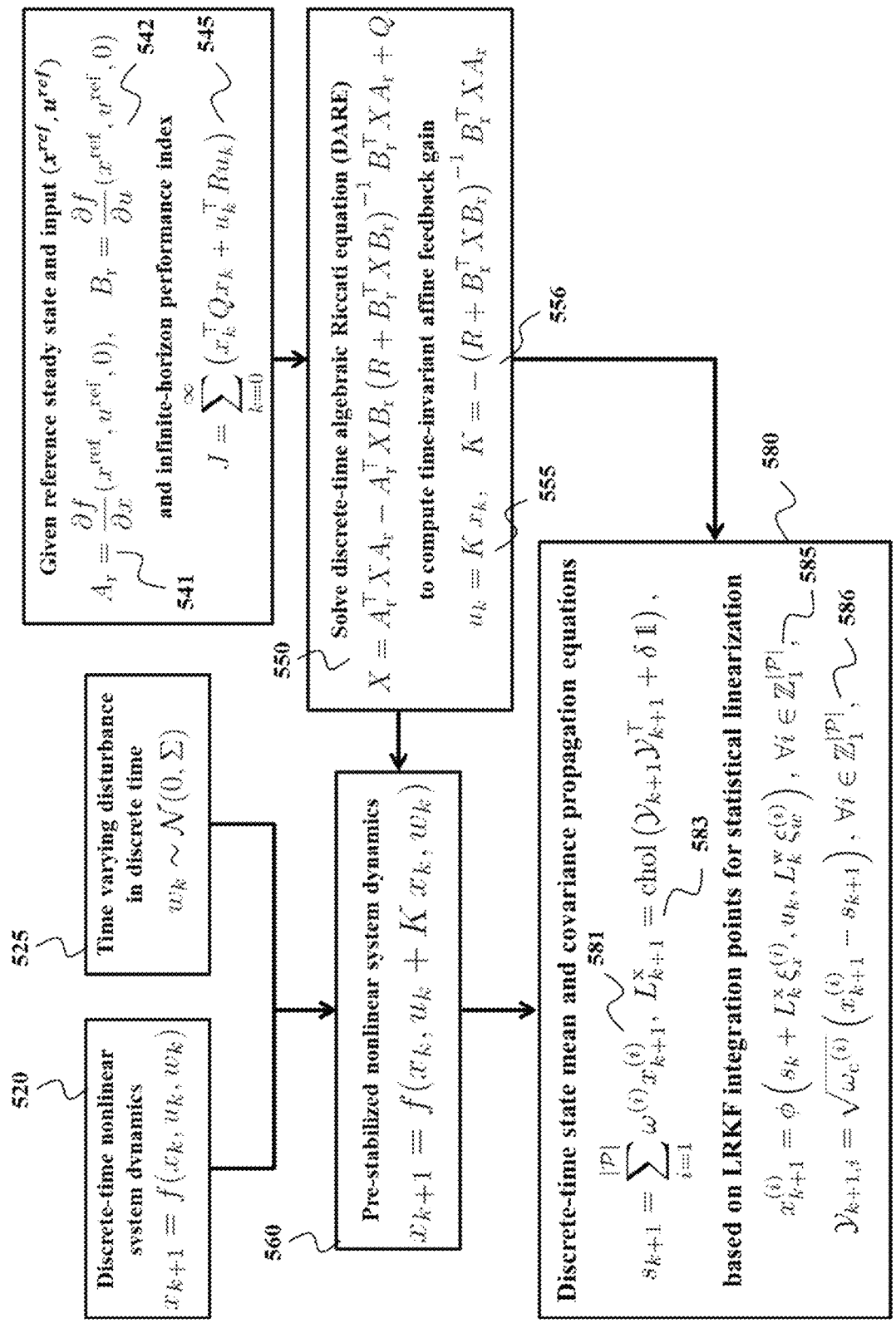
FIG. 5D is a block diagram illustrating a statistical linearization-based state mean and covariance propagation for pre-stabilized nonlinear system dynamics in discrete time, according to some embodiments.

FIG. 5D shows a block diagram to illustrate the pre-stabilization of the nonlinear system dynamics in order to take the feedback control action into account as part of the statistical linearization-based state mean and covariance propagation for the stochastic predictive controller. Based on the pre-stabilized nonlinear system dynamics 560, similar to the state mean and covariance propagation as illustrated in FIG. 2D and according to some embodiments of the invention, the discrete-time state mean and covariance propagation equations 580 can read as $$s_{k+1} = \sum_{i=1}^{|\mathcal{P}|} \omega^{(i)} x_{k+1}^{(i)}, L_{k+1}^x = \mathrm{chol}(y_{k+1} y_{k+1}^T + \delta \mathbb{I}),$$

based on a set of integration points $\Xi = [\xi^{(1)}, \xi^{(2)}, \ldots, \xi^{(|\mathcal{P}|)}]$, where $\xi^{(i)} = (\xi_x^{(i)}, \xi_w^{(i)})$, and using the corresponding weights $\Omega = [\omega^{(1)}, \omega^{(2)}, \ldots, \omega^{(|\mathcal{P}|)}]$, to evaluate the state values $x_{k+1}^{(i)}$ $$x_{k+1}^{(i)} = \phi(s_k + L_k^x \xi_x^{(i)}, u_k, L_k^w \xi_w^{(i)}), \forall i \in \mathbb{Z}_1^{|\mathcal{P}|},$$

$$Y_{k+1,i} = \sqrt{\omega_c^{(i)}}(x_{k+1}^{(i)} - s_{k+1}), \forall i \in \mathbb{Z}_1^{|\mathcal{P}|},$$

where $Y_{k+1,i}$ denotes the $i^{th}$ column of the matrix $Y_{k+1}$ for each of the integration points $i = 1, 2, \ldots, |\mathcal{P}|$ over the prediction time horizon $k = 0, 1, \ldots, N-1$, and the function $\phi(x_k, u_k, w_k) = f(x_k, u_k + K x_k, w_k)$ denotes the pre-stabilized dynamical model 560 of the controlled system under uncertainty.

The discrete-time state mean propagation equations 581 define the state mean value $s_{k+1}$ at time step k+1, based on an evaluation of the state value $x_{k+1}^{(i)}$ 585 for each integration point i in a set of integration points i=1,2, ..., $|\mathcal{P}|$ for statistical integration, given the state mean value $s_k$ and control input value $u_k$ at a previous time step k and given the initial state estimate $s_0 = \hat{x}_t$ 572 at the current time step. Similarly, the discrete-time state covariance propagation equations 583 define the Cholesky factor of the state covariance matrix $P_{k+1} = L_{k+1}{}^x L_{k+1}{}^{x^T}$ at time step k+1, based on an evaluation of the i$^{th}$ matrix column $Y_{k+1,i}$ 586 for each integration point i in a set of integration points i= 1,2, ..., $|\mathcal{P}|$ for statistical integration, given the Cholesky factor of the state covariance matrix $P_k = L_k{}^x L_k{}^{x^T}$, the state mean value $s_k$ and control input value $u_k$ at a previous time step k and given the initial state uncertainty $L_0{}^x = \text{chol}(\hat{P}_t)$ 574 at the current time step.

Figure 5E:
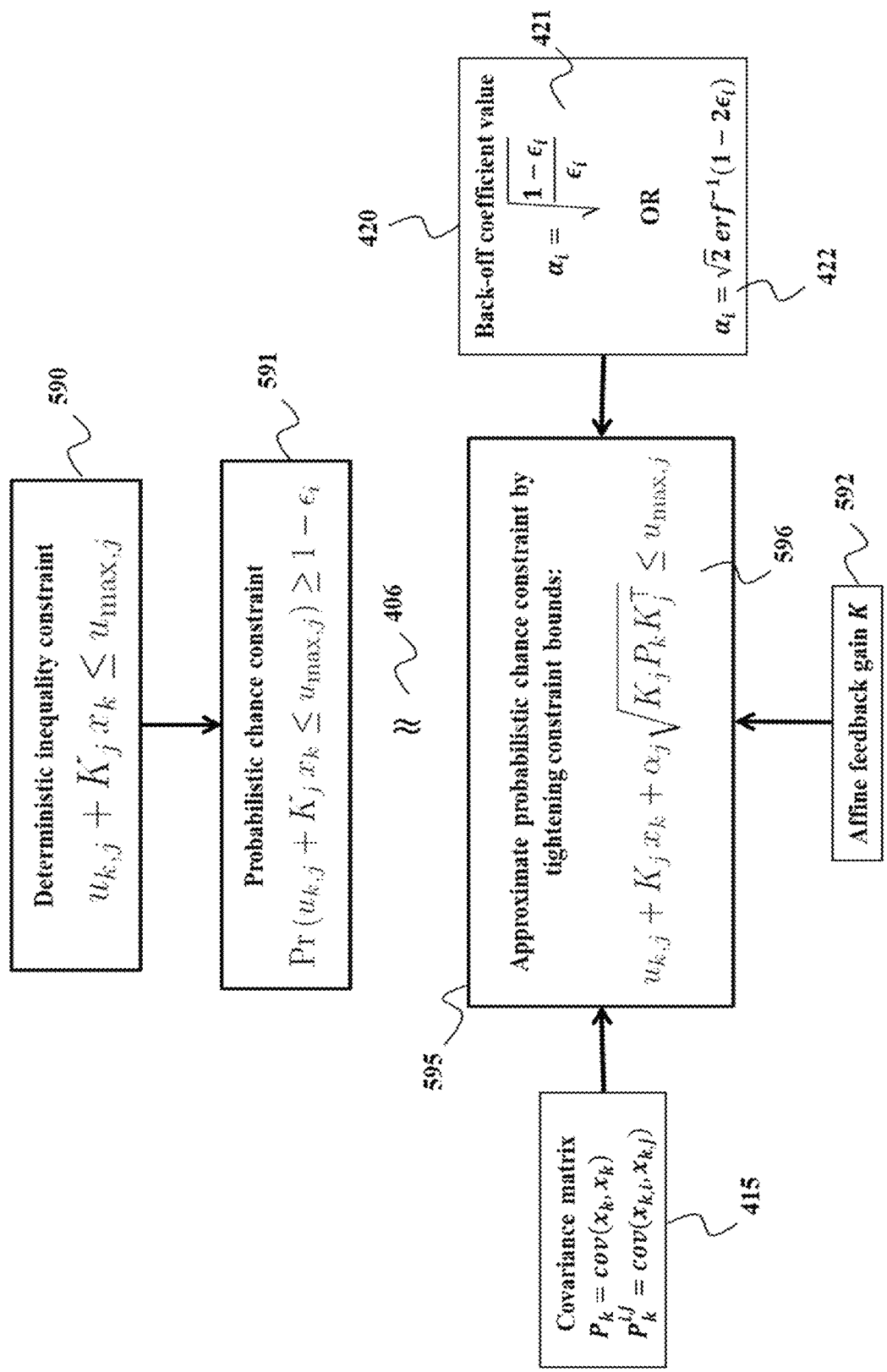
FIG. 5E is a block diagram of the formulation and approximation of control bounds as probabilistic chance constraints due to the state feedback control action, according to some embodiments of the invention.

FIG. 5E shows a block diagram of formulating one or multiple deterministic inequality constraints 590, for one or multiple of the control actions in feedforward-feedback form $u_k + K x_k$, as probabilistic chance constraints 591 and their approximation 406 by tightening the corresponding constraint bounds 595 in the constrained OCP formulation of the stochastic predictive controller, according to some embodiments. In some embodiments of the invention, the formulation of one or multiple probabilistic chance constraints is implemented approximately 406, using a constraint tightening procedure 595 that results in one or multiple deterministic inequality constraints 596 that can read as follows $$u_{k,j} + K_j x_k + \alpha_j \sqrt{K_j P_k K_j^T} \le u_{max,j}$$

based on a state covariance matrix $P_k = \text{cov}(x_k, x_k)$ 415, an affine feedback gain matrix K 592 and a back-off coefficient value $\alpha_j$ 420 that depends on the probability threshold value $\epsilon_j$, the probability distribution of the uncertainty and the resulting approximate probability distribution of the predicted state trajectories. The state covariance matrix $P_k$ can be computed using the discrete-time state mean and covariance propagation equations, e.g., using explicit linearization 570 or statistical linearization 580 as illustrated in FIG. 5C or in FIG. 5D, respectively, for the pre-stabilized nonlinear system dynamics 560, given the initial state covariance matrix $P_0 = \hat{P}_t \succ 0$.

Note that the feedback control actions in FIG. 5C, FIG. 5D and in FIG. 5E are predictions for the future feedback control actions over the prediction time horizon in the dynamic optimization problem at one control step, and therefore these feedback control actions should not be confused with the real feedback of the estimated state of the system 121 to the predictive controller 110 in FIG. 1A.

Figure 6A:
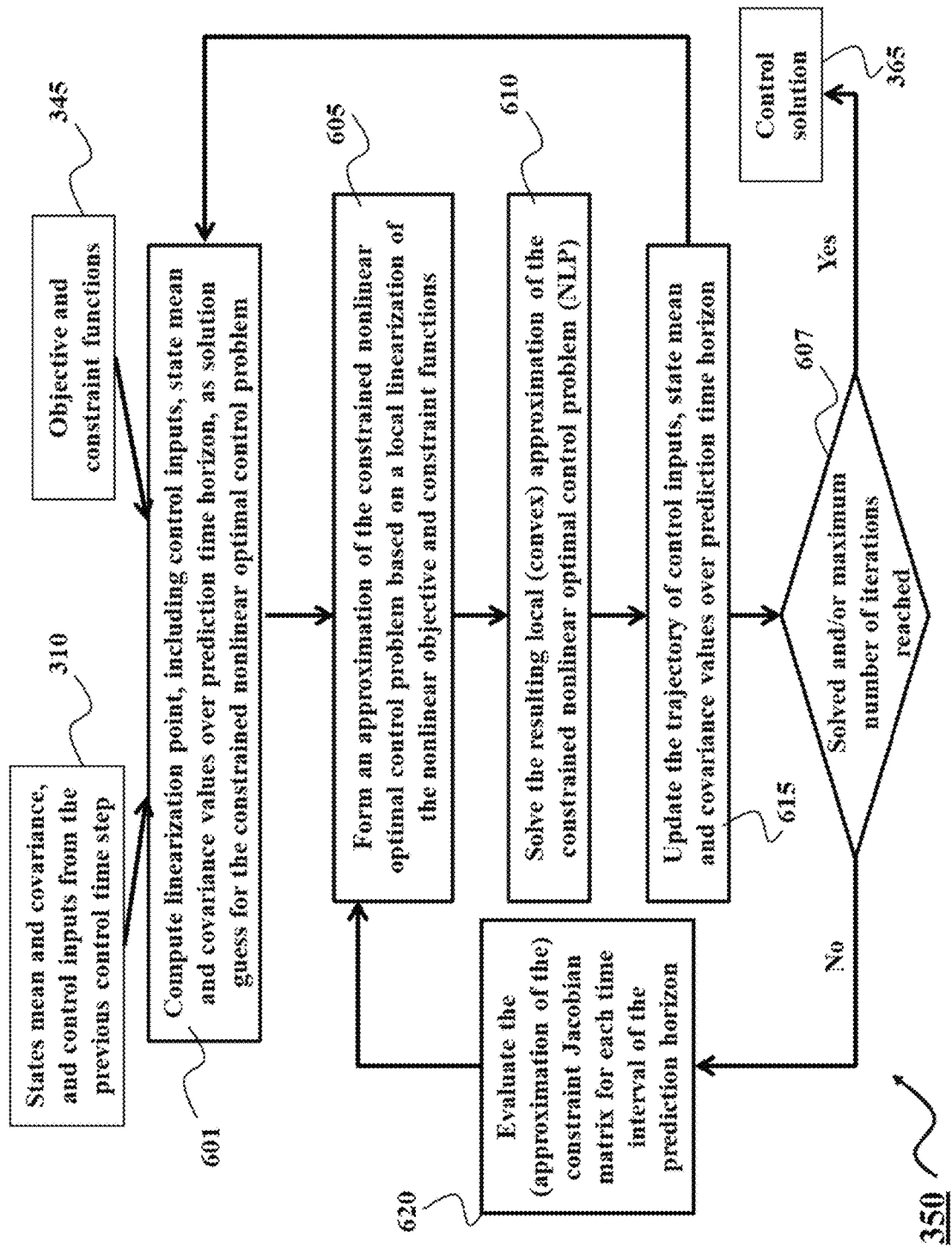
FIG. 6A is a block diagram of an iterative derivative-based optimization procedure to solve the constrained nonlinear optimal control problem at each time step in the stochastic predictive controller.

FIG. 6A shows a block diagram of an iterative derivative-based optimization procedure to solve the constrained, optimal control structured, nonlinear program (NLP) 350 at each control time step in the stochastic predictive controller via the use of successive local linearization-based convex approximations 605. A solution guess for the NLP 601 is used to construct this local convex approximation and the solution to the local (convex) approximation of the constrained NLP 610 is used to update the current sequence of control inputs, state mean and covariance values over the prediction time horizon 615, resulting in an update to the current solution guess for the constrained NLP 601 at each iteration of the algorithmic procedure. Each iteration of the optimization procedure checks whether the solution to the constrained NLP has been found and/or whether a maximum number of iterations has been reached 607. The control solution 365 has been found if the termination condition 607 is satisfied, otherwise (an approximation of) the constraint Jacobian matrix is evaluated 620 in order to construct the local linearization-based approximation 605 in the next iteration of the optimization algorithm. The control inputs, state mean and covariance values from the previous control time step 310 can be used to form an initial solution guess and linearization point for the constrained NLP 601 at each time step of the stochastic predictive controller.

Based on the nonlinear objective and constraint functions 345 and using the current solution guess as a linearization point 601, including a trajectory of control inputs, state mean and covariance values over the prediction time horizon, a local (convex) approximation to the NLP 605 is constructed at each iteration of the algorithmic procedure. For this purpose, the constraint Jacobian matrix needs to be computed or approximated 620 in order to form a linearization of the discretized system of complex nonlinear system dynamics, of the state mean and covariance propagation equations and/or of the nonlinear inequality constraints. In case that the solution of the local approximation forms a sufficiently accurate solution for the NLP 607, then the optimal control solution 365 is obtained. A suboptimal and/or infeasible solution 365 can be obtained when the maximum number of iterations is reached 607 instead. In the case where a solution to the NLP with sufficient accuracy is not yet found and the maximum number of iterations is not yet reached 607, then the solution to the local approximation 610 is used to update the trajectory of control inputs, state mean and covariance values over the prediction time horizon 615 and to update the solution guess to the NLP 601.

Different types of optimization algorithms can be used to solve the inequality constrained, optimal control structured, nonlinear program (NLP) 350 at each control time step via the use of successive local approximations 605. Some embodiments are based on sequential quadratic programming (SQP), in which a (convex) quadratic program (QP) is constructed and solved in each iteration as a local approximation to the original NLP. Some embodiments of the invention are based on the realization that a convex QP can generally be solved at a computational cost that is considerably smaller than the computational cost needed to solve the original NLP 350. Instead, some embodiments are based on an interior point (IP) method where each local approximation is a linearization of the first order necessary conditions of optimality for the NLP in which the complementarity conditions, corresponding to the inequality constraints, are generally smoothened based on a relaxation procedure. In some embodiments, a barrier function is used to iteratively enforce the inequality constraints and each iteration constructs and solves a local approximation to the barrier reformulated problem.

Derivative-based optimization algorithms can use different Newton-type approximation techniques for the constraint Jacobian and Hessian matrices when constructing 605 and solving 610 the local subproblem in each iteration. Some embodiments are based on the exact linearization of some or all of the constraint functions by computing the exact constraint Jacobian matrix 620. Some embodiments instead use a quasi-Newton type update formula to iteratively update an approximation to the constraint Jacobian matrix via low-rank update techniques. Similarly, for the Lagrangian Hessian matrix of the NLP, also different Newton-type approximation techniques can be used. Some embodiments are based on an evaluation of the exact Hessian matrix for the Lagrangian when constructing each local approximation to the NLP. Some embodiments instead use a quasi-Newton type update formula to iteratively update an approximation to the Hessian matrix via symmetric low-rank update techniques. In case the objective function of the NLP includes a (nonlinear) least squares type cost term, some embodiments are based on a Gauss-Newton type Hessian approximation instead.

FIG. 6B shows a more compact NLP formulation 630 that is equivalent 625 to the optimal control structured optimization problem 350, 370 or 380

$$\min_{y,z} \frac{1}{2}\|L(y)\|_2^2$$

$$\text{s.t. } 0 = F(y, z)$$

$$0 = E(y, z)$$

$$0 \geq I(y, z),$$

which needs to be solved at each control time step in the stochastic predictive controller. The compact NLP formulation 630 refers to the mean state and control variables over the prediction time horizon as y 635 and refers to the Cholesky factors of the state covariance matrix variables as z 636

$$y = [u_0^T, s_1^T, u_1^T, \ldots, s_{N-1}^T, u_{N-1}^T, s_N^T]^T,$$

$$z = [\text{vec}(L_1^x)^T, \ldots, \text{vec}(L_{N-1}^x)^T, \text{vec}(L_N^x)^T]^T.$$

For example, based on the OCP-NLP formulation 380 as illustrated in FIG. 3D for the stochastic predictive controller, according to some embodiments of the invention, the discrete-time nonlinear system dynamics and the discrete-time state mean and covariance propagation equations can be defined, respectively, in the equality constraints 0=F(y, z) 632 and 0=E(y, z) 633

$$F(\cdot) = \begin{bmatrix} s_1 - \sum_{i=1}^{|\mathcal{P}|} \omega^{(i)} x_1^{(i)} \\ \vdots \\ s_N - \sum_{i=1}^{|\mathcal{P}|} \omega^{(i)} x_N^{(i)} \end{bmatrix}, E(\cdot) = \begin{bmatrix} L_1^x - \text{chol}(y_1 y_1^\top) \\ \vdots \\ L_N^x - \text{chol}(y_N y_N^\top) \end{bmatrix}$$

where the function F(•) 637 denotes the concatenation of the discrete-time state mean propagation equations and the function E(•) 638 denotes the concatenation of the discrete-time state covariance propagation equations.

Some embodiments of the invention are based on the realization that each of the state covariance matrices represents a symmetric matrix, such that a vectorized form can be defined $$\text{vec}(L_k^x) \in \mathbb{R}^{\frac{n_x(n_x+1)}{2}} \text{ for } k = 1, \ldots,$$

N, and where $n_x$ denotes the number of state variables, which can be used to define z 636 instead to reduce the computational complexity and memory requirements of the stochastic predictive controller. In addition, the compact NLP formulation 630 can include one or multiple linear and/or nonlinear inequality constraints 634, including both deterministic and/or approximated probabilistic chance constraints, as well as a linear-quadratic or nonlinear objective function 631. In some embodiments of the invention, the objective function is defined as a least squares function $\frac{1}{2}\|L(y)\|_2^2$ 631, in which the linear or nonlinear function L(y), for example, can refer to the deviation of a certain output function of the system from a sequence of reference output values at each of the time points in the prediction time horizon. In some embodiments of the invention, the objective function is a linear or nonlinear function ψ(y, z), which can depend on one or multiple of the control inputs, state mean and covariance variables, e.g., in order to perform a constrained optimization of a performance metric, which may depend directly or indirectly on the predicted state uncertainty, at each control time step of the stochastic predictive controller according to embodiments of the invention.

FIG. 6C shows a block diagram of an exact Jacobian-based quadratic program (QP) 640 that forms a local (convex) approximation 605 of the optimal control structured NLP 630, according to some embodiments based on sequential quadratic programming (SQP) to implement the stochastic predictive controller. The linear equality constraint 642 in the QP subproblem corresponds to the linearization of the discrete-time system dynamics 632 and of the state covariance propagation equations 633 based on an evaluation of the complete constraint Jacobian matrix 652. In addition, a local linearization 643 is needed for the inequality constraints 634 in the original NLP formulation, for which an exact Jacobian matrix 653 needs to be evaluated for each of the nonlinear inequality constraints.

The linear-quadratic objective 641 in the optimal control structured QP 640 locally approximates the nonlinear objective 631. As mentioned earlier, the Hessian matrix $H^i$ 651 can be based either on an exact evaluation of the Hessian of the Lagrangian, or using a quasi-Newton type update formula or a Gauss-Newton Hessian approximation for each interval of the prediction time horizon. In some embodiments of the invention, a Gauss-Newton Hessian approximation can be used for the nonlinear least squares objective function 631 as follows $$H^i = \frac{\partial L}{\partial y}(y^i)^\top \frac{\partial L}{\partial y}(y^i) \approx \nabla_y^2 \Lambda(y^i, z^i, \lambda^i, \mu^i, \kappa^i)$$

in which the Lagrangian for the NLP 630 is defined as follows $$\Lambda(\cdot) = \frac{1}{2}\|L(y)\|_2^2 + \lambda^T F(y,z) + \mu^T E(y,z) + \kappa^T I(y,z)$$

and the vector $g^i$ is accordingly defined as the gradient of the nonlinear least squares objective function 631 as follows $$g^i = \frac{\partial L}{\partial y}(y^i)^\top L(y^i)$$

in which $y^i$ and $z^i$, respectively, denote the current values for the mean state and control variables and for the state covariance matrix variables over the prediction time horizon in the $i^{th}$ iteration of the SQP optimization algorithm. In some embodiments of the invention, the objective function 631 depends additionally on one or multiple elements of state covariance matrix variables in z 636, such that the Hessian and gradient evaluations can depend on both $y^i$ and $z^i$.

Some embodiments of the invention are based on the realization that the Hessian matrix 651, the equality constraint Jacobian matrix 652 and the inequality constraint Jacobian matrix 653 exhibit a block-structured sparsity, due to the separable objective function 381, the stage-wise individual inequality constraints 384-385 and the stage-wise coupling between state and covariance matrix variables at subsequent stages over the prediction time horizon in the equality constraints 382-383 of the constrained NLP 380. Therefore, in some embodiments of the invention, a block-sparse structure exploiting optimization algorithm can be used to solve 610 each local (convex) QP approximation 640 of the optimal control structured NLP 630 in an SQP optimization algorithm to implement the stochastic predictive controller. Examples of block-sparse structure exploiting QP optimization algorithms include primal, dual or primal-dual active-set methods, interior point methods, projected gradient methods, forward-backward splitting methods or the alternating direction method of multipliers (ADMM).

In some embodiments of the invention, one or multiple of the nonlinear inequality constraints 634 can be locally approximated by one or multiple nonlinear but convex inequality constraints, resulting in a local convex program (CP) approximation 605 that needs to be solved 610 in a sequential convex programming (SCP) implementation of the stochastic predictive controller. For example, in some embodiments, one or multiple probabilistic chance constraints can be locally approximated by convex second-order cone constraints and/or convex quadratic inequality constraints. Each of the convex conic constraints impose that a linear combination of one or multiple control inputs, state mean and/or state covariance matrix variables is restricted to be inside of a convex cone. Examples of a convex cone can include the positive orthant, the set of positive semidefinite matrices and/or the second-order cone. Some embodiments of the invention are based on the realization that the local convex program approximation 605 of the optimal control structured constrained NLP 350 can be a linear program (LP), a quadratic program (QP), a quadratically constrained quadratic program (QCQP), a second-order cone program (SOCP) or a semidefinite program (SDP), and each of these classes of problems can be solved by a structure exploiting convex optimization algorithm.

Some embodiments of the invention are based on the realization that a linearization for the state covariance propagation equations 633, in each iteration of a Newton-type SQP optimization algorithm, can require the evaluation of first and/or higher order derivatives for the nonlinear system dynamics, which forms a computationally expensive step in case the dynamics are highly dimensional, in case they involve lengthy nonlinear expressions or if they are described by a set of stiff or implicitly defined differential equations. Therefore, some embodiments of the invention are based on a Jacobian approximation technique in an inexact SQP optimization algorithm that avoids the evaluation of the complete constraint Jacobian matrices $$\frac{\partial E}{\partial y}(\cdot), \frac{\partial E}{\partial z}(\cdot) \text{ and/or } \frac{\partial F}{\partial z}(\cdot)$$

in 652 and therefore avoids the evaluation of first and/or higher order derivatives for the nonlinear system dynamics f(•) in the equality constraints 632 of the constrained NLP 630 that needs to be solved at each control time step of the stochastic predictive controller.

Figure 7A:
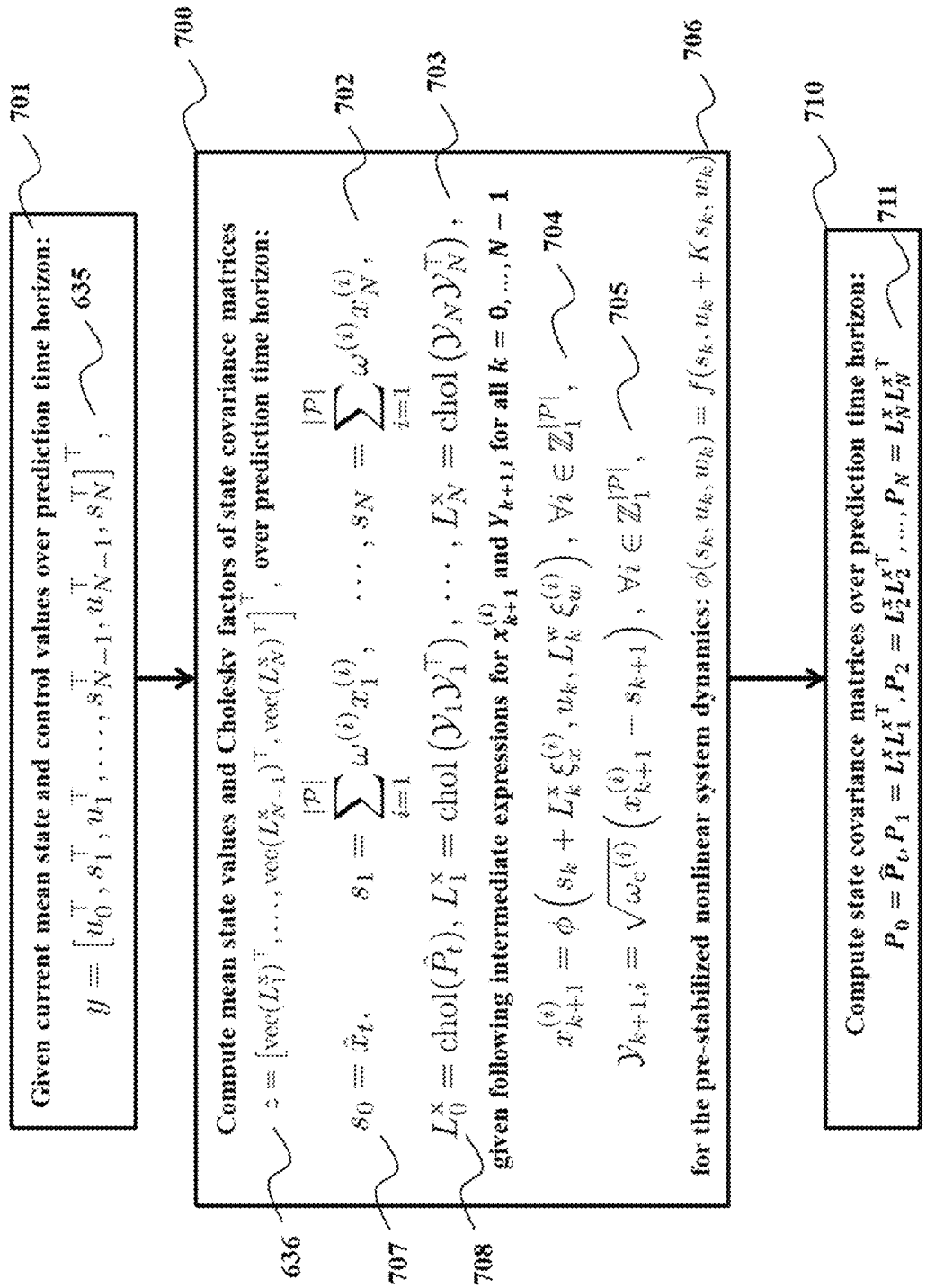
FIG. 7A is a block diagram of an explicit and sequential computation of the state mean and covariance matrix values, given the current mean state and control values over the prediction time horizon, according to some embodiments.

FIG. 7A shows a block diagram of the computation of a trajectory of state mean and covariance matrices over the prediction time horizon 700, using the discrete-time ADF-based propagation equations, as illustrated in FIG. 5C or FIG. 5D according to some embodiments of the invention, and given current mean state and control values in y 635 over the prediction time horizon 701. The procedure 700, which consists of a computation of the mean state values 702 and of the Cholesky factors of the state covariance matrices 703, requires an evaluation of the intermediate values $x_{k+1}^{(i)}$ 704 and $Y_{k+1,i}$ 705 for each of the integration points i= 1,2, ..., $|\mathcal{P}|$ over the prediction time horizon k= 0,1, ..., N−1, and the function $\phi(s_k, u_k, w_k) = f(s_k, u_k + K s_k, w_k)$ denotes the pre-stabilized dynamical model 706 of the controlled system under uncertainty. The initial mean state value $s_0 = \hat{x}_t$ 707 and initial state covariance matrix $P_0 = \hat{P}_t > 0$ and its Cholesky factor $L_0^x = \text{chol}(\hat{P}_t)$ 708 can be given or estimated 121-122, such that each of the mean state values $s_1, s_2, \ldots, s_N$ 702 and each of the Cholesky factors $L_1^x, L_2^x, \ldots, L_N^x$ 703 can be evaluated given the intermediate values $x_{k+1}^{(i)}$ 704 and $Y_{k+1,i}$ 705 for each of the integration points i=1,2, ..., $|\mathcal{P}|$ over the prediction time horizon k=0,1, ..., N−1. Then, the state covariance matrices can be evaluated over the prediction time horizon 710 as $P_1 = L_1^x L_1^{x^T}, P_2 = L_2^x L_2^{x^T}, \ldots, P_N = L_N^x L_N^{x^T}$ 711.

Figure 7B:
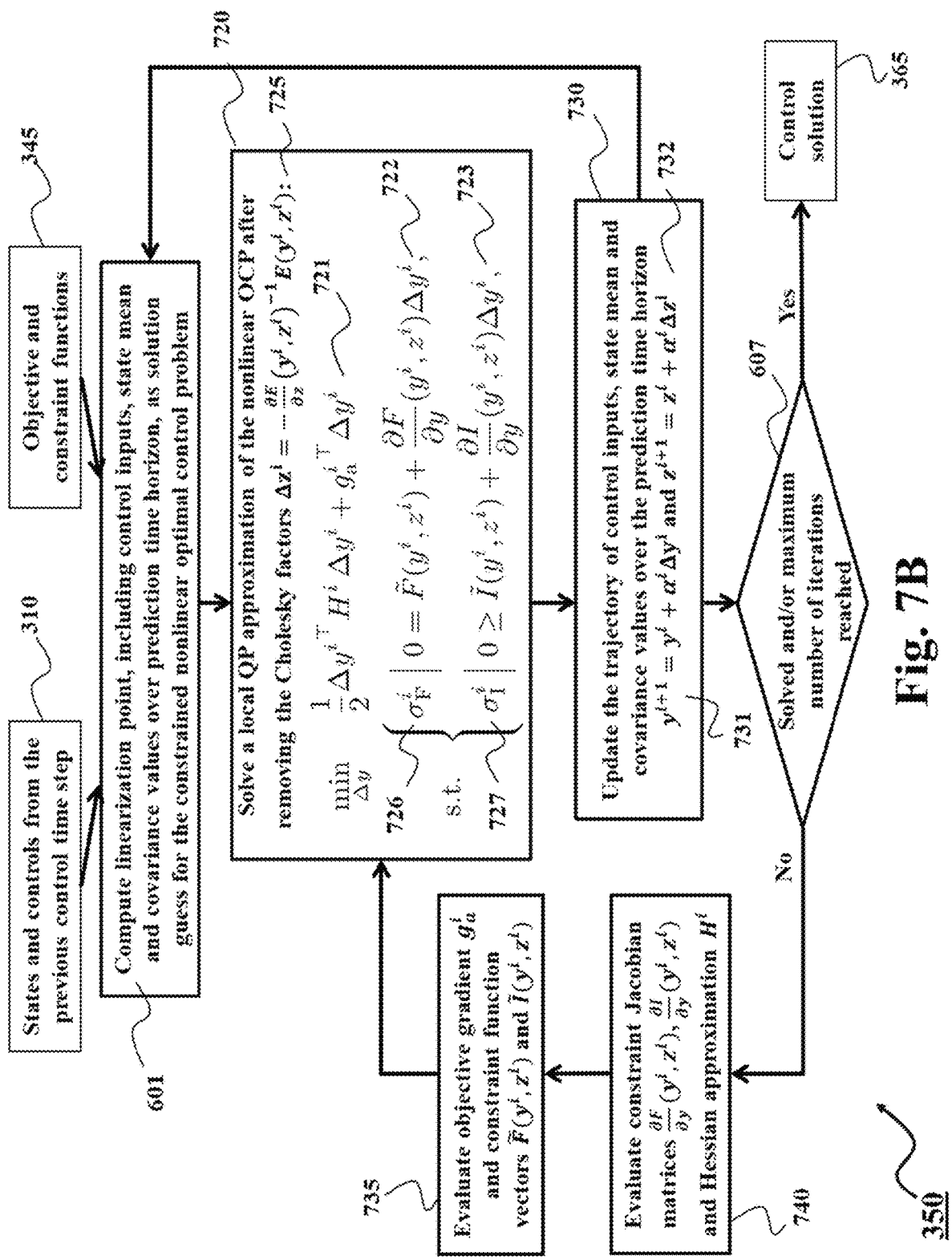
FIG. 7B is a block diagram of an iterative inexact SQP optimization algorithm for the efficient implementation of the stochastic predictive controller, according to some embodiments of the invention, without the need to evaluate one or multiple first and/or higher order derivatives of the nonlinear equality constraint functions.

FIG. 7B shows a block diagram of an inexact SQP optimization algorithm for the efficient implementation of the stochastic predictive controller according to some embodiments of the invention. The derivative-based iterative optimization procedure avoids the evaluation of the complete constraint Jacobian matrices $$\frac{\partial E}{\partial y}(\cdot), \frac{\partial E}{\partial z}(\cdot) \text{ and/or } \frac{\partial F}{\partial z}(\cdot)$$

in 652 and therefore avoids the evaluation of first and/or higher order derivatives for the nonlinear system dynamics f(•) in the equality constraints 632-633 of the constrained NLP 630 that needs to be solved at each control time step of the stochastic predictive controller. More specifically, some embodiments of the invention solve a local (convex) QP approximation of the nonlinear OCP 720 for a sequence of mean state and control values $y^i$ and a sequence of Cholesky factors for the state covariance matrices $z^i$, after removing the deviation variables for the Cholesky factors $\Delta z^i$ 725, as follows $$\min_{\Delta y} \frac{1}{2} \Delta y^{i^T} H^i \Delta y^i + g_a^{i^T} \Delta y^i$$

$$\text{s.t.} \begin{cases} \sigma_F^i \mid 0 = \tilde{F}(y^i, z^i) + \frac{\partial \tilde{F}}{\partial y}(y^i, z^i) \Delta y^i, \\ \sigma_I^i \mid 0 \geq \tilde{I}(y^i, z^i) + \frac{\partial \tilde{I}}{\partial y}(y^i, z^i) \Delta y^i, \end{cases}$$

which includes only deviation variables for the mean state and control values $\Delta y^i$ as optimization variables $$\Delta y = [\Delta u_0^T, \Delta s_1^T, \Delta u_1^T \ldots, \Delta s_{N-1}^T, \Delta u_{N-1}^T, \Delta s_N^T]^T$$

and therefore considerably reduces the computational complexity and memory requirements for an implementation of the inexact SQP optimization algorithm in the stochastic predictive controller.

Unlike an exact Jacobian-based local (convex) QP approximation 640, the inexact local (convex) QP approximation 720 for the nonlinear OCP in FIG. 7B includes an approximate linear-quadratic objective function 721, an approximate linearization of the nonlinear system dynamics in the equality constraints 722 and an approximate linearization of the nonlinear inequality constraints 723 for a fixed sequence of updates to the Cholesky factors for the state covariance matrices $\Delta z^i$, e.g., $$\Delta z^i = -\frac{\partial E}{\partial z}(y^i, z^i)^{-1} E(y^i, z^i)$$

725 in some embodiments of the invention. The optimal Lagrange multiplier values for the equality and inequality constraints are, respectively, denoted as $\sigma_E^i$ 726 and $\sigma_I^i$ 727 for the local (convex) QP solution in the $i^{th}$ iteration of the inexact SQP optimization algorithm.

Some embodiments of the invention are based on the realization that the linear-quadratic objective function 721 can be equivalent to the objective function 641 for the exact Jacobian-based local (convex) QP approximation 640, e.g., if the objective function does not depend directly on the Cholesky factors for the state covariance matrix variables in z 636. In other embodiments, the linear-quadratic objective function 721 is an inexact approximation for a fixed sequence of updates to the Cholesky factors for the state covariance matrices $\Delta z^i$.

A solution guess for the NLP 601 is used to construct and solve the local QP approximation 720 in order to update the current sequence of control inputs, state mean and covariance values over the prediction time horizon 730 as $y^{i+1}=y^i+\alpha^i \Delta y^i$ 731 and $z^{i+1}=z^i+\alpha^i \Delta z^i$ 732, where $\Delta y^i$ denotes the solution of primal optimization variables for the local (convex) QP approximation 720 and $\Delta z^i$ denotes a fixed sequence of updates to the Cholesky factors for the state covariance matrices. For example, in some embodiments of the invention, the updates can be computed as $$\Delta z^i = -\frac{\partial E}{\partial z}(y^i, z^i)^{-1} E(y^i, z^i)$$

725, using an approximate inexact linearization of the covariance propagation equations $0=E(y,z)$ 633. Alternatively, in some embodiments of the invention, the updated values $z^{i+1}$ can be evaluated directly using an explicit and sequential evaluation of the mean state values and Cholesky factors for the state covariance matrix values over the prediction time horizon as described, for example, in FIG. 2C or in FIG. 2D. In some embodiments of the invention, globalization strategies can be used to ensure convergence of the Newton-type optimization algorithm such as, for example, the use of updates $y^{i+1}=y^i+\alpha^i \Delta y^i$ 731 and $z^{i+1}=z^i+\alpha^i \Delta z^i$ 732, in which a step size value $\alpha^i \in (0,1]$ can be selected based on a line search procedure in combination with a particular merit function for constrained optimization. Other embodiments of the invention use a trust region method to ensure convergence of the Newton-type optimization algorithm in the stochastic predictive controller.

Each iteration of the optimization procedure checks whether the solution to the constrained NLP has been found and/or whether a maximum number of iterations has been reached 607. The (approximately) optimal and/or feasible control solution 365 has been found if the termination condition 607 is satisfied, otherwise the procedure needs to evaluate the (approximate) constraint Jacobian matrices $$\frac{\partial F}{\partial y}(y^i, z^i), \frac{\partial I}{\partial y}(y^i, z^i)$$

and Hessian approximation $H^i$ 740 as well as the (approximate) objective gradient $g_a^i$ and approximated constraint function vectors $\tilde{F}(y^i,z^i)$ and $\tilde{I}(y^i,z^i)$ 735 in order to construct the local (convex) QP approximation 720 in the next iteration of the inexact SQP optimization algorithm. The control inputs, state mean and covariance values from the previous control time step 310 can be used to form an initial solution guess and linearization point for the constrained nonlinear optimal control problem 601.

Some embodiments of the invention are based on the realization that the inexact SQP optimization algorithm in FIG. 7B can avoid the costly evaluation of the complete constraint Jacobian matrices $$\frac{\partial E}{\partial y}(\cdot), \frac{\partial E}{\partial z}(\cdot) \text{ and/or } \frac{\partial F}{\partial z}(\cdot)$$

in 652 and therefore avoids the evaluation and storage of one or multiple first and/or higher order derivatives for the nonlinear system dynamics $f(\cdot)$ in the equality constraints 632-633. In addition, some embodiments are based on the realization that the local (convex) QP approximation 720 includes only mean state and control deviation variables as primal optimization variables $\Delta y$, unlike the exact Jacobian-based QP approximation 640, resulting in a considerable reduction of the computational complexity and the memory requirements for the implementation of the stochastic predictive controller based on the inexact SQP optimization algorithm in FIG. 7B.

More specifically, if N denotes the number of intervals in the prediction time horizon, $n_x$ denotes the number of state variables and $n_u$ denotes the number of control input variables, then $y \in R^{N(n_x+n_u)}$ and $$z \in R^{N \frac{n_x(n_x+1)}{2}}$$

due to the sparsity structure of Cholesky factors for each of the state covariance matrices. A block-structured sparsity exploiting optimization algorithm asymptotically requires $O(N(n_x+n_x^2+n_u)^2)$ available memory and $O(N(n_x+n_x^2+n_u)^3)$ computations to solve the QP subproblem 640 in an exact Jacobian-based SQP optimization algorithm. Instead, a block-structured sparsity exploiting optimization algorithm asymptotically requires only $O(N(n_x+n_u)^2)$ available memory and $O(N(n_x+n_u)^3)$ computations to solve one or multiple inexact Jacobian-based local QP approximations 720 at each control time step to implement the stochastic predictive controller according to some embodiments of the invention.

Figure 8A:
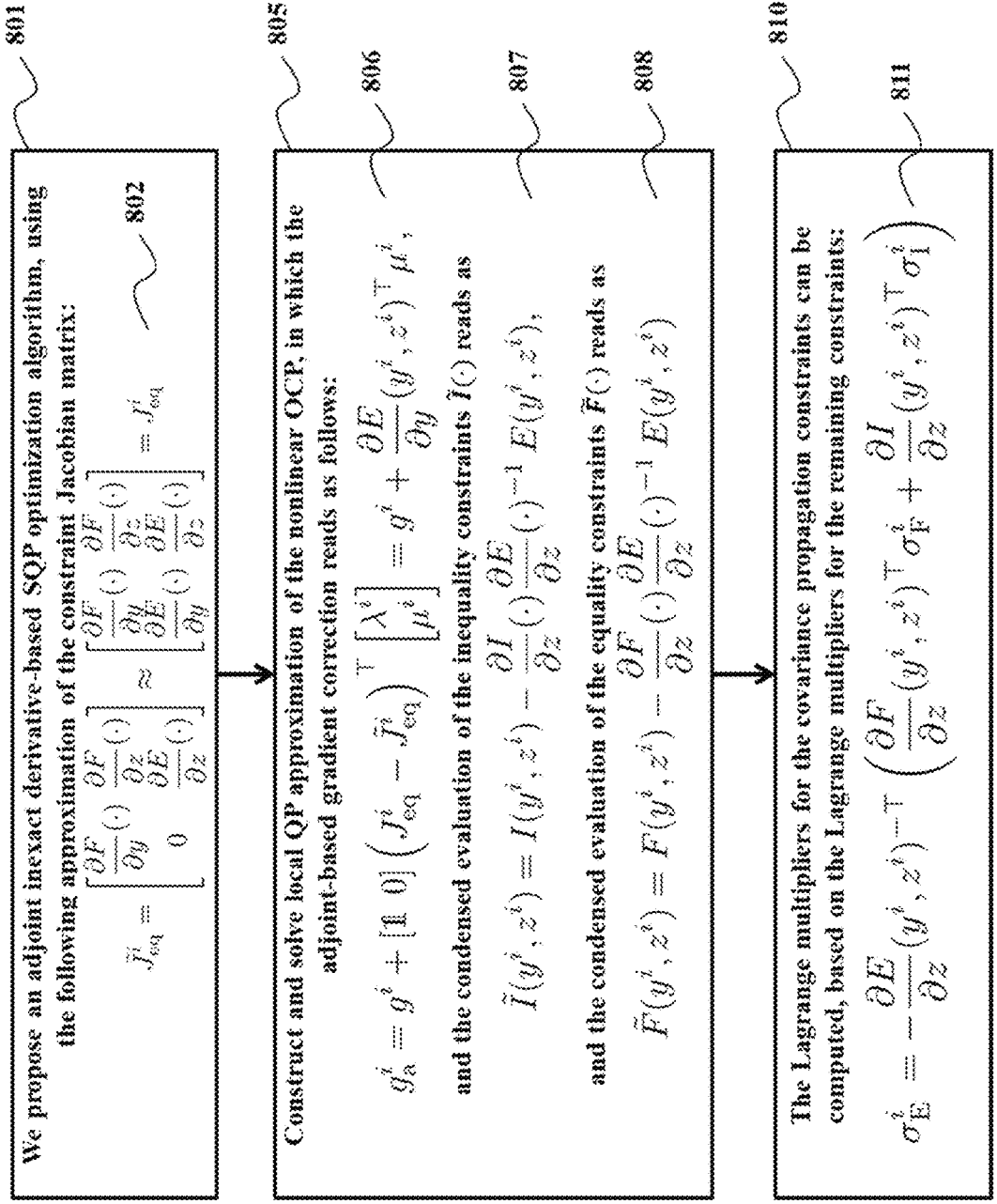
FIG. 8A is a block diagram of a Jacobian matrix approximation and corresponding adjoint-based gradient correction, condensed constraint evaluations and a Lagrange multiplier expansion step for the implementation of an adjoint-based inexact SQP optimization algorithm, according to some embodiments.

FIG. 8A shows a block diagram of a particular approximation of the constraint Jacobian matrix 801 that allows a computationally efficient numerical elimination for the trajectory of updates to the Cholesky factors for the state covariance matrices $\Delta z^i$, resulting in an adjoint-based gradient correction 806 and condensed evaluations of the inequality constraints $\tilde{I}(\cdot)$ 807 and of the equality constraints $\tilde{F}(\cdot)$ 808 in the local (convex) QP approximation of the constrained nonlinear OCP 805. In addition, an expansion step can be used to compute the Lagrange multiplier values $\sigma_E^i$ for the covariance propagation equality constraints 810, given the Lagrange multiplier values $\sigma_F^i$ and $\sigma_I^i$ for the equality and inequality constraints, respectively. More specifically, the constraint Jacobian approximation 802 can completely avoid the evaluation of the derivatives $$\frac{\partial E}{\partial y}(\cdot)$$

in 652:

$$J_{eq}^i = \begin{bmatrix} \frac{\partial F}{\partial y}(\cdot) & \frac{\partial F}{\partial z}(\cdot) \\ 0 & \frac{\partial E}{\partial z}(\cdot) \end{bmatrix} \approx \begin{bmatrix} \frac{\partial F}{\partial y}(\cdot) & \frac{\partial F}{\partial z}(\cdot) \\ \frac{\partial E}{\partial y}(\cdot) & \frac{\partial E}{\partial z}(\cdot) \end{bmatrix} = \tilde{J}_{eq}^i$$

such that the updates to the Cholesky factors for the state covariance matrices $\Delta z^i$ can be eliminated numerically from the local (convex) QP approximation at a relatively small computational cost and while preserving the block-structured sparsity of the optimization problem. For example, in some embodiments of the invention, the updates to the Cholesky factors for the state covariance matrices can be eliminated numerically as $$\Delta z^i = -\frac{\partial E}{\partial z}(y^i, z^i)^{-1} E(y^i, z^i)$$

725.

Some embodiments of the invention are based on the realization that the constraint Jacobian approximation 802 can additionally allow the method to avoid the costly evaluation of the complete constraint Jacobian matrices $$\frac{\partial E}{\partial z}(\cdot) \text{ and/or } \frac{\partial F}{\partial z}(\cdot)$$

in 652, but it instead requires one or multiple relatively cheap evaluations of forward directional derivatives $$\frac{\partial E}{\partial z}d, \frac{\partial F}{\partial z}d$$

and/or one or multiple relatively cheap evaluations of backward/adjoint directional derivatives $$\frac{\partial E^T}{\partial z}d,$$

$$\frac{\partial F^T}{\partial z}d,$$

where d denotes a column vector with the seed values for each of the directional derivatives. In addition, some embodiments of the invention are based on the realization that the constraint Jacobian matrix $$\frac{\partial E}{\partial z}(\cdot)$$

is invertible, and therefore relatively cheap evaluations of forward directional derivatives $$\frac{\partial E^{-1}}{\partial z}d$$

and/or backward/adjoint directional derivatives $$\frac{\partial E^{-T}}{\partial z}d$$

can additionally be used by the inexact derivative-based optimization algorithm in the stochastic predictive controller. In some embodiments of the invention, directional derivatives can be computed efficiently using numerical differentiation, symbolic differentiation or algorithmic differentiation (AD) techniques.

Some embodiments of the invention are based on the realization that the gradient vector in the local (convex) QP approximation needs to include an adjoint-based gradient correction in order to be able to ensure convergence of the resulting SQP optimization algorithm to a feasible and optimal solution of the constrained NLP 350. This gradient correction depends on the quality of the approximation for the constraint Jacobian matrices of the equality and/or inequality constraints in the local QP approximation of the NLP, i.e., $$g_a^i - g^i + [\tilde{J}_{eq}^i 0](\tilde{J}_{eq}^i - J_{eq}^i)^T \begin{bmatrix} \lambda^i \\ \mu^i \end{bmatrix} = g^i + \frac{\partial E}{\partial y}(y^i, z^i)^T \mu^i,$$

where $g^i$ is the objective gradient vector as in 641 and $g_a^i$ is the corrected gradient vector 806, based on a backward/adjoint directional derivative evaluation $$\frac{\partial E}{\partial y}(\cdot)^T \mu^i.$$

Some embodiments of the invention are based on the realization that an adjoint derivative vector evaluation $$\frac{\partial E}{\partial y}(\cdot)^T \mu^i$$

is considerably cheaper to compute, compared to a complete Jacobian matrix evaluation $$\frac{\partial E}{\partial y}(\cdot),$$

e.g., by using the backward or adjoint mode of algorithmic differentiation (AD).

Based on the constraint Jacobian approximation 802, the updates to the Cholesky factors for the state covariance matrices can be eliminated efficiently and numerically as $$\Delta z^i = -\frac{\partial E}{\partial z}(y^i, z^i)^{-1} E(y^i, z^i) 725,$$

resulting in the condensed evaluation of the inequality constraints $\tilde{I}(\cdot)$ 807 that read as $$\tilde{I}(y^i, z^i) = I(y^i, z^i) - \frac{\partial I}{\partial z}(\cdot)\frac{\partial E}{\partial z}(\cdot)^{-1}E(y^i, z^i),$$

Similarly, based on the updates to the Cholesky factors for the state covariance matrices $$\Delta z^i = -\frac{\partial E}{\partial z}(y^i, z^i)^{-1}E(y^i, z^i)725,$$

the condensed evaluation of the equality constraints $\tilde{F}(\cdot)$ 808 read as $$\tilde{F}(y^i, z^i) = F(y^i, z^i) - \frac{\partial F}{\partial z}(\cdot)\frac{\partial E}{\partial z}(\cdot)^{-1}E(y^i, z^i)$$

After solving the resulting local (convex) QP approximation, the sequence of Cholesky factors for the state covariance matrix values can be updated as $z^{i+1}=z^i+\alpha^i\Delta z^i$ 732 and using $$\Delta z^i = -\frac{\partial E}{\partial z}(y^i, z^i)^{-1}E(y^i, z^i)725.$$

The Lagrange multiplier values for the covariance propagation constraints $\sigma_E^i$ can be computed, based on the Lagrange multiplier values for the equality constraints $\sigma_F^i$ and for the inequality constraints $\sigma_I^i$ that can be obtained directly from the local (convex) QP solution, by using the following expansion step 811

$$\sigma_E^i = -\frac{\partial E}{\partial z}(y^i, z^i)^{-\top}\left(\frac{\partial F}{\partial z}(y^i, z^i)^{-\top}\sigma_F^i + \frac{\partial I}{\partial z}(y^i, z^i)^{\top}\sigma_I^i\right)$$

which is used for the adjoint-based gradient correction of the local QP subproblem in the next iteration of the inexact SQP optimization algorithm.

Figure 8B:
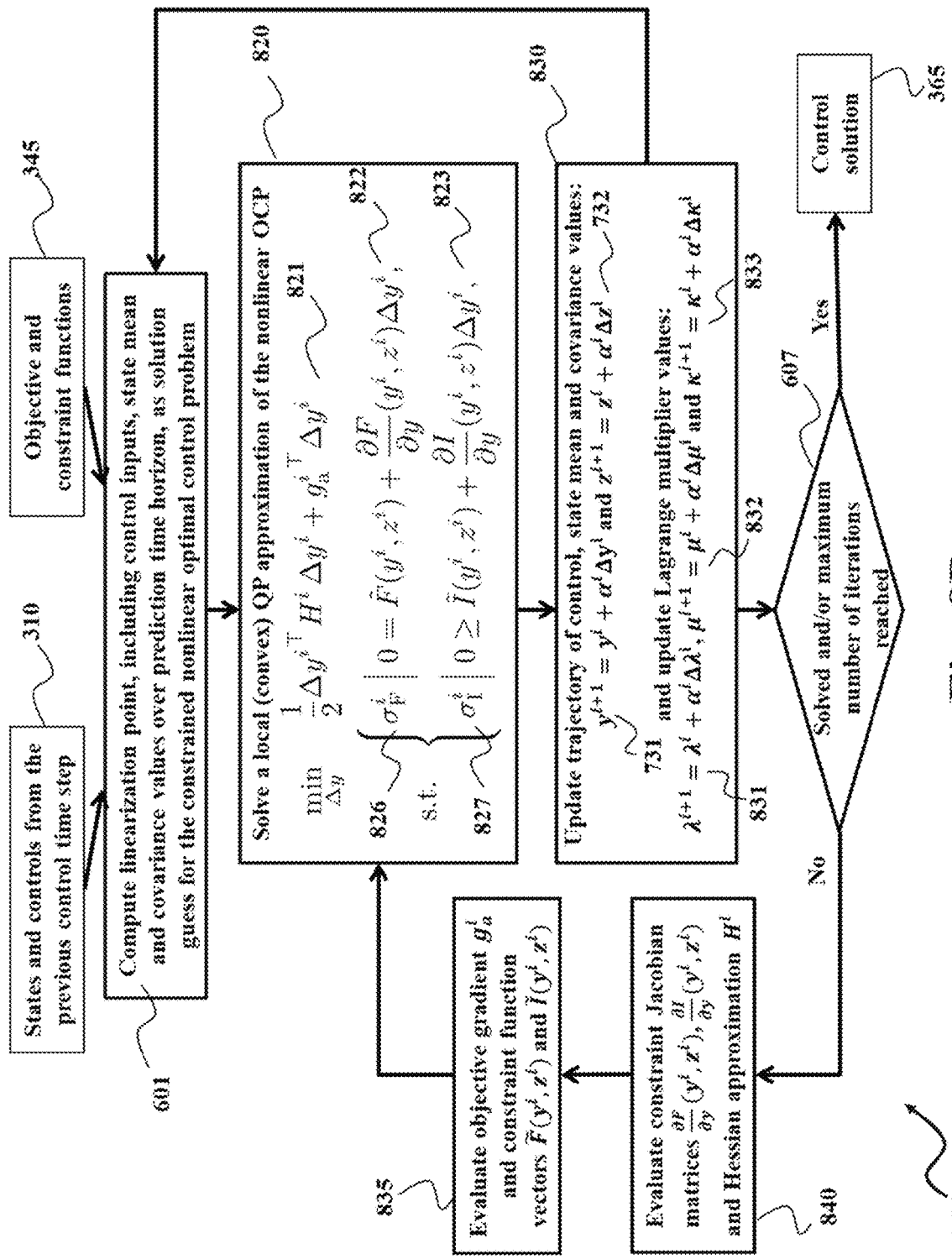
FIG. 8B is a block diagram of an iterative inexact SQP optimization algorithm for the efficient implementation of the stochastic predictive controller based on an adjoint-based gradient correction to improve convergence properties.

FIG. 8B shows a block diagram of an inexact SQP optimization algorithm for the efficient implementation of the stochastic predictive controller, using an adjoint-based gradient correction to improve the convergence properties, according to some embodiments of the invention. The derivative-based iterative optimization procedure avoids the evaluation and storage of the complete constraint Jacobian matrices $$\frac{\partial E}{\partial y}(\cdot), \frac{\partial E}{\partial z}(\cdot) \text{ and/or } \frac{\partial F}{\partial z}(\cdot)$$

in 652 and instead relies on the evaluation of one or multiple forward and/or backward directional derivative evaluations per SQP iteration, which are considerably cheaper to compute and store effectively. For example, some embodiments of the invention rely on the evaluation of forward directional derivatives to compute the updates to the Cholesky factors for the state covariance matrices $$\Delta z^i = -\frac{\partial E}{\partial z}(y^i, z^i)^{-1}E(y^i, z^i)725,$$

which can be used to compute $$\tilde{I}(y^i, z^i) = I(y^i, z^i) + \frac{\partial I}{\partial z}(\cdot)\Delta z^i 807 \text{ and } \tilde{F}(y^i, z^i) = F(y^i, z^i) + \frac{\partial F}{\partial z}(\cdot)\Delta z^i$$

808 based on forward directional derivatives. In addition, some embodiments of the invention rely on the evaluation of backward/adjoint directional derivatives $$\frac{\partial E}{\partial y}(\cdot)^{\top}\mu^i$$

to compute the corrected gradient vector $g_a^i$ 806, and backward/adjoint directional derivatives $$\frac{\partial E}{\partial z}(\cdot)^{-\top}d,$$

where d is a column vector that can be computed based on the backward/adjoint directional derivatives for the remaining constraints, i.e., $$d = \frac{\partial F}{\partial z}(\cdot)^{\top}\sigma_F^i + \frac{\partial I}{\partial z}(\cdot)^{\top}\sigma_I^i,$$

to compute the expansion step for the Lagrange multiplier values $$\sigma_E^i = -\frac{\partial E}{\partial z}(\cdot)^{-\top}d 811.$$

More specifically, some embodiments of the invention solve a local (convex) QP approximation of the nonlinear OCP 820 for a given sequence of mean state and control input values $y^i$ and a given sequence of Cholesky factors for the state covariance matrix values $z^i$ as follows $$\min_{\Delta y}\frac{1}{2}\Delta y^{i\top}H^i\Delta y^i + g_a^{i\top}\Delta y^i$$

$$\text{s.t.}\begin{cases}\sigma_F^i\bigg|0 = \tilde{F}(y^i, z^i) + \frac{\partial F}{\partial y}(y^i, z^i)\Delta y^i, \\ \sigma_I^i\bigg|0 \geq \tilde{I}(y^i, z^i) + \frac{\partial I}{\partial y}(y^i, z^i)\Delta y^i,\end{cases}$$

which includes only deviation variables for the mean state and control values $\Delta y^i$ as optimization variables $$\Delta y=[\Delta u_0^T, \Delta s_1^T, \Delta u_1^T, \ldots, \Delta s_{N-1}^T, \Delta u_{N-1}^T, \Delta s_N^T]^T$$

and therefore considerably reduces the computational complexity and memory requirements for an implementation of the adjoint-based inexact SQP optimization algorithm in the stochastic predictive controller.

Unlike the inexact SQP optimization algorithm in FIG. 7B, the adjoint-based inexact QP approximation 820 for the nonlinear OCP in FIG. 8B includes the adjoint-based gradient correction $g_a^i$ 806 in the linear-quadratic objective function 821, the condensed evaluation of the equality constraints $\tilde{F}(\cdot)$ 808 and the condensed evaluation of the inequality constraints $\tilde{I}(\cdot)$ 807 in the linearized equality constraints 822 and the linearized inequality constraints 823 of the local (convex) QP approximation, respectively. The optimal Lagrange multiplier values for the equality and inequality constraints are, respectively, denoted as $\sigma_F^i$ 826 and $\sigma_I^i$ 827 for the local QP solution in the $i^{th}$ iteration of the adjoint-based inexact SQP optimization algorithm.

A solution guess for the NLP 601 is used to construct and solve the local QP approximation 820 in order to update the current sequence of control inputs, state mean and covariance values over the prediction time horizon 830 as $y^{i+1}=y^i+\alpha^i\Delta y^i$ 731 and $z^{i+1}=z^i+\alpha^i\Delta z^i$ 732, where $\Delta y^i$ denotes the solution of primal optimization variables for the local (convex) QP approximation 820 and $$\Delta z^i = -\frac{\partial E}{\partial z}(y^i, z^i)^{-1} E(y^i, z^i)$$

725 denotes the sequence of updates to the Cholesky factors for the state covariance matrices, using an approximate inexact linearization of the covariance propagation equations $0=E(y,z)$ 633. In some embodiments of the invention, a step size value $\alpha^i \in (0,1]$ can be selected based on a line search procedure in combination with a particular merit function to ensure progress and convergence for the constrained optimization algorithm. In some embodiments of the invention, the optimization algorithm updates the Lagrange multiplier values for the equality and inequality constraints as $\lambda^{i+1}=\lambda^i+\alpha^i\Delta\lambda^i$ 831, $\mu^{i+1}=\mu^i+\alpha^i\Delta\mu^i$ 832 and $\kappa^{i+1}=\kappa^i+\alpha^i\Delta\kappa^i$ 833, based on the update values $\Delta\lambda^i=\sigma_F^i-\lambda^i$, $\Delta\mu^i=\sigma_E^i-\mu^i$ and $\Delta\kappa^i=\sigma_I^i-\kappa^i$, respectively, using the optimal Lagrange multiplier values from the local QP solution in the $i^{th}$ SQP iteration. Alternatively, in some embodiments of the invention, the optimization algorithm updates the Lagrange multiplier values for the equality and inequality constraints as $\lambda^{i+1}=\lambda^i+\Delta\lambda^i=\sigma_F^i$ 831, $\mu^{i+1}=\mu^i+\Delta\mu^i=\sigma_E^i$ 832 and $\kappa^{i+1}=\kappa^i+\Delta\kappa^i=\sigma_I^i$ 833.

Each iteration of the optimization procedure checks whether the solution to the constrained NLP has been found and/or whether a maximum number of iterations has been reached 607. The (approximately) optimal and/or feasible control solution 365 has been found if the termination condition 607 is satisfied, otherwise the procedure needs to evaluate the (approximate) constraint Jacobian matrices $$\frac{\partial F}{\partial y}(y^i, z^i), \frac{\partial I}{\partial y}(y^i, z^i)$$

and Hessian approximation $H^i$ 840 as well as the (approximate) objective gradient $g_a^i$ 806 and approximated constraint function vectors $\tilde{F}(y^i,z^i)$ 808 and $\tilde{I}(y^i,z^i)$ 807 in 835 in order to construct the local (convex) QP approximation 820 for the next iteration of the inexact SQP optimization algorithm in the stochastic predictive controller.

Similar to FIG. 7B, the adjoint-based SQP optimization algorithm of FIG. 8B results in a considerable reduction of the computational complexity and the memory requirements for the implementation of the stochastic predictive controller. More specifically, if N denotes the number of intervals in the prediction time horizon, $n_x$ denotes the number of state variables and $n_u$ denotes the number of control input variables, then $y \in R^{N(n_x+n_u)}$ and $$z \in R^{N \frac{n_x(n_x+1)}{2}}$$

due to the sparsity structure of Cholesky factors for each of the state covariance matrices. A block-structured sparsity exploiting convex optimization algorithm asymptotically requires $O(N(n_x+n_x^2+n_u)^2)$ available memory and $O(N(n_x+n_x^2+n_u)^3)$ computations to solve the convex QP subproblem 640 in an exact Jacobian-based SQP optimization algorithm. Instead, a block-structured sparsity exploiting convex optimization algorithm asymptotically requires only $O(N(n_x+n_u)^2)$ available memory and $O(N(n_x+n_u)^3)$ computations to solve one or multiple inexact Jacobian-based local convex QP approximations 820 at each control time step to implement the stochastic predictive controller.

FIG. 8C shows an algorithmic description of a real-time variant of the adjoint-based inexact SQP optimization algorithm to implement the stochastic nonlinear model predictive controller 840, according to some embodiments of the invention. Based on a solution guess $(y^i,z^i,\lambda^i,\mu^i,\kappa^i)$ and affine feedback gain matrix K 841, the real-time adjoint-based SQP optimization algorithm 840 computes an updated solution guess $(y^{i+1},z^{i+1},\lambda^{i+1},\mu^{i+1},\kappa^{i+1})$ 856 for the constrained NLP 350 at each control time step of the stochastic predictive controller. The algorithmic procedure in FIG. 8C describes a real-time optimization algorithm because it performs a limited number of iterations to update the NLP solution guess from one control time step to the next, resulting in fast feedback to the control system 120 under uncertainty 125 while respecting strict timing constraints for the online computations on the embedded microprocessor and allowing the optimization algorithm 840 to converge to a (approximately) feasible and/or optimal control solution for the constrained NLP in real time. In some embodiments of the invention, only one real-time SQP iteration 840 is performed at each control time step to implement the stochastic predictive controller.

The real-time SQP optimization algorithm 840 consists of a preparation step for the local (convex) QP approximation 845, followed by the block-sparse QP solution 850 that allows fast feedback of the control action to the real process 855 and an expansion step for the eliminated primal and dual optimization variables 853 that is used to update all the primal and dual optimization variables 860. The preparation step can compute the block-diagonal Hessian approximation $H^i$ 846, where each block corresponds to an interval in the prediction time horizon, i.e., for k=0, . . . , N, and the adjoint-based gradient correction $g_a^i$ 806. In addition, the preparation step can evaluate the block-sparse Jacobian matrices $$\frac{\partial F}{\partial y}(y^i, z^i) \text{ and } \frac{\partial I}{\partial y}(y^i, z^i) 847,$$

and the condensed evaluations of the equality constraints $\tilde{F}(\cdot)$ 808 and the condensed evaluation of the inequality constraints $\tilde{I}(\cdot)$ 807 in the local (convex) QP approximation 820. Some embodiments of the invention use the forward and/or adjoint mode of AD to efficiently evaluate the matrices and vectors 846-848 in the preparation of the QP subproblem 845.

After preparation of the local (convex) QP subproblem 845 and after receiving the current state estimate $\hat{x}_t$ and state uncertainty $\hat{P}_t$ 851, the solution step 850 proceeds by solving the block-structured QP in order to obtain $\Delta y^i$, $\sigma_F^i$ and $\sigma_I^i$ 852 and followed by a computation of $$\Delta z^i = -\frac{\partial E}{\partial z}(y^i, z^i)^{-1} E(y^i, z^i)$$

725 and $\sigma_E^i$ 811 in the expansion step 853. In some embodiments of the invention, based on the primal update values $\Delta y^i$, $\Delta z^i$ and based on the dual update values $\Delta \lambda^i = \sigma_F^i - \lambda^i$, $\Delta \mu^i = \sigma_E^i - \mu^i$ and $\Delta \kappa^i = \sigma_I^i - \kappa^i$, the real-time SQP optimization algorithm 840 includes a search for a step size selection 870, to compute $\alpha^i \in (0,1]$ such that a sufficient decrease condition holds 871 for a merit function, e.g., $$m(y^i + \alpha^i \Delta y^i, z^i + \alpha^i \Delta z^i; \rho) \leq$$
$$m(y^i, z^i; \rho) + \alpha^i \eta [\nabla_y m(y^i, z^i; \rho)^T \nabla_z m(y^i, z^i; \rho)^T] \begin{bmatrix} \Delta y^i \\ \Delta z^i \end{bmatrix}$$

where m(•) denotes a merit function for the constrained nonlinear OCP, and given the parameter values $\rho > 0$ and $\eta \in (0,1)$. Based on the step size selection 870, the optimization algorithm can update the primal optimization variables $y^{i+1} = y^i + \alpha^i \Delta y^i$ 731 and $z^{i+1} = z^i + \alpha^i \Delta z^i$ 732, and the dual optimization variables $\lambda^{i+1} = \lambda^i + \alpha^i \Delta \lambda^i$ 831, $\mu^{i+1} = \mu^i + \alpha^i \Delta \mu^i$ 832 and $\kappa^{i+1} = \kappa^i + \alpha^i \Delta \kappa^i$ 833 in the update step 860. Based on the updated trajectory of control inputs, state mean and covariance values, the real-time SNMPC controller provides the control feedback action $u^* = u_0^{i+1} + K \hat{x}_t$ to the process 855. Finally, in some embodiments of the invention, a shifting procedure can be used to compute a desirable solution guess for the constrained nonlinear OCP at the next time step 857, in order to improve the convergence properties of the optimization algorithm and therefore to improve the overall performance of the stochastic predictive controller.

Figure 8D:
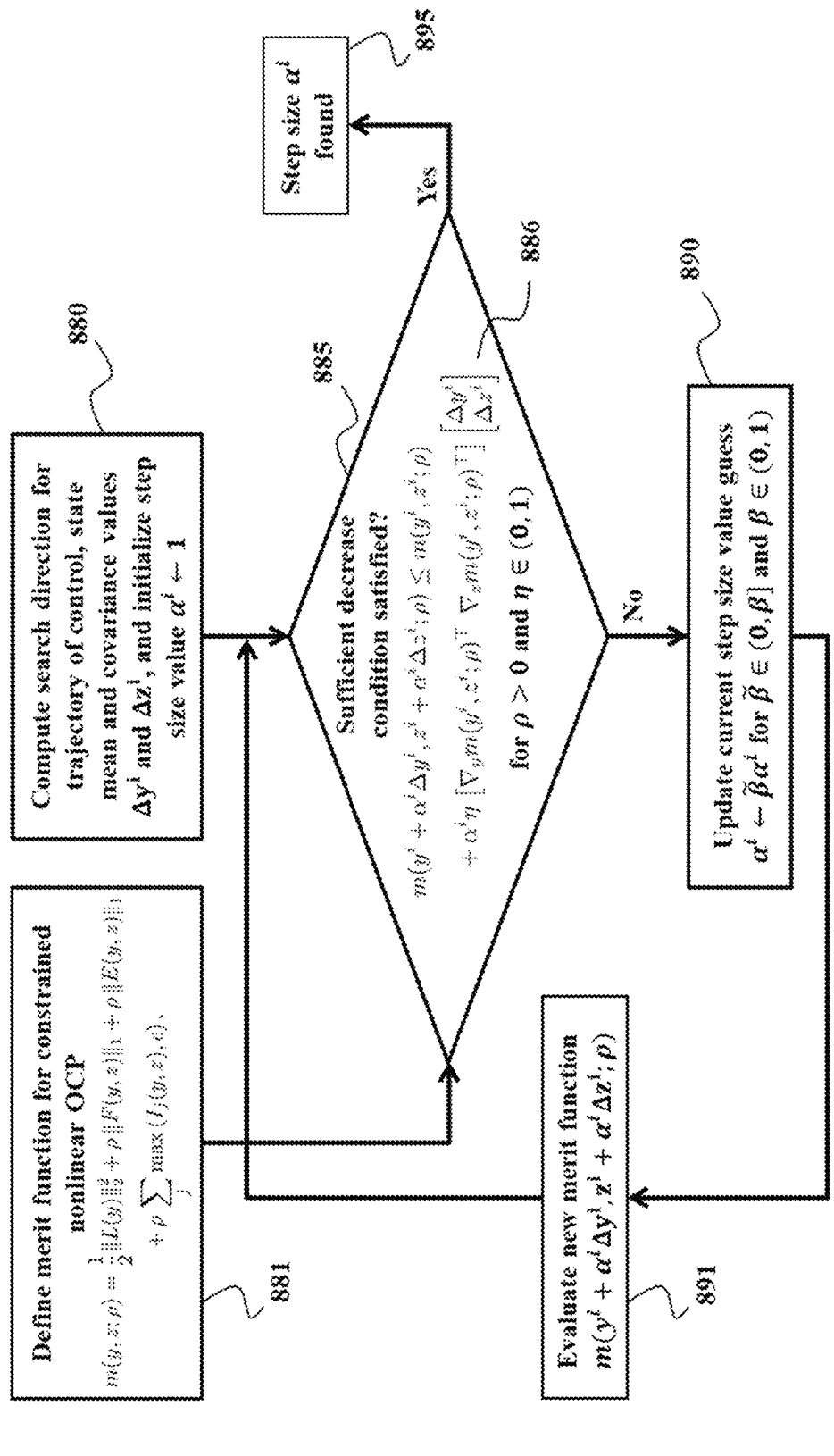
FIG. 8D shows an example of a search procedure for a desirable step size selection, such that a sufficient decrease condition is satisfied for the step size value of the real-time adjoint-based SQP optimization algorithm in the stochastic predictive controller, according to some embodiments of the invention.

FIG. 8D shows an example of a search procedure for a step size selection 870, to compute a step size value $\alpha^i \in (0,1]$ 895 such that a sufficient decrease condition is satisfied 885 for the real-time adjoint-based SQP optimization algorithm 840 in the stochastic predictive controller, according to some embodiments of the invention. Some embodiments of the invention are based on a merit function that is defined for the constrained nonlinear OCP 881 such as, for example, $$m(y, z; \rho) = \frac{1}{2} \|L(y)\|_2^2 + \rho \|F(y, z)\|_1 + \rho \|E(y, z)\|_1 + \rho \sum_j \max(I_j(y, z), \epsilon),$$

which corresponds to an exact $l_1$ penalty function for the constrained NLP 630, taking into account both optimality with respect to the objective function 631 as well as feasibility with respect to the equality constraints 632-633 and feasibility with respect to the inequality constraints 634, based on a relatively large penalty parameter value $\rho > 0$ and a relatively small feasibility tolerance value $\epsilon \geq 0$. Some embodiments of the invention are based on the realization that the $l_1$ merit function 881 is not differentiable but directional derivatives exist which can be sufficient for the step size selection procedure 870.

Based on the merit function 881 and given the search direction for the trajectory of control inputs, state mean and covariance values in $\Delta y^i$, $\Delta z^i$ 880, the step size selection procedure can initialize a guess for the step size value as $\alpha^i \leftarrow 1$. Then, each iteration of the step size selection procedure 870 checks whether a sufficient decrease condition is satisfied 885 such as, for example, $$m(y^i + \alpha^i \Delta y^i, z^i + \alpha^i \Delta z^i; \rho) \leq$$
$$m(y^i, z^i; \rho) + \alpha^i \eta [\nabla_y m(y^i, z^i; \rho)^T \nabla_z m(y^i, z^i; \rho)^T] \begin{bmatrix} \Delta y^i \\ \Delta z^i \end{bmatrix}$$

where m(•) denotes a merit function for the constrained nonlinear OCP 881, and given the corresponding parameter values $\rho > 0$ and $\eta \in (0,1)$. If the sufficient decrease condition 886 is satisfied, then a desirable step size value $\alpha^i \in (0,1]$ has been found 895. If the sufficient decrease condition 886 is not satisfied, in some embodiments of the invention, the step size selection procedure 870 can update the current guess for the step size value, e.g., using $\alpha^i \leftarrow \tilde{\beta} \alpha^i$ for $\tilde{\beta} \in (0, \beta]$ and $\beta \in (0,1)$ 890 such that the value for $\alpha^i$ decreases in each iteration of the step size selection procedure 870 until the sufficient decrease condition 886 is satisfied and a desirable step size value $\alpha^i \in (0,1]$ has been found 895. Based on the new guess for the step size value, the merit function 881 needs to be evaluated to compute the new value $m(y^i + \alpha^i \Delta y^i, z^i + \alpha^i \Delta z^i; \rho)$ 891 in order to check whether the sufficient decrease condition is satisfied 885 and until a desirable step size value $\alpha^i \in (0,1]$ has been found 895. Some embodiments of the invention are based on the realization that the maximal step size value $\alpha^i \in (0,1]$ for which the sufficient decrease condition 886 is satisfied, may lead to the best convergence properties for the optimization algorithm 840 in the stochastic predictive controller.

Figure 9A:
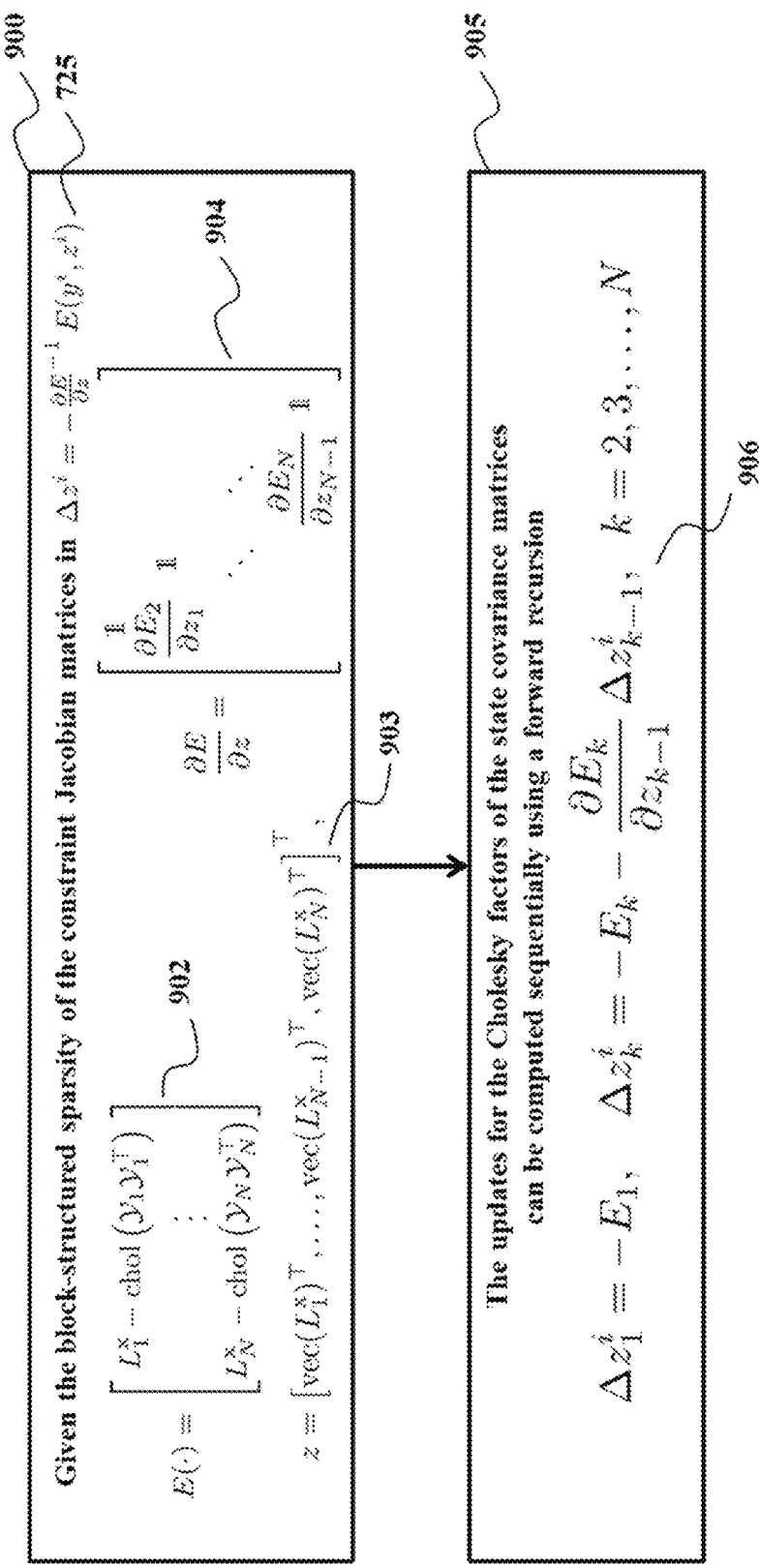
FIG. 9A is a block diagram of the exploitation of the block-structured sparsity of the constraint Jacobian matrices in a forward recursion to compute a sequence of updates for the Cholesky factors of the state covariance matrices in the adjoint-based SQP optimization algorithm.

FIG. 9A shows a block diagram of the numerical exploitation 900 of the block-structured sparsity of the constraint Jacobian matrix $$\frac{\partial E}{\partial z} 904$$

$$\frac{\partial E}{\partial z} = \begin{bmatrix} \mathbb{1} & & & \\ \frac{\partial E_2}{\partial z_1} & \mathbb{1} & & \\ & \ddots & \ddots & \\ & & \frac{\partial E_N}{\partial z_{N-1}} & \mathbb{1} \end{bmatrix}$$

due to the stage-wise structured coupling in the covariance propagation equations $E(y,z)=0$ 902, in order to compute a sequence of update values for the Cholesky factors 903 of the state covariance matrices $$\Delta z^i = -\frac{\partial E^{-1}}{\partial z} E(y^i, z^i)$$

725 in the local (convex) QP approximation 820 of the adjoint-based inexact SQP optimization algorithm for the SNMPC controller. The block bi-diagonal sparsity structure of the invertible constraint Jacobian matrix $$\frac{\partial E}{\partial z}$$

904 can be used directly to compute the update values for the Cholesky factors of the state covariance matrices 725 based on the following forward recursion formulas 905

$$\Delta z_1^j = -E_1,$$

$$\Delta z_k^j = -E_k - \frac{\partial E_k}{\partial z_{k-1}} \Delta z_{k-1}^j,$$

using an initial value $\Delta z_1^i = -E_1(y^i, z^i)$ to compute recursively a sequence of update values $\Delta z_k^i$ 906 for k=2,3, ..., N.

Figure 9B:
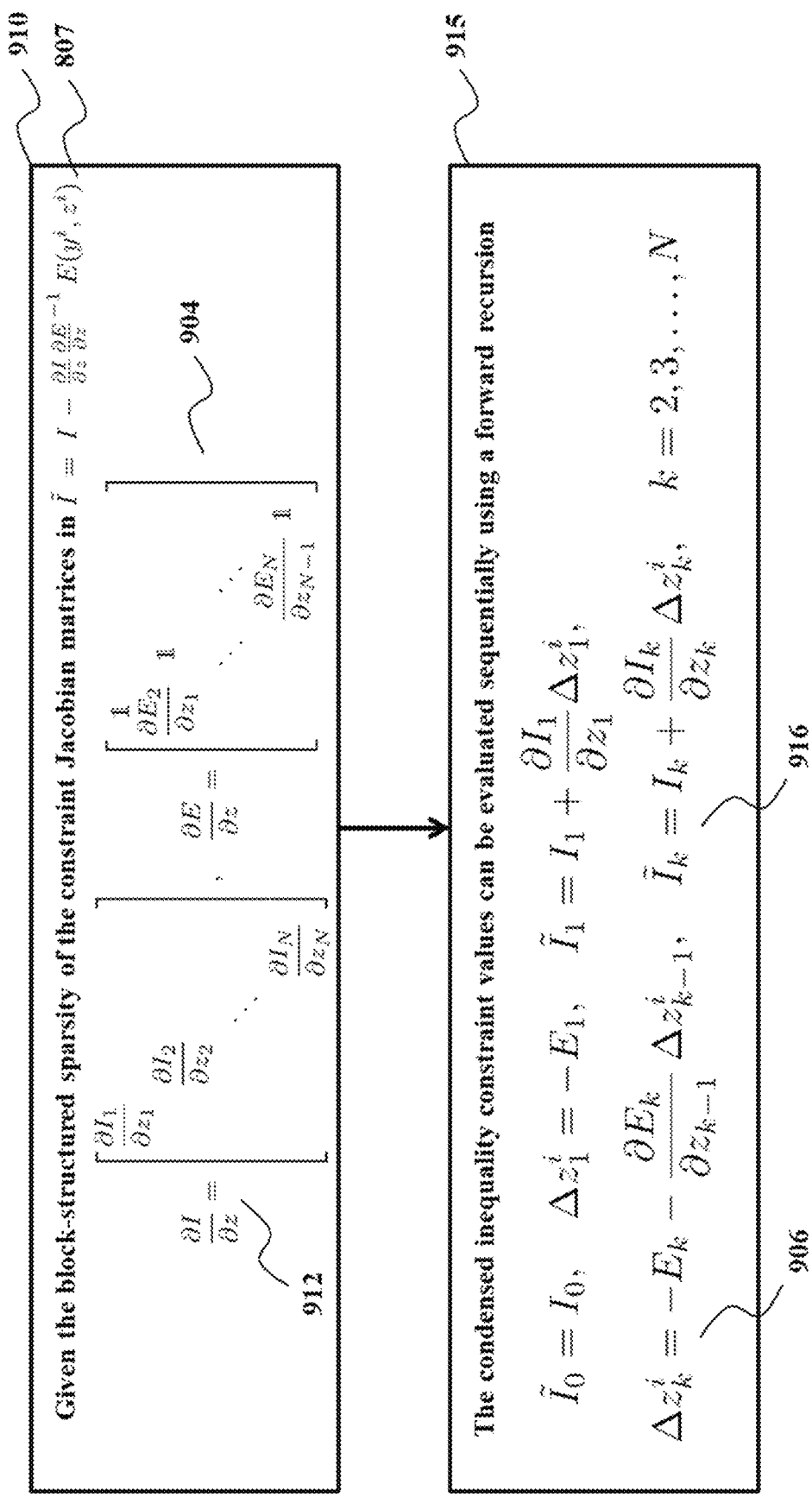
FIG. 9B is a block diagram of the exploitation of the block-structured sparsity of the constraint Jacobian matrices in a forward recursion to compute the condensed inequality constraint values in the adjoint-based SQP optimization algorithm.

FIG. 9B shows a block diagram of the numerical exploitation of the block-structured sparsity of the constraint Jacobian matrices 910

$$\frac{\partial I}{\partial z} = \begin{bmatrix} \frac{\partial I_1}{\partial z_1} & & & \\ & \frac{\partial I_2}{\partial z_2} & & \\ & & \ddots & \\ & & & \frac{\partial I_N}{\partial z_N} \end{bmatrix},$$

$$\frac{\partial E}{\partial z} = \begin{bmatrix} \mathbb{1} & & & \\ \frac{\partial E_2}{\partial z_1} & \mathbb{1} & & \\ & \ddots & \ddots & \\ & & \frac{\partial E_N}{\partial z_{N-1}} & \mathbb{1} \end{bmatrix},$$

in order to compute the condensed evaluation of the inequality constraint values $\tilde{I}=$ $$\tilde{I} = I - \frac{\partial I}{\partial z}\frac{\partial E^{-1}}{\partial z} E(y^i, z^i) = I + \frac{\partial I}{\partial z}\Delta z^i \, 807,$$

using the sequence of update values for the Cholesky factors of the state covariance matrices $\Delta z^i$ 725, in the local QP approximation 820 of the adjoint-based inexact SQP optimization algorithm for the SNMPC controller. The block-diagonal sparsity structure of the constraint Jacobian matrix $$\frac{\partial I}{\partial z}$$

912 and the block bi-diagonal sparsity structure of the invertible constraint Jacobian matrix $$\frac{\partial E}{\partial z}$$

904 can be used directly to efficiently compute the condensed evaluation of the inequality constraint values 807 based on the following forward recursion formulas 915

$$\tilde{I}_0 = I_0,$$

$$\Delta z_1^j = -E_1,$$

$$\tilde{I}_1 = I_1 + \frac{\partial I_1}{\partial z_1}\Delta z_1^j,$$

$$\Delta z_k^j = -E_k - \frac{\partial E_k}{\partial z_{k-1}}\Delta z_{k-1}^j,$$

$$\tilde{I}_k = I_k + \frac{\partial I_k}{\partial z_k}\Delta z_k^j,$$

using initial values $\tilde{I}_0 = I_0$ and $\Delta z_1^i = -E_1(y^i, z^i)$ to compute recursively a sequence of update values $\Delta z_k^i$ 906 for k=2,3, ..., N and of condensed inequality constraint values $\tilde{I}_k$ 916 for k=1,2,3, ..., N, in order to compute each of the condensed inequality constraint values $\tilde{I}=[\tilde{I}_0^T, \tilde{I}_1^T, ..., \tilde{I}_N^T]^T$ in 823.

Figure 9C:
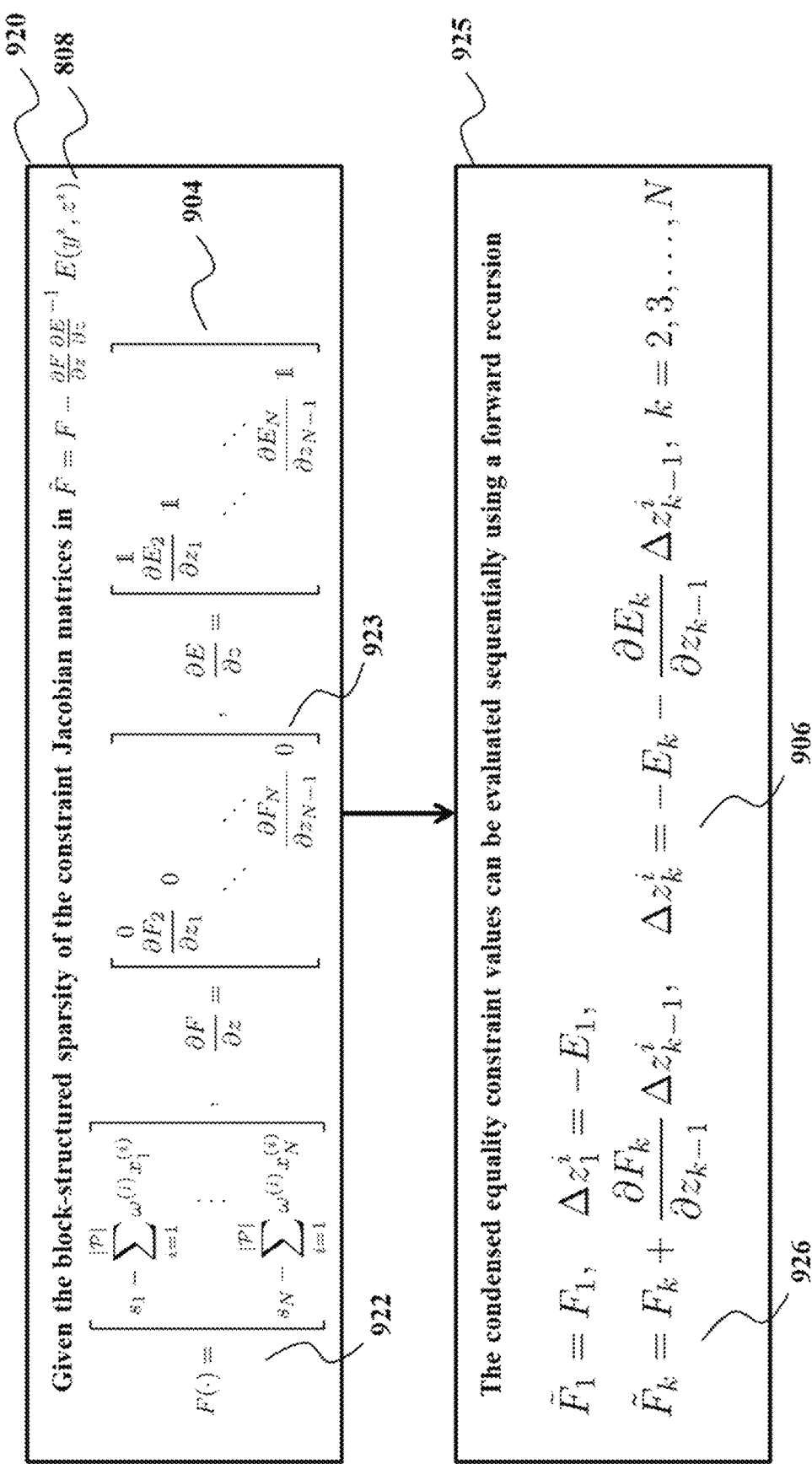
FIG. 9C is a block diagram of the exploitation of the block-structured sparsity of the constraint Jacobian matrices in a forward recursion to compute the condensed equality constraint values in the adjoint-based SQP optimization algorithm.

FIG. 9C shows a block diagram of the numerical exploitation of the block-structured sparsity of the constraint Jacobian matrices 920

$$\frac{\partial F}{\partial z} = \begin{bmatrix} 0 & & & \\ \frac{\partial F_2}{\partial z_1} & 0 & & \\ & \ddots & \ddots & \\ & & \frac{\partial F_N}{\partial z_{N-1}} & 0 \end{bmatrix},$$

$$\frac{\partial E}{\partial z} = \begin{bmatrix} \mathbb{1} & & & \\ \frac{\partial E_2}{\partial z_1} & \mathbb{1} & & \\ & \ddots & \ddots & \\ & & \frac{\partial E_N}{\partial z_{N-1}} & \mathbb{1} \end{bmatrix},$$

due to the stage-wise structured coupling in the mean state propagation equations F(y,z)=0 922, in order to compute the condensed evaluation of the equality constraint values $$\tilde{F} = F - \frac{\partial F}{\partial z}\frac{\partial E^{-1}}{\partial z} E(y^i, z^i) = F + \frac{\partial F}{\partial z}\Delta z^i \, 808,$$

using the sequence of update values for the Cholesky factors of the state covariance matrices $\Delta z^i$ 725, in the local QP approximation 820 of the adjoint-based inexact SQP optimization algorithm for the SNMPC controller. The lower block-diagonal sparsity structure of the constraint Jacobian matrix $$\frac{\partial F}{\partial z}$$

923 and the block bi-diagonal sparsity structure of the invertible constraint Jacobian matrix $$\frac{\partial E}{\partial z}$$

904 can be used directly to efficiently compute the condensed evaluation of the equality constraint values 808 based on the following forward recursion formulas 925

$$\tilde{F}_1 = F_1,$$

$$\Delta z_1^i = -E_1,$$

$$\tilde{F}_k = F_k + \frac{\partial F_k}{\partial z_{k-1}} \Delta z_{k-1}^i,$$

$$\Delta z_k^i = -E_k - \frac{\partial E_k}{\partial z_{k-1}} \Delta z_{k-1}^i,$$

using initial values $\tilde{F}_1 = F_1$ and $\Delta z_1^i = -E_1(y^i, z^i)$ to compute recursively a sequence of update values $\Delta z_k^i$ 906 for k=2,3, ..., N and of condensed equality constraint values $\tilde{F}_k$ 926 for k=2,3, ..., N, in order to compute each of the condensed equality constraint values $\tilde{F} = [\tilde{F}_1^T, \tilde{F}_2^T, \ldots, \tilde{F}_N^T]^T$ in 822.

Figure 9D:
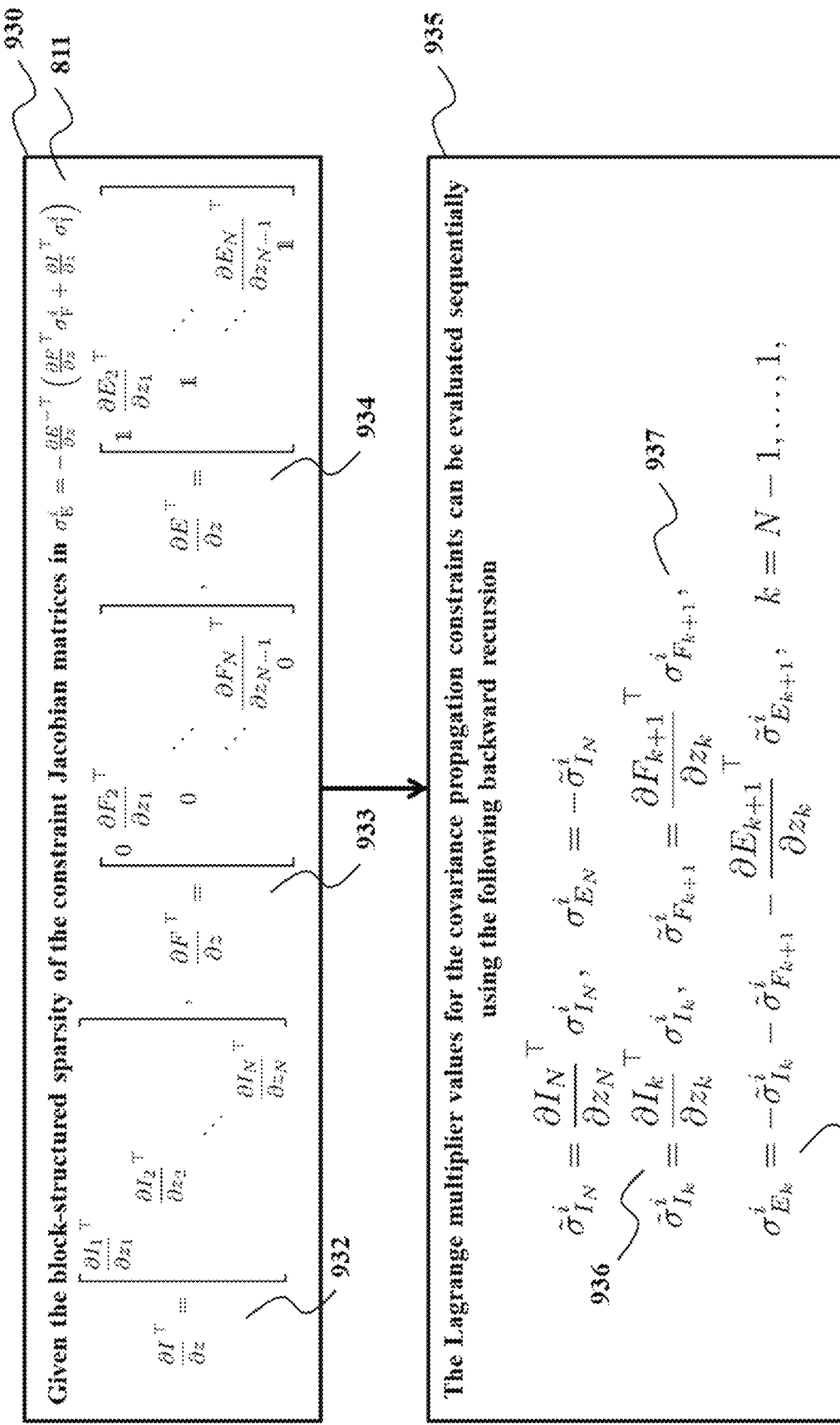
FIG. 9D is a block diagram of the exploitation of the block-structured sparsity of the constraint Jacobian matrices in a backward recursion to compute the updated Lagrange multiplier values in the adjoint-based SQP optimization algorithm.

FIG. 9D shows a block diagram of the numerical exploitation of the block-structured sparsity of the constraint Jacobian matrices 930

$$\frac{\partial I^T}{\partial z} = \begin{bmatrix} \frac{\partial I_1^T}{\partial z_1} & & & \\ & \frac{\partial I_2^T}{\partial z_2} & & \\ & & \ddots & \\ & & & \frac{\partial I_N^T}{\partial z_N} \end{bmatrix},$$

$$\frac{\partial F^T}{\partial z} = \begin{bmatrix} 0 & \frac{\partial F_2^T}{\partial z_1} & & \\ & 0 & \ddots & \\ & & \ddots & \frac{\partial F_N^T}{\partial z_{N-1}} \\ & & & 0 \end{bmatrix},$$

$$\frac{\partial E^T}{\partial z} = \begin{bmatrix} \mathbb{I} & \frac{\partial E_2^T}{\partial z_1} & & \\ & \mathbb{I} & \ddots & \\ & & \ddots & \frac{\partial E_N^T}{\partial z_{N-1}} \\ & & & \mathbb{I} \end{bmatrix}$$

in order to compute the Lagrange multiplier values for the state covariance propagation equations $$\sigma_E^i = -\frac{\partial E^{-T}}{\partial z}\left(\frac{\partial F^T}{\partial z}\sigma_F^i + \frac{\partial I^T}{\partial z}\sigma_I^i\right) = -\frac{\partial E^{-T}}{\partial z}\left(\tilde{\sigma}_F^i + \tilde{\sigma}_I^i\right)$$

811 in the expansion step 810 of the adjoint-based inexact SQP optimization algorithm for the SNMPC controller. The block-diagonal sparsity structure of the constraint Jacobian matrix $$\frac{\partial I^T}{\partial z}932,$$

the upper block-diagonal sparsity structure of the constraint Jacobian matrix $$\frac{\partial F^T}{\partial z}$$

933 and the block bi-diagonal sparsity structure of the invertible constraint Jacobian matrix $$\frac{\partial E^T}{\partial z}$$

934 can be used directly to compute the updated values for the Lagrange multipliers based on the following backward recursion formulas 935

$$\tilde{\sigma}_{I_N}^i = \frac{\partial I_N^T}{\partial z_N}\sigma_{I_N}^i, \sigma_{E_N}^i = -\tilde{\sigma}_{I_N}^i$$

$$\tilde{\sigma}_{I_k}^i = \frac{\partial I_k^T}{\partial z_k}\sigma_{I_k}^i, \tilde{\sigma}_{F_{k+1}}^i = \frac{\partial F_{k+1}^T}{\partial z_k}\sigma_{F_{k+1}}^i,$$

$$\sigma_{E_k}^i = -\tilde{\sigma}_{I_k}^i - \tilde{\sigma}_{F_{k+1}}^i - \frac{\partial E_{k+1}^T}{\partial z_k}\sigma_{E_{k+1}}^i, k = N-1, \ldots, 1,$$

using the intermediate values $\tilde{\sigma}_{I_k}^i$ 936 for k=N, N−1, ..., 1 and the intermediate values $\tilde{\sigma}_{F_k}^i$ 937 for k=N, N−1, ..., 2, and using the initial value $\sigma_{E_N}^i = -\tilde{\sigma}_{I_N}^i$ in order to compute recursively a sequence of updated Lagrange multiplier values $\sigma_{E_k}^i$ 938 for k=N, N−1, ..., 1, in order to compute each of the updated values $\sigma_E^i = [\sigma_{E_1}^{i\ T}, \sigma_{E_2}^{i\ T}, \ldots, \sigma_{E_N}^{i\ T}]^T$ in the expansion step 853 of the adjoint-based inexact SQP optimization algorithm for the SNMPC controller.

Figure 10A:
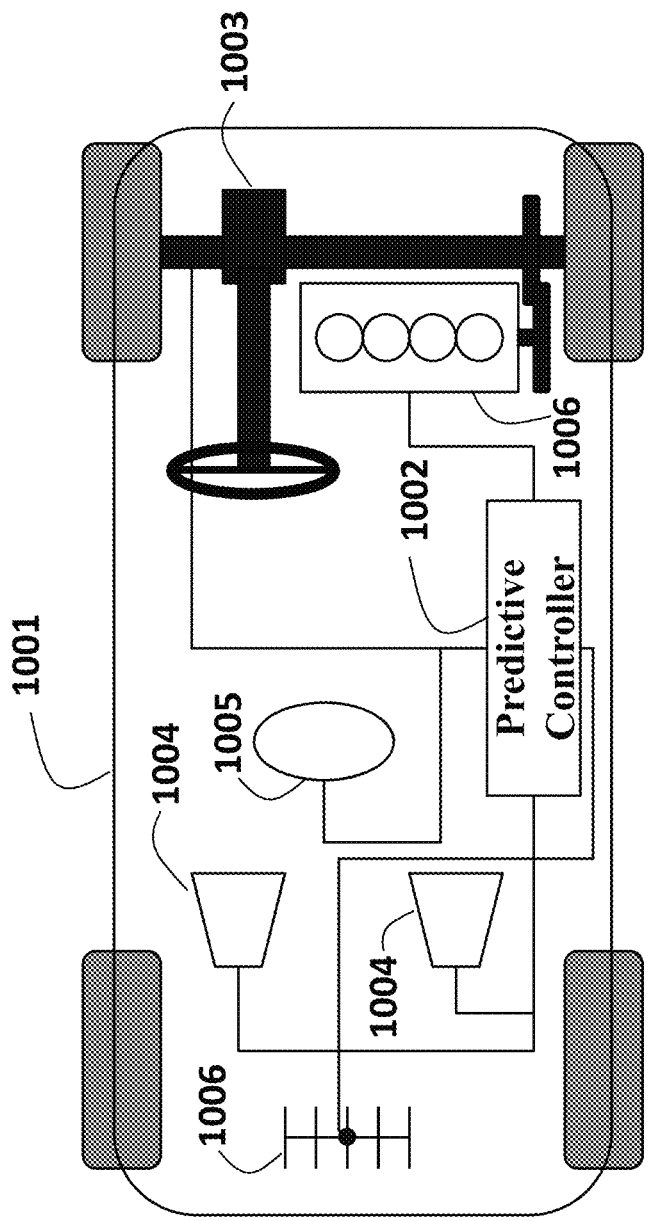
FIG. 10A is a schematic of a vehicle including a stochastic predictive controller employing principles of some embodiments.

FIG. 10A shows a schematic of a vehicle 1001 including a stochastic predictive controller 1002 employing principles of some embodiments. As used herein, the vehicle 1001 can be any type of wheeled vehicle, such as a passenger car, bus, or rover. Also, the vehicle 1001 can be an autonomous or semi-autonomous vehicle. For example, some embodiments control the motion of the vehicle 1001. Examples of the motion include lateral motion of the vehicle controlled by a steering system 1003 of the vehicle 1001. In one embodiment, the steering system 1003 is controlled by the controller 1002. Additionally or alternatively, the steering system 1003 can be controlled by a driver of the vehicle 1001.

The vehicle 1001 can also include an engine 1006, which can be controlled by the controller 1002 or by other components of the vehicle 1001. The vehicle 1001 can also include one or more sensors 1004 to sense the surrounding environment. Examples of the sensors 1004 include distance range finders, radars, lidars, and cameras. The vehicle 1001 can also include one or more sensors 1005 to sense its current motion quantities and internal status. Examples of the sensors 1005 include global positioning system (GPS), accelerometers, inertial measurement units, gyroscopes, shaft rotational sensors, torque sensors, deflection sensors, pressure sensor, and flow sensors. The sensors 1005 provide information to the controller 1002. In some embodiments of the invention, the sensors are used to estimate the current state of the vehicle, for example, including one or multiple of the following quantities: position of the vehicle, longitudinal and lateral velocities, yaw angle and yaw rate, angular velocity or slip angle at one or multiple of the wheels of the vehicle, and other related quantities. According to some embodiments of the invention, the predictive controller 1002 computes control inputs, for example, including one or multiple of the following quantities: steering wheel angle or steering rate, angular velocity or torque at one or multiple of the wheels of the vehicle, and other related quantities. The vehicle 1001 can be equipped with a transceiver 1006 enabling communication capabilities of the controller 1002 through wired or wireless communication channels.

Figure 10B:
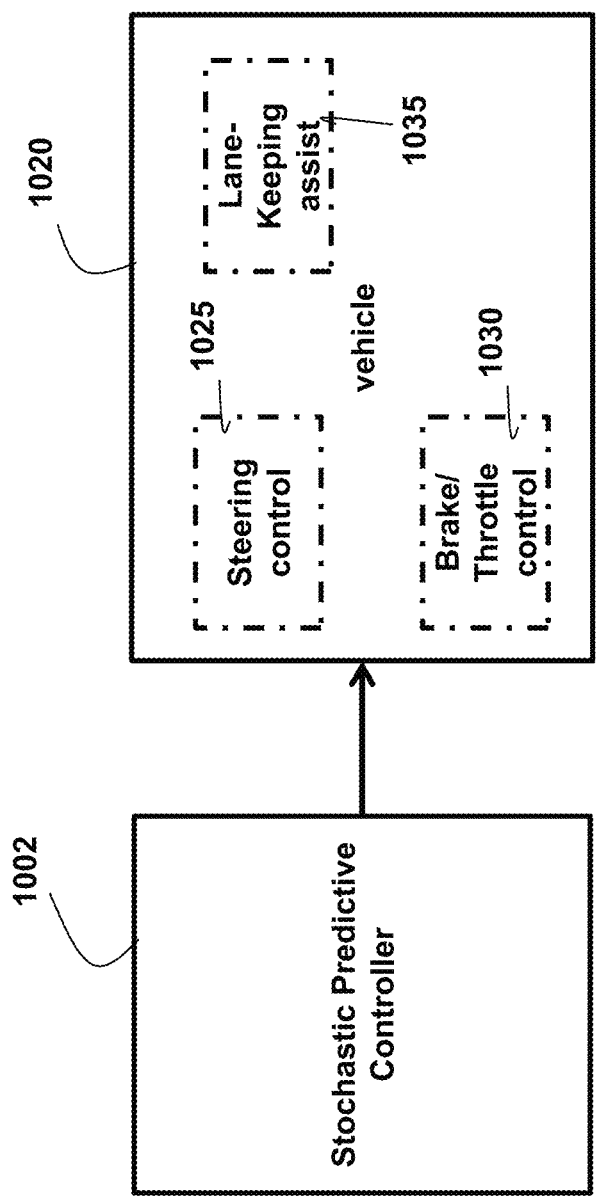
FIG. 10B is a schematic of interaction between the stochastic predictive controller employing principles of some embodiments and controllers of the vehicle 1001 according to some embodiments.

FIG. 10B shows a schematic of interaction between the stochastic predictive controller 1002 and the controllers 1020 of the vehicle 1001 according to some embodiments. For example, in some embodiments, the controllers 1020 of the vehicle 1001 are steering 1025 and brake/throttle controllers 1030 that control rotation and acceleration of the vehicle 1020. In such a case, the stochastic predictive controller 1002 outputs control inputs to the controllers 1025 and 1030 to control the state of the vehicle. The controllers 1020 can also include high-level controllers, e.g., a lane-keeping assist controller 1035 that further process the control inputs of the stochastic predictive controller 1002. In both cases, the controllers 1020 use the outputs of the stochastic predictive controller 1002 to control at least one actuator of the vehicle, such as the steering wheel and/or the brakes of the vehicle, in order to control the motion of the vehicle.

Figure 10C:
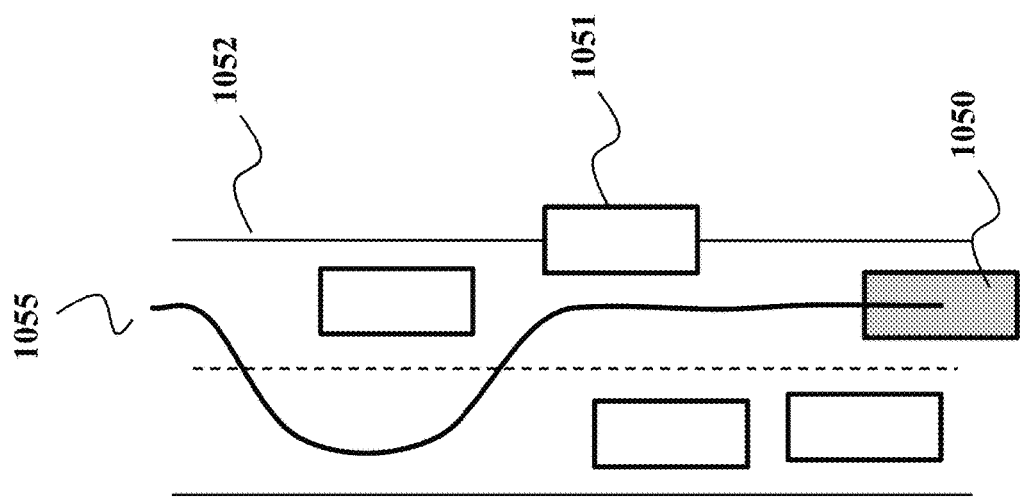
FIG. 10C and FIG. 10D are schematics of a motion planning and/or stochastic predictive control method for a controlled vehicle under uncertainty, employing principles of some embodiments of the invention.

FIG. 10C shows a schematic of an autonomous or semi-autonomous controlled vehicle 1050 for which a dynamically feasible, and often optimal trajectory 1055 can be computed by using embodiments of this invention. The generated trajectory aims to keep the vehicle within particular road bounds 1052, and aims to avoid other uncontrolled vehicles, i.e., obstacles 1051 for the controlled vehicle 1050. In some embodiments, each of the obstacles 1051 can be represented by one or multiple inequality constraints in a time or space formulation of the constrained optimal control problem. For example, based on embodiments configured to implement a stochastic model predictive controller, the autonomous or semi-autonomous controlled vehicle 1050 can make decisions in real time such as, e.g., pass another vehicle on the left or on the right side or instead to stay behind another vehicle within the current lane of the road 1052. Embodiments of the invention are based on an SNMPC controller that directly takes into account the uncertainty about the current state and the predicted state of the vehicle 1050, the uncertainty about the parameters in the vehicle model as well as the uncertainty about the current and predicted state of the environment, e.g., including the obstacles 1051 that are within a certain distance from the current position of the autonomous or semi-autonomous controlled vehicle 1050.

Figure 10D:
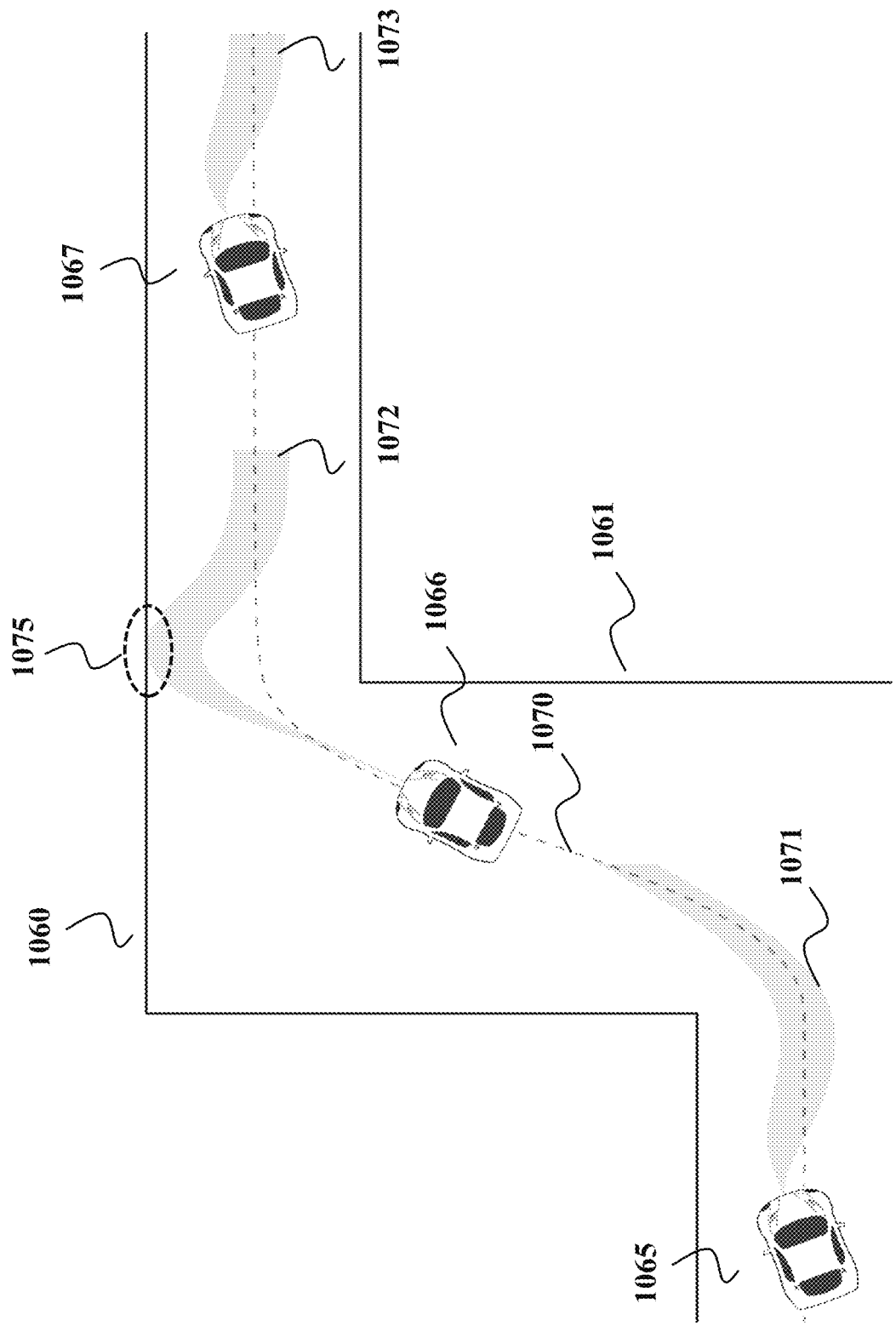

FIG. 10D shows a schematic of a vehicle 1065 that is controlled by an SNMPC controller that aims to track a dynamically feasible and optimal trajectory 1070 of a sharp lane change maneuver within the upper 1060 and lower 1061 road bounds by using embodiments of this invention. FIG. 10D shows the vehicle position 1065, including the propagation of uncertainty for the predicted state trajectories by the SNMPC controller 1071, at a first time point, the vehicle position 1066 and corresponding propagation of predicted state uncertainty 1072 at a second time point, and the vehicle position 1067 and corresponding propagation of predicted state uncertainty 1073 at a third time point. The use of the stochastic predictive controller with probabilistic chance constraints, according to some embodiments of the invention, allows the probability of the controlled vehicle to violate the road bound constraints 1060 and/or 1061 to be below a certain probability threshold value. More specifically, for example, FIG. 10D shows that the stochastic tube of predicted state trajectories 1072 at the second time point reaches 1075 the upper road bound constraint 1060, illustrating the behavior of the stochastic predictive controller that aims to satisfy both deterministic constraints and probabilistic chance constraints for the controlled system under uncertainty.

Examples of the uncertainty for the system and its environment can include any time-varying parameters related to the friction behavior between the tires of the vehicle and the road surface, e.g., the parameters in a Pacejka tire-force model that can be learned or estimated either offline and/or online while controlling the vehicle. The estimated parameter values as well as the estimated uncertainty can be defined as time-varying and uncertain disturbance variables in the direct optimal control problem formulation of the stochastic nonlinear model predictive controller, according to embodiments of the invention.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A predictive controller for controlling a system under uncertainty subject to constraints on states and control variables of the system, comprising:
at least one processor; and
memory having instructions stored thereon that, when executed by the at least one processor, cause the predictive controller to:
solve, at each control step of the predictive controller, an inequality constrained nonlinear dynamic optimization problem to produce a control signal, the inequality constrained nonlinear dynamic optimization problem including probabilistic chance constraints representing the uncertainty, wherein the predictive controller solves a direct optimal control structured nonlinear program (NLP), based on the probabilistic chance constraints and discrete-time approximated propagation equations, until a termination condition is met,
wherein the discrete-time approximated propagation equations are based on Gaussian-assumed density filtering (ADF) that is applied to perform an approximate prediction of first and/or higher order moment integrals of a state probability distribution of the system from one time step to a next time step within a prediction horizon, wherein the constraints on states and control variables of the system include one or multiple inequality constraints, and wherein the probabilistic chance constraints are approximated based on a tightening of the one or multiple inequality constraints with a term that depends on a back-off coefficient value, a constraint Jacobian matrix and the first and/or higher order moment integrals for predicted state variables at each time step within the prediction horizon, to ensure that a probability of violating each of the corresponding inequality constraints of the one or multiple inequality constraints is below a probability threshold value; and control an operation of the system using the control signal.

2. The predictive controller of claim 1, wherein the first and/or higher order moment integrals include a first integral, which is a mean, and a second integral, which is a covariance.

3. The predictive controller of claim 1, wherein the back-off coefficient value is computed using a Cantelli-Chebyshev inequality, which holds regardless of an underlying state probability distribution of one or multiple of time-varying modeling uncertainties.

4. The predictive controller of claim 1, wherein the back-off coefficient value is computed using an inverse Gaussian error function, assuming approximately normally distributed state trajectories.

5. The predictive controller of claim 1, wherein the back-off coefficient value is computed using a cumulative density function of the multivariate Pearson VII probability distribution, based on the first, second and fourth moment integrals of the state probability distribution.

6. The predictive controller of claim 2, wherein propagation of mean state values and state covariance matrices for each time step within the prediction horizon is performed by evaluating the discrete-time approximated propagation equations based on the Gaussian ADF, given an initial state estimate and initial uncertainty, given the mean and covariance for one or multiple of time-varying modeling uncertainties and/or external disturbances, and given current values of control input variables that are to be optimized for the prediction horizon.

7. The predictive controller of claim 6, wherein the Gaussian ADF is an extended Kalman filter (EKF), using an explicit linearization of nonlinear system dynamics, based on evaluations of state dynamic equations and corresponding Jacobian matrices, given the current values of the control input variables that are to be optimized for the prediction horizon.

8. The predictive controller of claim 6, wherein the Gaussian ADF is a linear-regression Kalman filter (LRKF), using a statistical linearization of the state probability distribution, based on evaluations of state dynamic equations at one or multiple integration points, given the current values of the control input variables that are to be optimized for the prediction horizon.

9. The predictive controller of claim 8, wherein the one or multiple integration points is chosen according to a spherical cubature rule or an unscented transform.

10. The predictive controller of claim 6, wherein the discrete-time approximated propagation equations are defined for a Cholesky factorization of the state covariance matrices in order to preserve positive definiteness of the state covariance matrices at each control time step.

11. The predictive controller of claim 10, wherein a regularization term is used in the discrete-time approximated propagation equations to ensure that the Cholesky factorization for the state covariance matrices exists at each control time step.

12. The predictive controller of claim 6, wherein the propagation of the mean state values and state covariance matrices for each time step within the prediction horizon is performed for a pre-stabilized system of nonlinear system dynamics to take into account future feedback control actions in a forward propagation of uncertainty for the predicted state variables within the prediction horizon.

13. The predictive controller of claim 12, wherein the pre-stabilized system of nonlinear system dynamics is using a time-invariant or a time-varying sequence of affine feedback gains.

14. The predictive controller of claim 12, wherein the inequality constrained nonlinear dynamic optimization problem includes one or multiple probabilistic chance constraints for one or multiple inequality constraints on subsequent feedback control actions within the prediction horizon to ensure feasibility of the pre-stabilized system of nonlinear system dynamics.

15. The predictive controller of claim 1, wherein the controller computes an optimal solution to the direct optimal control structured nonlinear program by using a sequential quadratic programming (SQP) optimization algorithm, which solves a quadratic programming (QP) subproblem that preserves a block-structured sparsity, to compute an update to values for the state mean and covariance variables and to values for the control variables at each iteration of the SQP optimization algorithm, until a termination condition is met.

16. The predictive controller of claim 1, wherein the predictive controller uses only one or a predetermined number of iterations for a derivative-based optimization algorithm to solve the inequality constrained nonlinear dynamic optimization problem at each control step, starting from an optimal or suboptimal sequence of state mean and covariance matrix values and of control input values over the prediction horizon at a previous control step.

17. The predictive controller of claim 16, wherein the derivative-based optimization algorithm is an adjoint-based sequential quadratic programming optimization method, using an inexact evaluation of one or multiple of first and/or higher order derivatives of objective and/or constraint functions, that solves only one or a predetermined number of block-structured quadratic programming subproblems at each control step to update the optimal or suboptimal sequence of state mean and covariance matrix values and of the control input values over the prediction horizon.

18. The predictive controller of claim 1, wherein the controlled system is configured to output control inputs to controllers of a vehicle.

19. The predictive controller of claim 18, wherein a state of the vehicle includes one or combination of a position, an orientation, a velocity, an angular velocity, a slip ratio and a slip angle value of the vehicle, wherein the control inputs include one or combination of an acceleration, a brake torque, a steering angle and a steering rate value, and wherein the uncertainty includes time-varying disturbances including one or combination of uncertainty in a mass value, an inertia value, or both in a model of the vehicle, uncertainty in a steering model of the vehicle, uncertainty in one or multiple parameter values indicative of friction between tires of the vehicle and a road surface.

* * * * *